United States Patent
Sanfilippo et al.

(10) Patent No.: US 10,207,850 B2
(45) Date of Patent: Feb. 19, 2019

(54) FLEXIBLE PACKAGE AND METHOD OF MAKING SAME

(71) Applicant: PRIMAPAK, LLC, Elgin, IL (US)

(72) Inventors: James J. Sanfilippo, Barrington Hills, IL (US); John E. Sanfilippo, Barrington Hills, IL (US); Jeanne M. Skaggs, Arlington Heights, IL (US); Francisco Javier Soria, West Chicago, IL (US); Milorad Radenovic, Chicago, IL (US); Bohdan Wyslotsky, Algonquin, IL (US); Paul Georgelos, Naperville, IL (US); Pat Montefusco, Genoa, IL (US); Roy Speer, Barrington Hills, IL (US); Roman Forowycz, Lake Forest, IL (US)

(73) Assignee: PRIMAPAK, LLC., Elgin, IL (US)

( * ) Notice: Subject to any disclaimer, the term of this patent is extended or adjusted under 35 U.S.C. 154(b) by 152 days.

(21) Appl. No.: 14/064,083

(22) Filed: Oct. 25, 2013

(65) Prior Publication Data
US 2015/0001234 A1  Jan. 1, 2015

Related U.S. Application Data

(60) Provisional application No. 61/801,186, filed on Mar. 15, 2013, provisional application No. 61/769,168, (Continued)

(51) Int. Cl.
*B29C 51/18* (2006.01)
*B65D 75/58* (2006.01)
(Continued)

(52) U.S. Cl.
CPC ..... *B65D 75/5877* (2013.01); *B65D 75/5838* (2013.01); *B29C 51/18* (2013.01);
(Continued)

(58) Field of Classification Search
CPC ................ B65D 75/5877; B65D 75/5838
See application file for complete search history.

(56) References Cited

U.S. PATENT DOCUMENTS

| 724,316 A | 3/1903 | Staples |
| 1,102,750 A | 7/1914 | Hawkins |

(Continued)

FOREIGN PATENT DOCUMENTS

| DE | 102010019867 | 9/2011 |
| EP | 0879767 A1 | 11/1998 |

(Continued)

OTHER PUBLICATIONS

Brody et al., *Encyclopedia of Packaging Technology*, 2nd ed., New York, NY: John Wiley & Sons (1993).
(Continued)

*Primary Examiner* — Derek Battisti
(74) *Attorney, Agent, or Firm* — Marshall, Gerstein & Borun LLP

(57) ABSTRACT

A re-closable packaging assembly includes a container formed at least partially by a first film, and the container has a plurality of walls that cooperate to define an interior volume. The container has an opening through at least one of the plurality of walls. A closure assembly is secured to the container adjacent the opening and comprises a second film and a portion of the first film. The closure assembly includes a lid member pivotable about a hinge portion between a first position in which the lid member releasably engages the container surrounding the opening and a second position in which the lid member is pivoted away from the opening. A first engagement feature may be disposed on the container and a second engagement feature may be disposed on the lid member to removably secure the lid member to the container when the lid member is in the first position.

63 Claims, 65 Drawing Sheets

Related U.S. Application Data filed on Feb. 25, 2013, provisional application No. 61/739,535, filed on Dec. 19, 2012, provisional application No. 61/719,340, filed on Oct. 26, 2012.

(51) Int. Cl.
   *B29L 31/56* (2006.01)
   *B31B 50/81* (2017.01)

(52) U.S. Cl.
   CPC ..... *B29L 2031/565* (2013.01); *B31B 50/8144* (2017.08); *B65D 2575/586* (2013.01); *Y10T 29/49826* (2015.01)

(56) References Cited

U.S. PATENT DOCUMENTS

| | | |
|---|---|---|
| 1,389,197 A | 8/1921 | Kusterer |
| 1,395,229 A | 10/1921 | Inman et al. |
| 1,747,618 A | 2/1930 | Burns |
| 1,930,285 A | 10/1933 | Robinson |
| 2,017,176 A | 10/1935 | Andrews |
| 2,041,227 A | 5/1936 | Chalmers |
| 2,048,122 A | 7/1936 | Howard |
| 2,092,858 A | 9/1937 | Richard |
| 2,106,907 A | 2/1938 | Brunt et al. |
| 2,113,431 A | 4/1938 | Milliken |
| 2,153,310 A | 4/1939 | Newman |
| 2,180,841 A | 11/1939 | Vogt |
| 2,239,398 A | 4/1941 | Palmer |
| 2,251,283 A | 8/1941 | Johnson |
| 2,259,866 A | 10/1941 | Stokes |
| 2,260,064 A | 10/1941 | Stokes et al. |
| 2,291,063 A | 7/1942 | Staude et al. |
| 2,311,857 A | 2/1943 | Noah |
| 2,328,579 A | 9/1943 | Pelosi |
| 2,330,015 A | 9/1943 | Stokes |
| 2,339,156 A | 1/1944 | Duane |
| 2,352,766 A | 7/1944 | Bogue |
| 2,365,159 A | 12/1944 | Walton |
| 2,385,898 A | 10/1945 | Waters |
| 2,416,332 A | 2/1947 | Lehman |
| 2,495,807 A | 1/1950 | Buttery |
| 2,508,962 A | 5/1950 | Moore |
| 2,524,766 A | 10/1950 | Carroll |
| 2,619,226 A | 11/1952 | Adams |
| 2,684,807 A | 7/1954 | Gerrish |
| 2,695,847 A | 11/1954 | Fisher |
| 2,719,663 A | 10/1955 | Meyer-Jagenberg |
| 2,737,338 A | 3/1956 | Moore |
| 2,749,245 A | 6/1956 | Peters |
| 2,750,093 A | 6/1956 | Moore |
| 2,758,775 A | 8/1956 | Moore |
| 2,787,410 A | 4/1957 | Moore |
| 2,819,831 A | 1/1958 | Polarek et al. |
| 2,823,795 A | 2/1958 | Moore |
| 2,864,710 A | 12/1958 | Pottle et al. |
| 2,936,940 A | 5/1960 | Berghgracht |
| 2,970,735 A | 2/1961 | Jacke |
| 3,006,257 A | 10/1961 | Orsini |
| 3,054,550 A | 9/1962 | Comstock |
| 3,091,902 A | 6/1963 | Grafingholt et al. |
| 3,093,292 A | 6/1963 | Ahlbor |
| 3,111,223 A | 11/1963 | Jacobi |
| 3,116,153 A | 12/1963 | Seiferth et al. |
| 3,125,275 A | 3/1964 | Ehe |
| 3,127,082 A | 3/1964 | Meyer-Jagenberg |
| 3,143,276 A | 8/1964 | Nichols |
| 3,155,304 A | 11/1964 | Beerend |
| 3,172,769 A | 3/1965 | Horan |
| 3,185,379 A | 5/1965 | Kohlhaas |
| 3,206,094 A | 9/1965 | Humphrey |
| 3,228,584 A | 1/1966 | Ashton |
| 3,228,587 A | 1/1966 | Segebrecht |
| 3,235,168 A | 2/1966 | Nichols |
| 3,249,286 A | 5/1966 | Palmer |
| 3,259,303 A | 7/1966 | Repko |
| 3,259,507 A | 7/1966 | Smith |
| 3,272,423 A | 9/1966 | Bjarno |
| 3,275,214 A | 9/1966 | Carangelo |
| 3,299,611 A | 1/1967 | Hendrick et al. |
| 3,314,591 A | 4/1967 | Cheeley |
| 3,318,204 A | 5/1967 | Crane |
| 3,325,077 A | 6/1967 | Boegershausen |
| 3,326,097 A | 6/1967 | Lokey |
| 3,339,721 A | 9/1967 | Goldstein |
| 3,349,959 A | 10/1967 | Watkins |
| 3,373,917 A | 3/1968 | Cox |
| 3,380,646 A | 4/1968 | Doyen et al. |
| 3,423,007 A | 1/1969 | Christensson |
| 3,426,499 A | 2/1969 | Paige |
| 3,434,652 A | 3/1969 | Shore |
| 3,437,258 A | 4/1969 | Kugler |
| 3,462,067 A | 8/1969 | Shore |
| 3,505,779 A | 4/1970 | Kopp |
| 3,515,270 A | 6/1970 | Yang et al. |
| 3,521,807 A | 7/1970 | Weisberg |
| 3,562,392 A | 2/1971 | Mylius |
| 3,599,387 A | 8/1971 | James |
| 3,604,491 A | 9/1971 | Spiess |
| 3,621,637 A | 11/1971 | Sternau |
| 3,738,567 A | 6/1973 | Ruda |
| 3,739,977 A | 6/1973 | Shapiro et al. |
| 3,785,112 A | 1/1974 | Leasure et al. |
| 3,838,787 A | 10/1974 | McCloskey |
| 3,917,158 A | 11/1975 | Dorofachuk et al. |
| 3,935,993 A | 2/1976 | Doyen et al. |
| 3,940,054 A | 2/1976 | Goebel et al. |
| 3,968,921 A | 7/1976 | Jewell |
| 3,980,225 A | 9/1976 | Kan |
| 4,004,398 A | 1/1977 | Larsson et al. |
| 4,041,851 A | 8/1977 | Jentsch |
| 4,069,348 A | 1/1978 | Bush |
| 4,082,214 A | 4/1978 | Baker |
| 4,082,216 A | 4/1978 | Clarke et al. |
| 4,101,051 A | 7/1978 | Reil |
| 4,129,976 A | 12/1978 | Grundler et al. |
| 4,185,754 A * | 1/1980 | Julius ............... A47K 10/421 |
| | | 206/210 |
| 4,192,420 A | 3/1980 | Worrell, Sr. et al. |
| 4,197,949 A | 4/1980 | Carlsson |
| 4,260,061 A | 4/1981 | Jacobs |
| 4,291,826 A | 9/1981 | Swanson |
| 4,308,679 A | 1/1982 | Ray, III et al. |
| 4,338,766 A | 7/1982 | Hamilton |
| D265,777 S | 8/1982 | Elzea et al. |
| 4,345,133 A | 8/1982 | Cherney et al. |
| 4,345,393 A | 8/1982 | Price et al. |
| D266,049 S | 9/1982 | Conti |
| 4,353,497 A | 10/1982 | Bustin |
| 4,361,266 A | 11/1982 | Killy |
| 4,367,842 A | 1/1983 | Rausing |
| 4,420,080 A | 12/1983 | Nakamura |
| 4,441,648 A | 4/1984 | Portsmouth |
| 4,442,656 A | 4/1984 | Wylie et al. |
| 4,531,668 A | 7/1985 | Forbes, Jr. |
| 4,552,269 A * | 11/1985 | Chang ............... B65D 75/5838 |
| | | 229/125.09 |
| 4,554,190 A | 11/1985 | McHenry et al. |
| 4,576,309 A | 3/1986 | Tzifkansky et al. |
| 4,589,145 A | 5/1986 | Van Erden et al. |
| D286,745 S | 11/1986 | Forbes, Jr. |
| 4,621,000 A | 11/1986 | Frick |
| 4,651,874 A | 3/1987 | Nakamura |
| 4,663,915 A | 5/1987 | Van Erden et al. |
| 4,674,129 A | 6/1987 | Janhonen |
| 4,679,693 A | 7/1987 | Forman |
| 4,679,701 A | 7/1987 | Ackermann et al. |
| 4,687,104 A | 8/1987 | Ielmini |
| 4,696,404 A | 9/1987 | Corella |
| 4,738,365 A | 4/1988 | Prater |
| D297,214 S | 8/1988 | Forbes, Jr. |
| 4,786,192 A | 11/1988 | Graves et al. |
| 4,790,436 A | 12/1988 | Nakamura |
| 4,798,295 A | 1/1989 | Rausing |

(56) References Cited

U.S. PATENT DOCUMENTS

| | | |
|---|---|---|
| 4,804,137 A | 2/1989 | Harby |
| 4,808,421 A | 2/1989 | Mendenhall et al. |
| 4,811,848 A | 3/1989 | Jud |
| 4,837,849 A | 6/1989 | Erickson et al. |
| 4,840,270 A | 6/1989 | Caputo et al. |
| 4,848,575 A | 7/1989 | Nakamura et al. |
| 4,851,246 A | 7/1989 | Maxwell et al. |
| 4,858,793 A | 8/1989 | Stone |
| D304,016 S | 10/1989 | Forbes, Jr. |
| 4,881,360 A | 11/1989 | Konzal et al. |
| 4,886,373 A | 12/1989 | Corella |
| 4,909,017 A | 3/1990 | McMahon et al. |
| 4,954,124 A | 9/1990 | Erickson et al. |
| 4,986,054 A | 1/1991 | McMahon |
| D315,099 S | 3/1991 | Alizard |
| 4,997,416 A | 3/1991 | Mitchell et al. |
| 5,031,826 A | 7/1991 | Seufert |
| 5,036,997 A | 8/1991 | May et al. |
| 5,044,777 A | 9/1991 | Watkins et al. |
| 5,046,300 A | 9/1991 | Custer et al. |
| 5,059,036 A | 10/1991 | Richison et al. |
| 5,062,527 A | 11/1991 | Westerman |
| 5,065,887 A | 11/1991 | Schuh et al. |
| 5,078,509 A | 1/1992 | Center et al. |
| 5,080,643 A | 1/1992 | Mitchell et al. |
| 5,092,831 A | 3/1992 | James et al. |
| 5,127,208 A | 7/1992 | Custer et al. |
| 5,158,371 A | 10/1992 | Moravek |
| 5,158,499 A | 10/1992 | Guckenberger |
| D332,399 S | 1/1993 | Neff |
| 5,195,829 A | 3/1993 | Watkins et al. |
| 5,205,651 A | 4/1993 | Decottignies et al. |
| 5,215,380 A | 6/1993 | Custer et al. |
| 5,251,809 A | 10/1993 | Drummond et al. |
| 5,254,073 A | 10/1993 | Richison et al. |
| 5,255,497 A | 10/1993 | Zoromski et al. |
| 5,350,240 A | 9/1994 | Billman et al. |
| D351,090 S | 10/1994 | Narsutis |
| 5,352,466 A | 10/1994 | Delonis |
| 5,353,946 A | 10/1994 | Behrend |
| 5,356,069 A | 10/1994 | Bochet et al. |
| 5,366,104 A | 11/1994 | Armstrong |
| D354,436 S | 1/1995 | Krupa |
| 5,417,035 A | 5/1995 | English |
| D364,563 S | 11/1995 | Miller et al. |
| 5,463,851 A | 11/1995 | Nagai et al. |
| 5,484,101 A * | 1/1996 | Hedberg ................ B65D 5/746 220/255 |
| 5,498,080 A | 3/1996 | Dalea et al. |
| 5,503,324 A | 4/1996 | Bacchetti et al. |
| 5,505,040 A | 4/1996 | Janssen et al. |
| 5,505,305 A | 4/1996 | Scholz et al. |
| 5,542,902 A | 8/1996 | Richison et al. |
| 5,545,420 A | 8/1996 | Lipinski et al. |
| 5,556,026 A | 9/1996 | Blankitny |
| D374,774 S | 10/1996 | Cassel |
| 5,561,966 A | 10/1996 | English |
| 5,577,612 A | 11/1996 | Chesson et al. |
| 5,611,452 A | 3/1997 | Bonora et al. |
| 5,613,608 A | 3/1997 | Tronchetti et al. |
| 5,655,706 A | 8/1997 | Vandiver |
| D386,001 S | 11/1997 | Saffran |
| 5,687,848 A | 11/1997 | Scholz et al. |
| 5,704,480 A | 1/1998 | Scholz et al. |
| 5,704,541 A | 1/1998 | Mogard |
| D394,606 S | 5/1998 | Zorn et al. |
| 5,749,512 A | 5/1998 | Gingras-Taylor |
| 5,770,839 A | 6/1998 | Ruebush et al. |
| 5,772,332 A | 6/1998 | Geller |
| D395,952 S | 7/1998 | Buczwinski et al. |
| 5,785,179 A | 7/1998 | Buczwinski et al. |
| 5,788,121 A | 8/1998 | Sasaki et al. |
| 5,788,378 A | 8/1998 | Thomas |
| 5,789,049 A | 8/1998 | Randles |
| 5,791,465 A | 8/1998 | Niki et al. |
| D398,526 S | 9/1998 | Schwarz et al. |
| D398,844 S | 9/1998 | Oberloier |
| 5,799,863 A | 9/1998 | Capy et al. |
| 5,818,016 A | 10/1998 | Lorence et al. |
| 5,820,017 A | 10/1998 | Eliovson et al. |
| 5,826,401 A | 10/1998 | Bois |
| 5,832,701 A | 11/1998 | Hauers et al. |
| 5,842,790 A | 12/1998 | Imer |
| 5,857,613 A | 1/1999 | Drummond et al. |
| 5,858,543 A | 1/1999 | Futter et al. |
| 5,862,652 A | 1/1999 | Schoeler |
| 5,882,749 A | 3/1999 | Jones et al. |
| 5,882,789 A | 3/1999 | Jones et al. |
| 5,897,050 A | 4/1999 | Barnes |
| D409,484 S | 5/1999 | Tasker |
| 5,908,246 A | 6/1999 | Arimura et al. |
| D412,439 S | 8/1999 | Cormack |
| 5,937,615 A | 8/1999 | Forman |
| 5,944,425 A | 8/1999 | Forman |
| 5,972,396 A | 10/1999 | Jurgovan et al. |
| 5,983,594 A | 11/1999 | Forman |
| 5,993,593 A | 11/1999 | Swartz et al. |
| 5,996,797 A | 12/1999 | Flaig |
| 6,005,234 A | 12/1999 | Moseley et al. |
| 6,021,624 A | 2/2000 | Richison et al. |
| 6,023,914 A | 2/2000 | Richison et al. |
| 6,026,953 A | 2/2000 | Nakamura et al. |
| D421,901 S | 3/2000 | Hill |
| D421,902 S | 3/2000 | Hill |
| 6,036,365 A | 3/2000 | Imer |
| 6,038,839 A | 3/2000 | Linkiewicz |
| 6,056,141 A | 5/2000 | Navarini et al. |
| 6,060,096 A | 5/2000 | Hanson et al. |
| D427,056 S | 6/2000 | Irace et al. |
| 6,088,998 A | 7/2000 | Malin et al. |
| 6,113,271 A | 9/2000 | Scott et al. |
| 6,120,183 A | 9/2000 | Buchanan et al. |
| D431,464 S | 10/2000 | Collins et al. |
| 6,132,351 A | 10/2000 | Lotto et al. |
| 6,137,098 A | 10/2000 | Moseley et al. |
| 6,139,662 A | 10/2000 | Forman |
| 6,149,304 A | 11/2000 | Hamilton et al. |
| D437,686 S | 2/2001 | Balzar et al. |
| 6,182,887 B1 | 2/2001 | Ljunstrom et al. |
| 6,229,061 B1 | 5/2001 | Dragoo et al. |
| 6,231,237 B1 | 5/2001 | Geller |
| 6,234,676 B1 | 5/2001 | Galomb et al. |
| 6,245,367 B1 | 6/2001 | Galomb |
| 6,250,048 B1 | 6/2001 | Linkiewicz |
| 6,253,993 B1 | 7/2001 | Lloyd et al. |
| 6,254,907 B1 | 7/2001 | Galomb |
| 6,261,215 B1 | 7/2001 | Imer |
| D446,014 S | 8/2001 | Adkins |
| 6,273,610 B1 | 8/2001 | Koyama et al. |
| 6,274,181 B1 | 8/2001 | Richison et al. |
| 6,309,105 B1 | 10/2001 | Palumbo |
| D450,960 S | 11/2001 | Boyea et al. |
| 6,319,184 B1 | 11/2001 | DeMatteis et al. |
| D452,374 S | 12/2001 | Kim |
| 6,325,239 B2 | 12/2001 | Randall et al. |
| 6,350,057 B1 | 2/2002 | Forman |
| 6,354,062 B1 | 3/2002 | Haughton et al. |
| 6,361,212 B1 | 3/2002 | Sprehe et al. |
| 6,412,634 B1 * | 7/2002 | Telesca ................ A47K 10/421 206/494 |
| 6,420,006 B1 | 7/2002 | Scott |
| 6,423,356 B2 | 7/2002 | Richison et al. |
| D461,403 S | 8/2002 | Chomik et al. |
| 6,428,867 B1 | 8/2002 | Scott et al. |
| 6,430,899 B1 | 8/2002 | Cicha |
| 6,431,434 B1 | 8/2002 | Haughton et al. |
| D463,276 S | 9/2002 | Piscopo et al. |
| 6,446,796 B1 | 9/2002 | Schmidt |
| D464,884 S | 10/2002 | Sumpmann et al. |
| D464,894 S | 10/2002 | Mittersinker et al. |
| 6,481,183 B1 | 11/2002 | Schmidt |
| D466,807 S | 12/2002 | Buck et al. |
| 6,488,556 B2 | 12/2002 | Galomb |
| 6,502,986 B1 | 1/2003 | Bensur et al. |

(56) References Cited

U.S. PATENT DOCUMENTS

| | | |
|---|---|---|
| 6,510,673 B1 | 1/2003 | Visona' et al. |
| 6,513,308 B1 | 2/2003 | Meeuwesen et al. |
| D471,804 S | 3/2003 | Staples |
| 6,533,456 B1 | 3/2003 | Buchman |
| D473,461 S | 4/2003 | Joubert |
| 6,554,134 B1 | 4/2003 | Guibert |
| 6,568,150 B2 | 5/2003 | Forman |
| 6,589,622 B1 | 7/2003 | Scott |
| 6,615,567 B2 | 9/2003 | Kuhn et al. |
| 6,659,645 B1 | 12/2003 | Schulz |
| D485,461 S | 1/2004 | Sams et al. |
| 6,679,034 B2 | 1/2004 | Kohl et al. |
| 6,695,757 B2 | 2/2004 | Edwards et al. |
| D487,192 S | 3/2004 | Farnham et al. |
| 6,702,109 B1 * | 3/2004 | Tabuchi .............. B65D 75/5838 206/233 |
| 6,719,140 B1 | 4/2004 | Rinsler |
| 6,719,678 B1 | 4/2004 | Stern |
| D489,530 S | 5/2004 | Lindsay |
| 6,729,112 B2 | 5/2004 | Kuss et al. |
| 6,736,309 B1 | 5/2004 | Westerman et al. |
| 6,746,388 B2 | 6/2004 | Edwards et al. |
| 6,755,927 B2 | 6/2004 | Forman |
| 6,761,279 B1 | 7/2004 | Martin et al. |
| 6,783,277 B2 | 8/2004 | Edwards et al. |
| 6,817,160 B2 | 11/2004 | Schmidt |
| 6,820,391 B2 | 11/2004 | Barmore et al. |
| D501,134 S | 1/2005 | Takahashi et al. |
| 6,845,602 B2 | 1/2005 | Drut |
| D502,095 S | 2/2005 | Tucker et al. |
| D503,336 S | 3/2005 | Tucker et al. |
| D504,622 S | 5/2005 | Takahashi et al. |
| 6,886,313 B2 | 5/2005 | Knoerzer et al. |
| 6,913,389 B2 | 7/2005 | Kannankeril et al. |
| 6,918,532 B2 | 7/2005 | Sierra-Gomez et al. |
| 6,935,086 B2 | 8/2005 | Brenkus et al. |
| 6,953,069 B2 | 10/2005 | Galomb |
| D513,870 S | 1/2006 | Rosine et al. |
| 6,986,920 B2 | 1/2006 | Forman et al. |
| D514,439 S | 2/2006 | Snedden et al. |
| 7,051,877 B2 | 5/2006 | Lin |
| 7,059,466 B2 | 6/2006 | Lees et al. |
| 7,077,259 B2 | 7/2006 | Breidenbach |
| 7,080,726 B2 | 7/2006 | Breidenbach et al. |
| D528,010 S | 9/2006 | Yashima et al. |
| 7,108,441 B2 | 9/2006 | Altonen et al. |
| 7,128,200 B2 | 10/2006 | Lees et al. |
| D531,894 S | 11/2006 | Ramirez et al. |
| 7,153,026 B2 | 12/2006 | Galomb |
| 7,156,556 B2 | 1/2007 | Takahashi et al. |
| D536,608 S | 2/2007 | Arkins |
| RE39,505 E | 3/2007 | Thomas et al. |
| 7,205,016 B2 | 4/2007 | Garwood |
| 7,207,717 B2 | 4/2007 | Steele |
| 7,213,710 B2 | 5/2007 | Cotert |
| D544,762 S | 6/2007 | Zimmerman |
| D545,186 S | 6/2007 | Liebe et al. |
| D548,080 S | 8/2007 | Brown et al. |
| D551,508 S | 9/2007 | Friedland et al. |
| D552,468 S | 10/2007 | Seum et al. |
| 7,299,608 B2 | 11/2007 | Kohl et al. |
| 7,350,688 B2 | 4/2008 | Sierra-Gomez et al. |
| D569,719 S | 5/2008 | Ross |
| 7,371,008 B2 | 5/2008 | Bonenfant |
| D571,146 S | 6/2008 | Sanfilippo et al. |
| D571,197 S | 6/2008 | Sanfilippo et al. |
| 7,475,781 B2 | 1/2009 | Kobayashi et al. |
| D591,555 S | 5/2009 | Sanfilippo et al. |
| D593,369 S | 6/2009 | Green et al. |
| D608,193 S | 1/2010 | Sanfilippo et al. |
| 7,665,629 B2 | 2/2010 | Julius et al. |
| 7,665,895 B2 | 2/2010 | Takita et al. |
| 7,717,620 B2 | 5/2010 | Hebert et al. |
| 7,744,517 B2 | 6/2010 | Bonenfant |
| 7,780,006 B2 | 8/2010 | Clark, Jr. et al. |
| D629,296 S | 12/2010 | De Muynck |
| D637,577 S | 5/2011 | Han et al. |
| 7,993,256 B2 | 8/2011 | Takita et al. |
| 8,006,833 B2 | 8/2011 | Clark, Jr. et al. |
| 8,038,349 B2 | 10/2011 | Andersson et al. |
| D648,302 S | 11/2011 | Park et al. |
| 8,066,137 B2 | 11/2011 | Sanfilippo et al. |
| 8,074,803 B2 | 12/2011 | Motsch et al. |
| 8,114,451 B2 | 2/2012 | Sierra-Gomez et al. |
| 8,132,395 B2 | 3/2012 | Gehring et al. |
| 8,182,891 B2 | 5/2012 | Scott et al. |
| 8,231,024 B2 | 7/2012 | Sanfilippo et al. |
| 8,245,865 B2 * | 8/2012 | Damaghi ............ B65D 47/0871 220/254.5 |
| 8,276,353 B2 | 10/2012 | Reaves et al. |
| D671,000 S * | 11/2012 | O'Neill .............. B65D 75/5838 D9/449 |
| 8,308,363 B2 | 11/2012 | Vogt et al. |
| D676,014 S | 2/2013 | Chung |
| D682,244 S | 5/2013 | Park et al. |
| D686,181 S | 7/2013 | Jeong |
| D689,767 S | 9/2013 | Clark et al. |
| 8,523,441 B2 | 9/2013 | Goglio et al. |
| D696,107 S | 12/2013 | Kimple et al. |
| 8,602,242 B2 * | 12/2013 | Sanfilippo ................ B65B 1/06 220/6 |
| 8,602,244 B2 | 12/2013 | Sanfilippo et al. |
| 8,746,483 B2 | 6/2014 | Sierra-Gomez et al. |
| 8,951,591 B2 | 2/2015 | Vogt et al. |
| 2001/0005979 A1 | 7/2001 | Kuss et al. |
| 2001/0010253 A1 | 8/2001 | Forman |
| 2002/0009575 A1 | 1/2002 | DeMatteis |
| 2002/0090879 A1 | 7/2002 | Galomb |
| 2002/0094922 A1 | 7/2002 | Edwards et al. |
| 2002/0118896 A1 | 8/2002 | Forman |
| 2002/0144998 A1 | 10/2002 | Lees et al. |
| 2002/0147088 A1 | 10/2002 | Edwards |
| 2003/0001002 A1 | 1/2003 | Haughton et al. |
| 2003/0041564 A1 | 3/2003 | Schmidt |
| 2003/0054929 A1 | 3/2003 | Post et al. |
| 2003/0059130 A1 | 3/2003 | Yoneyama et al. |
| 2003/0063820 A1 | 4/2003 | Buchman |
| 2003/0085265 A1 | 5/2003 | Haim |
| 2003/0100424 A1 | 5/2003 | Barmore et al. |
| 2003/0111523 A1 | 6/2003 | Haugan |
| 2003/0113042 A1 | 6/2003 | Yeager |
| 2003/0152679 A1 | 8/2003 | Garwood |
| 2003/0165602 A1 | 9/2003 | Garwood |
| 2003/0170357 A1 | 9/2003 | Garwood |
| 2003/0170359 A1 | 9/2003 | Garwood |
| 2003/0175392 A1 | 9/2003 | Garwood |
| 2003/0185937 A1 | 10/2003 | Garwood |
| 2003/0185948 A1 | 10/2003 | Garwood |
| 2003/0230504 A1 | 12/2003 | Hamming |
| 2004/0025476 A1 | 2/2004 | Oliverio et al. |
| 2004/0031244 A1 | 2/2004 | Steele |
| 2004/0040261 A1 | 3/2004 | Troyer et al. |
| 2004/0058103 A1 | 3/2004 | Anderson et al. |
| 2004/0081729 A1 | 4/2004 | Garwood |
| 2004/0089578 A1 * | 5/2004 | Lin .................... B65D 75/5838 206/494 |
| 2004/0099570 A1 | 5/2004 | Cargile |
| 2004/0105600 A1 | 6/2004 | Floyd |
| 2004/0114838 A1 | 6/2004 | McGregor |
| 2004/0120611 A1 | 6/2004 | Kannankeril et al. |
| 2004/0141664 A1 | 7/2004 | Olsen et al. |
| 2004/0146602 A1 | 7/2004 | Garwood et al. |
| 2004/0185154 A1 | 9/2004 | Garwood |
| 2004/0185155 A1 | 9/2004 | Garwood |
| 2004/0185156 A1 | 9/2004 | Garwood |
| 2004/0188457 A1 | 9/2004 | Galomb |
| 2004/0226625 A1 | 11/2004 | Galomb |
| 2004/0226849 A1 | 11/2004 | Brenkus et al. |
| 2004/0232029 A1 | 11/2004 | Cotert |
| 2004/0251163 A1 | 12/2004 | Conde et al. |
| 2004/0262322 A1 | 12/2004 | Middleton et al. |
| 2005/0011906 A1 * | 1/2005 | Buck .................. B65D 75/5833 221/64 |
| 2005/0031233 A1 | 2/2005 | Varanese et al. |

(56) References Cited

U.S. PATENT DOCUMENTS

| | | |
|---|---|---|
| 2005/0053315 A1 | 3/2005 | Aasen |
| 2005/0069227 A1 | 3/2005 | Steele |
| 2005/0069230 A1 | 3/2005 | Takahashi et al. |
| 2005/0084186 A1 | 4/2005 | Caris |
| 2005/0139645 A1 | 6/2005 | Shean et al. |
| 2005/0150785 A1* | 7/2005 | Julius ............... A47K 10/421 206/233 |
| 2005/0189367 A1* | 9/2005 | Chasid ............. B65D 75/5838 221/35 |
| 2005/0208188 A1 | 9/2005 | Garwood |
| 2005/0238766 A1 | 10/2005 | Henderson et al. |
| 2005/0265636 A1 | 12/2005 | Michalsky |
| 2005/0276525 A1 | 12/2005 | Hebert et al. |
| 2005/0284776 A1 | 12/2005 | Kobayashi et al. |
| 2006/0006049 A1 | 1/2006 | Breidenbach et al. |
| 2006/0016865 A1 | 1/2006 | Berglin et al. |
| 2006/0076352 A1 | 4/2006 | Peterson et al. |
| 2006/0080944 A1 | 4/2006 | Annehed et al. |
| 2006/0113212 A1 | 6/2006 | Steele |
| 2006/0169691 A1 | 8/2006 | Rothschild et al. |
| 2006/0210202 A1 | 9/2006 | Plourde |
| 2006/0283750 A1* | 12/2006 | Villars ............... B65D 83/0805 206/494 |
| 2006/0285777 A1 | 12/2006 | Howell et al. |
| 2007/0080078 A1 | 4/2007 | Hansen et al. |
| 2007/0082096 A1 | 4/2007 | Dougherty et al. |
| 2007/0084142 A1 | 4/2007 | Matthews |
| 2007/0151887 A1 | 7/2007 | Clark et al. |
| 2008/0053860 A1* | 3/2008 | McDonald ............. B65D 15/08 206/494 |
| 2008/0247686 A1 | 10/2008 | Phee et al. |
| 2009/0039078 A1 | 2/2009 | Sanfilippo et al. |
| 2009/0120828 A1 | 5/2009 | Sanfilippo et al. |
| 2009/0194560 A1 | 8/2009 | Freeman et al. |
| 2009/0232425 A1 | 9/2009 | Tai et al. |
| 2009/0273179 A1 | 11/2009 | Scott et al. |
| 2010/0002963 A1 | 1/2010 | Holbert et al. |
| 2010/0040311 A1 | 2/2010 | Plate |
| 2010/0092112 A1 | 4/2010 | Goglio et al. |
| 2010/0113240 A1 | 5/2010 | Takita et al. |
| 2010/0140129 A1 | 6/2010 | Sanfilippo et al. |
| 2010/0154264 A1 | 6/2010 | Scott et al. |
| 2010/0278454 A1 | 11/2010 | Huffer |
| 2011/0058755 A1 | 3/2011 | Guibert |
| 2011/0297690 A1 | 12/2011 | Teys et al. |
| 2012/0008884 A1 | 1/2012 | Murray |
| 2012/0125937 A1 | 5/2012 | Ahlstrom et al. |
| 2012/0128835 A1 | 5/2012 | Lyzenga et al. |
| 2012/0177307 A1 | 7/2012 | Duan et al. |
| 2012/0275727 A1 | 11/2012 | Chang |
| 2012/0321229 A1 | 12/2012 | Surdziel et al. |
| 2013/0004626 A1 | 1/2013 | Renders et al. |
| 2013/0011527 A1 | 1/2013 | Renders et al. |
| 2014/0083897 A1 | 3/2014 | Sanfilippo et al. |
| 2014/0102936 A1 | 4/2014 | Sanfilippo et al. |
| 2014/0109522 A1 | 4/2014 | Sanfilippo et al. |
| 2014/0185962 A1 | 7/2014 | Sanfilippo et al. |
| 2014/0196406 A1 | 7/2014 | Sanfilippo et al. |
| 2014/0307985 A1 | 7/2014 | Sanfilippo et al. |
| 2014/0301674 A1 | 10/2014 | Sanfilippo et al. |
| 2014/0328552 A1 | 11/2014 | Sanfilippo et al. |

FOREIGN PATENT DOCUMENTS

| | | |
|---|---|---|
| EP | 1106508 A1 | 6/2001 |
| EP | 1437311 A1 | 7/2004 |
| EP | 1508531 A1 | 2/2005 |
| EP | 1637472 A1 | 3/2006 |
| EP | 1749756 A2 | 2/2007 |
| EP | 2141090 A1 | 1/2010 |
| EP | 2347971 | 7/2011 |
| FR | 2766794 A1 | 2/1999 |
| FR | 2772009 A1 | 6/1999 |
| GB | 2399331 A | 9/2004 |
| IT | 1274100 B | 7/1997 |
| JP | 01167084 | 6/1989 |
| JP | 01226579 | 9/1989 |
| JP | 01267182 | 10/1989 |
| JP | 09142551 | 6/1997 |
| JP | 10-203560 | 8/1998 |
| JP | 2005320032 A | 11/2005 |
| WO | WO-86/06344 A1 | 11/1986 |
| WO | WO-94/11270 A1 | 5/1994 |
| WO | WO-00/12407 | 3/2000 |
| WO | WO-02/085726 A1 | 10/2002 |
| WO | WO-2004/024588 A1 | 3/2004 |
| WO | WO-2004/110885 | 12/2004 |
| WO | WO-2006/091821 A2 | 8/2006 |
| WO | WO-2007/058689 A1 | 5/2007 |
| WO | WO-2009/061959 A1 | 5/2009 |

OTHER PUBLICATIONS

Photographs of flexible container packaging, "Minibrick Pack", from Sonoco (Hartsville, South Carolina, USA) (became aware of in Dec. 2007).

SBS Special Top Design Machine, product sheet from Rovema Packaging Machines L.P. (Lawrenceville, Georgia, USA) (1 pg.) (2005).

International Search Report and Written Opinion from International Application No. PCT/US2013/066985, dated Jan. 29, 2014.

International Search Report and Written Opinion for International Application No. PCT/US2008/082689, dated Mar. 24, 2009.

International Search Report and Written Opinion for International Application No. PCT/US08/072554, dated Feb. 23, 2009.

International Search Report and Written Opinion for International Application No. PCT/US2009/063591, dated Jun. 18, 2010.

Extended European Search Report, European application No. EP 09825498.0, dated Nov. 22, 2012.

Search Report and Second Office Action (English translation), Chinese patent application No. 201380068596.2, dated May 4, 2017.

International Search Report and Written Opinion for International Application No. PCT/US2015/022859, dated Oct. 12, 2015.

U.S. Appl. No. 14/333,420, Nonfinal Office Action, dated Feb. 16, 2018.

Third Office Action (English translation), Chinese patent application No. 201380068596.2, dated Nov. 10, 2017.

Japanese patent application No. 2015-539877, Notice of Reasons for Refusal, dated Oct. 10, 2017.

European patent application No. 18161260, European Search Report, dated Sep. 19, 2018.

* cited by examiner

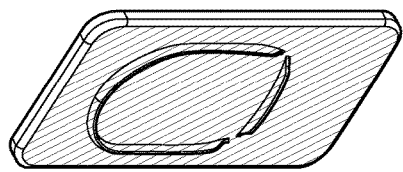
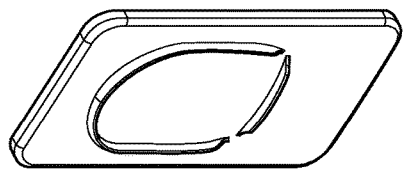
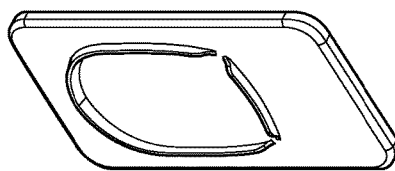
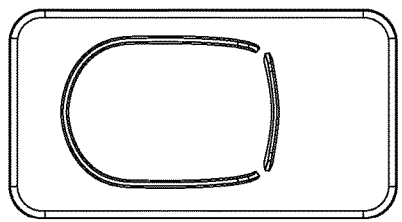
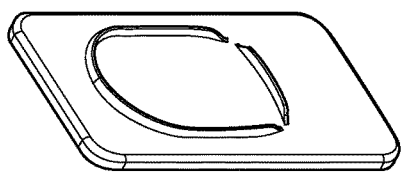
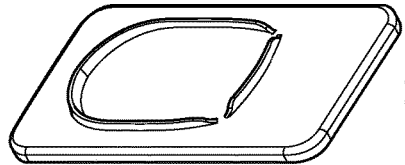
Figure 14A, Figure 14B, Figure 14C, Figure 14D, Figure 14E, Figure 14F, Figure 14G, Figure 14H

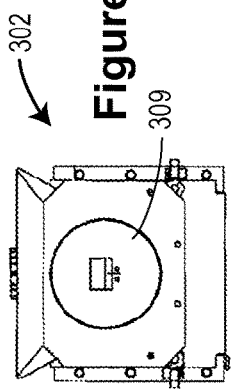
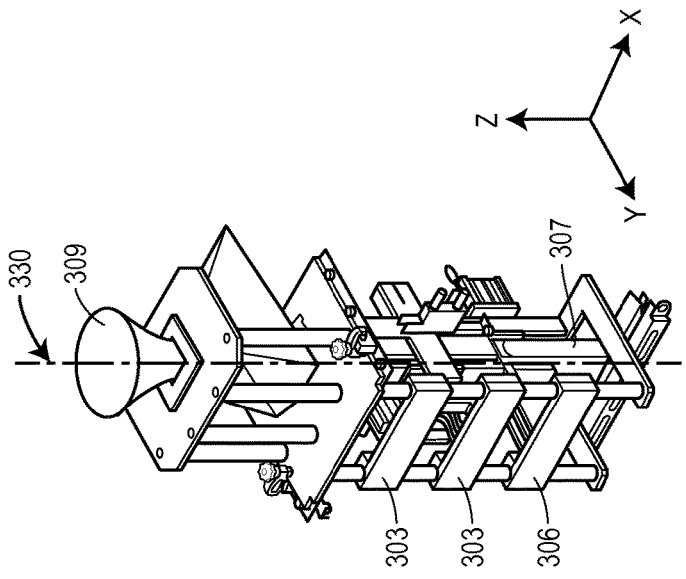
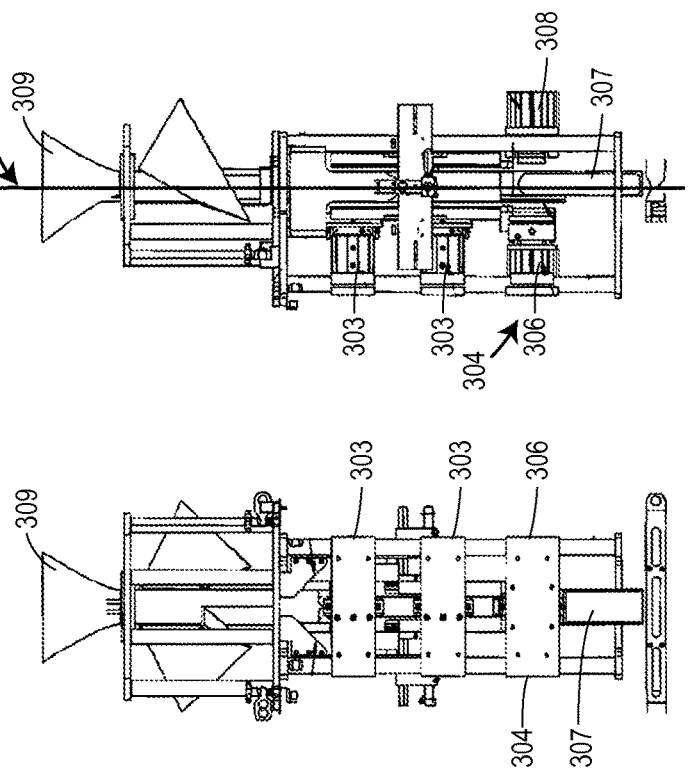

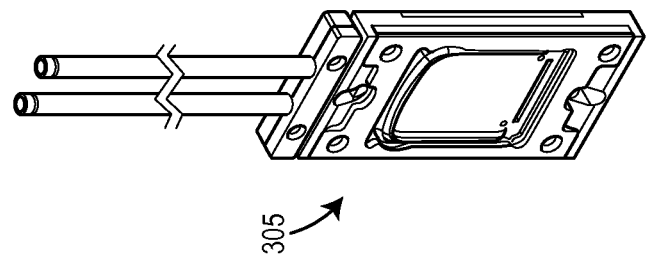
Figure 40D
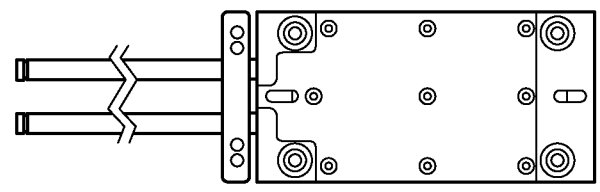
Figure 40E
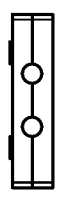
Figure 40A
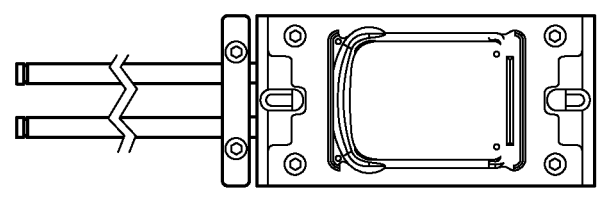
Figure 40B
Figure 40C

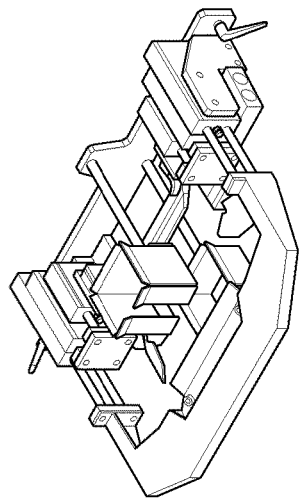
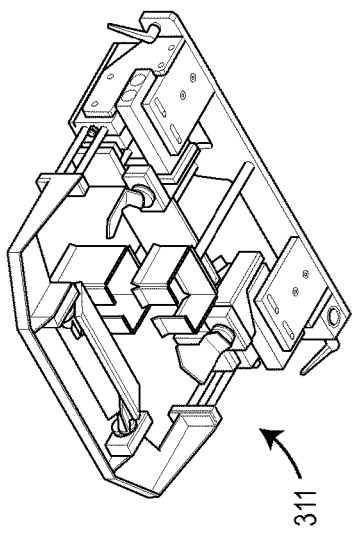
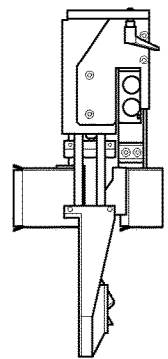
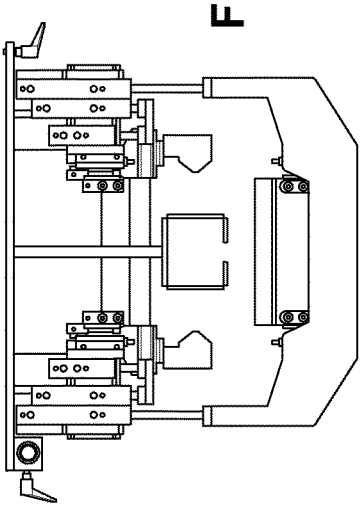
Figure 44A
Figure 44B
Figure 44C
Figure 44D
Figure 44E
Figure 44F

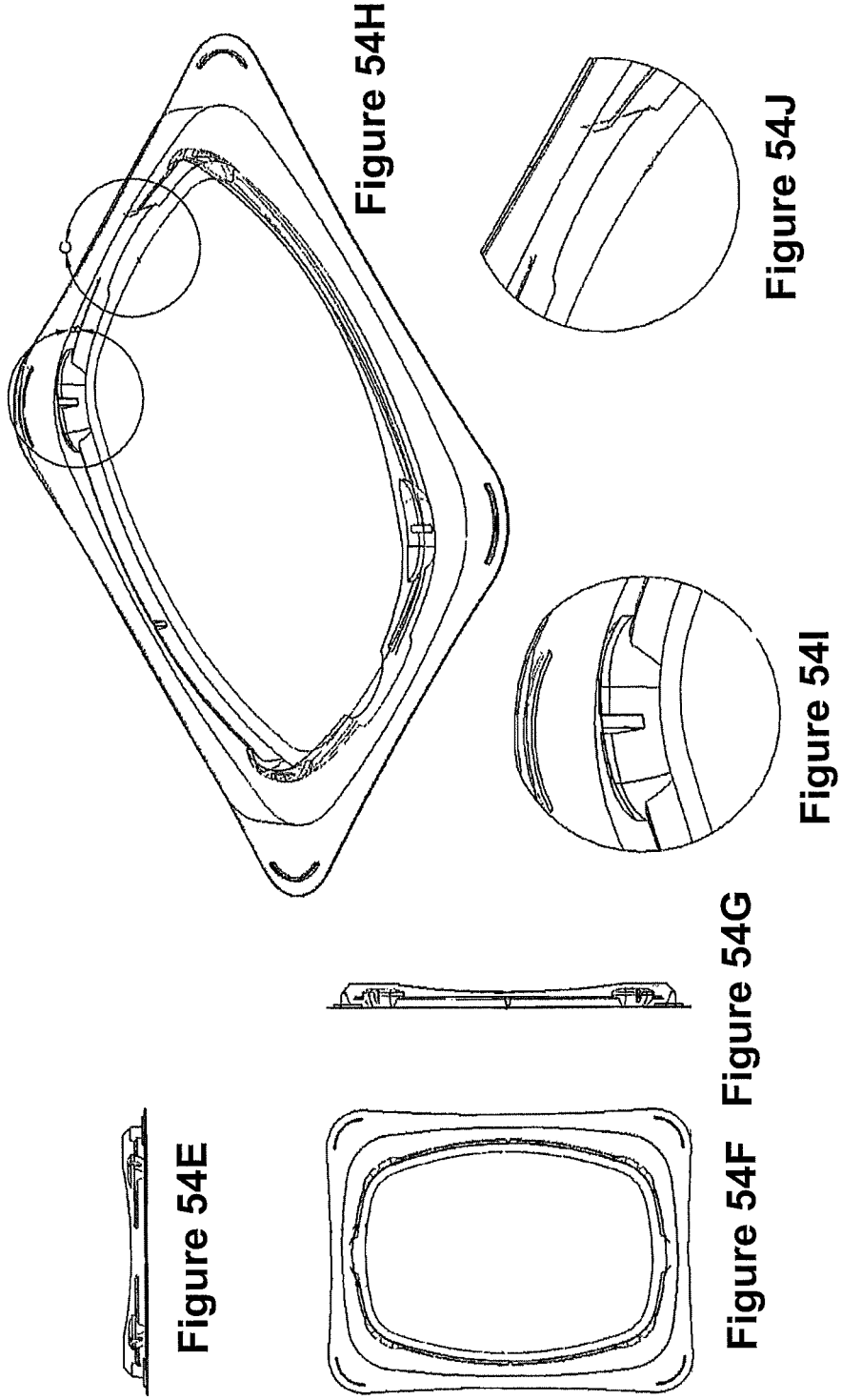

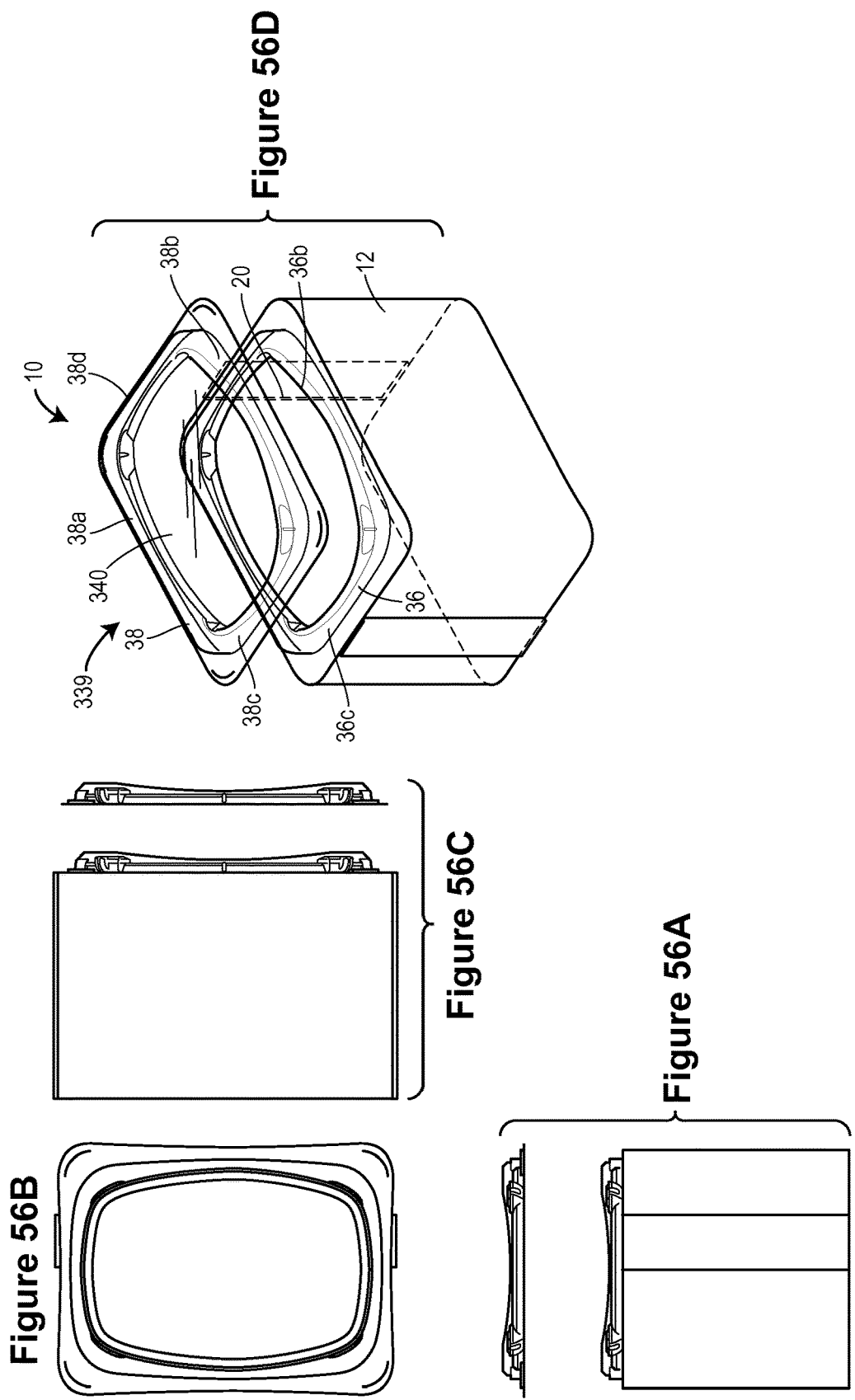

FLEXIBLE PACKAGE AND METHOD OF MAKING SAME

CROSS REFERENCE TO RELATED APPLICATIONS

The benefit under 35 U.S.C. § 119(e) of U.S. Provisional Patent Application Nos. 61/719,340 filed Oct. 26, 2013, 61/739,535 filed Dec. 19, 2012, 61/769,168 filed Feb. 25, 2013, and 61/801,186 filed Mar. 15, 2013, is hereby claimed and the disclosures of are each incorporated herein by reference in their entireties.

FIELD OF THE DISCLOSURE

This disclosure relates generally to packaging, and, more particularly, to a re-closable lid that is secured to a container, and to methods of making the packaging, and flexible materials for forming the same.

BACKGROUND

Re-closable or re-sealable packaging assemblies are commonly used to store food items, liquids, powders, baby wipes, chemicals, detergent, dry goods, pharmaceuticals, nutraceuticals and other packaged products, for example. Typically, the re-closable packaging assemblies include a container portion and a flap portion that covers an opening in the container. An end of the flap portion is secured to the container adjacent to the opening such that a user can pivot or fold the flap portion about the end to expose the opening, thereby allowing the user to access a product contained in an interior volume defined by the walls of the container. The underside of the flap and/or surface of the container covered by the flap in a closed position may have an adhesive coating such that when the flap is in the closed position, the flap releasably adheres to and sealingly engages the container. However, dust, moisture, or other debris, such as powder stored in the container, may adhere to the adhesive coating, and the adhesive coating may subsequently lose the ability, or the strength of the resealability will be substantially reduced, to sealingly engage the container.

A solution to the problem of contamination of the adhesive coating involves securing an injection-molded plastic lid assembly on the container such that the lid assembly is disposed around the opening. To access the interior volume of the container, a lid member is upwardly pivoted about a living hinge of the lid assembly to an open position in which the opening is exposed. To close the lid assembly, the lid member is downwardly pivoted about the living hinge to sealingly engage a base of the lid assembly. While the injection-molded plastic lid assembly is typically not affected by debris, moisture, or dust that gathers on or near the sealing area, the plastic lid assembly may be relatively expensive to produce and may add weight to the re-closable packaging assembly. In addition, attachment of the lid assembly to the container involves a relatively complicated production step that adds time and cost to production.

Accordingly, there exists a need to provide a re-closable packaging assembly that is simple and inexpensive to manufacture, that minimizes production time, and that provides reliable sealing when exposed to contamination.

SUMMARY

A re-closable packaging assembly includes a container (also referred to herein as a "package") formed at least partially by a first sheet, and the container has a plurality of walls that cooperate to define an interior volume. The container has an opening through a least one of the plurality of walls. The re-closable packaging assembly also includes a closure assembly secured to the container adjacent to the opening. The closure assembly at least partially comprises a second sheet and a portion of the first sheet. The closure assembly includes a lid member and a hinge portion. The lid member is pivotable about the hinge portion between a first position in which the lid member releasably engages a first portion of the container surrounding the opening and a second position in which the lid member is pivoted away from the opening about the hinge portion, thereby allowing for a user to access the interior volume through the opening. A first engagement feature may be disposed on the container adjacent to the opening. A second engagement feature may be disposed on the lid member of the closure assembly. The first engagement feature engages the second engagement feature to removably secure the lid member to the container when the lid member is in the first position. The first engagement feature may be integrally formed with the container. The first engagement feature may be formed as a ridge and the second engagement feature may be formed as a channel adapted to receive the ridge, for example.

A method of manufacturing a re-closable packaging assembly comprising a container defining an interior volume is provided, and the method includes providing a first sheet and providing a second sheet secured to a first portion of the first sheet. The method further includes forming a lid member of a closure assembly from a portion of the second sheet such that at least a portion of the lid member is secured to the first portion of the first sheet. A hinge portion of the closure assembly is formed from the second sheet, and the hinge portion is disposed adjacent to the lid member. The lid member is pivotable about the hinge portion between a first position in which the lid member releasably engages a first portion of the container surrounding an opening formed in the first sheet and a second position in which the lid member is pivoted away from a portion of the opening.

BRIEF DESCRIPTION OF THE DRAWINGS

FIGS. 14A to 14H are various views of a mold used to form the first and second engagement features and the hinge portion on the container and the lid member;

FIGS. 33A to 33D include various views of an embodiment of a forming tube assembly of a packaging machine used to manufacture an embodiment of a re-closable packaging assembly 10;

FIGS. 39A to 45F illustrate various components of the embodiment of the forming station of FIG. 38;

FIG. 56A to 56D are various views of a container and a removable lid member;

DETAILED DESCRIPTION

Re-Closeable Packaging Assembly

Figure 1:
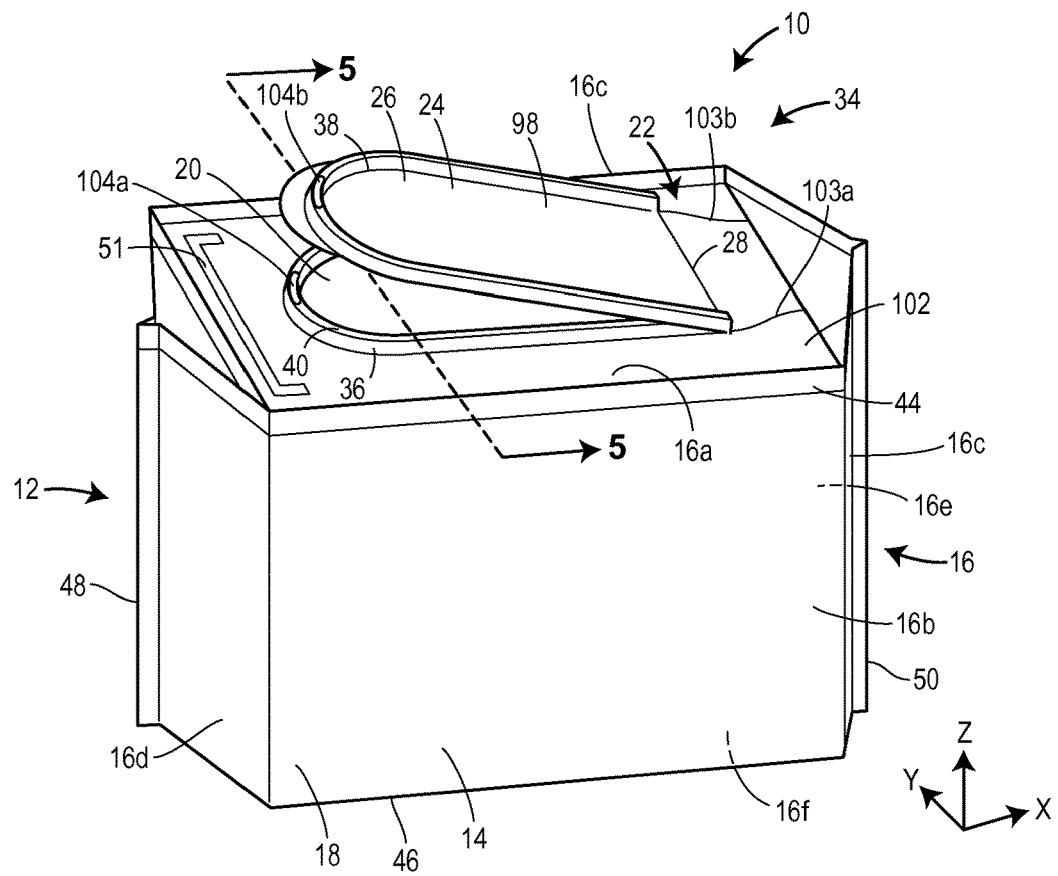
FIG. 1 is an isometric view of an embodiment of a re-closable packaging assembly with a lid member in an open, second position.

As illustrated in FIG. 1, a re-closable packaging assembly 10 includes a container 12 formed at least partially by a first sheet 14 (also called a first film), and the container 12 has a plurality of walls 16 that cooperate to define an interior volume 18. The container 12 has an opening 20 through a least one of the plurality of walls 16. The re-closable packaging assembly 10 also includes a closure assembly 22 secured to the container 12 adjacent to the opening 20 (or an area in which the opening 20 is defined). The closure assembly 22 at least partially comprises a second sheet 24 (also called a second film) and optionally a portion of the first sheet 14 (see FIG. 3). For example, a portion of the first sheet 14 can detach from the first sheet 14 and remain adhered to the second sheet to form an aperture in the first sheet. In other embodiments, a portion of the first sheet 14 can be detached from the remaining portion of the first sheet and discarded rather than adhered to the second sheet 24 to form the aperture.

Figure 2:
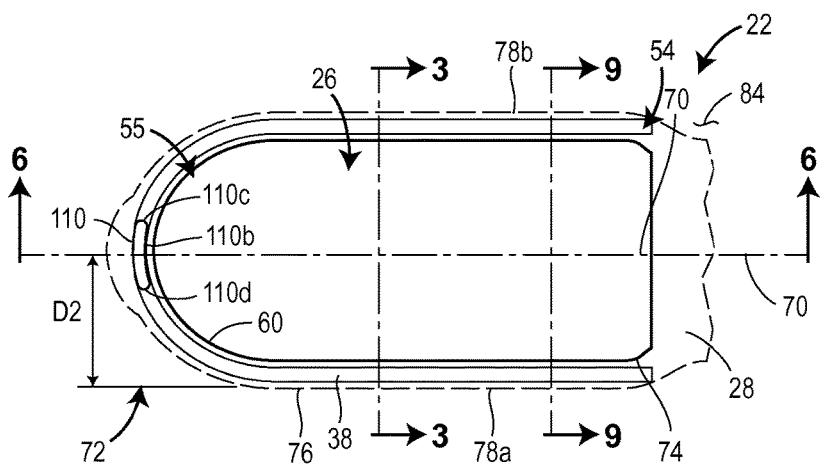
FIG. 2 is a top view of the lid member of the embodiment of the re-closable packaging assembly of FIG. 1.
Figure 3:
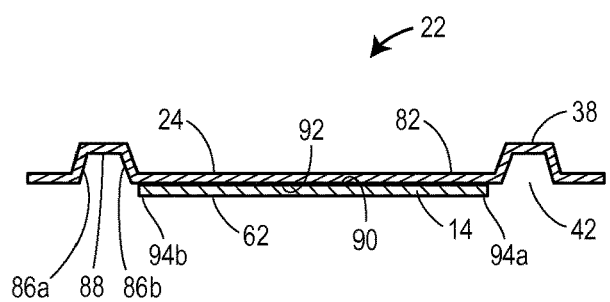
FIG. 3 is a sectional view of the lid member taken along line 3-3 of FIG. 2.

In one embodiment, the closure assembly 22 includes a lid member 26 and a hinge portion 28. The lid member 26 is pivotable about the hinge portion 28 between a first position 30 (illustrated in FIG. 4) in which the lid member 26 releasably engages a first portion 32 of the container 12 surrounding the opening 20 and a second position 34 (illustrated in FIG. 1) in which the lid member 26 is pivoted away from the opening 20 about the hinge portion 28, thereby allowing for a user to access the interior volume 18 through the opening 20. As illustrated in FIGS. 1 and 5, a first engagement feature 36 may be disposed on the container 12 adjacent to the opening 20. As illustrated in FIGS. 1, 2, and 3, a second engagement feature 38 may disposed on the lid member 26 of the closure assembly 22. The first engagement feature 36 engages the second engagement feature 38 to removably secure the lid member 26 to the container 12 when the lid member 26 is in the first position 30. The first engagement feature 36 may be integrally formed with the container 12. As illustrated in FIGS. 1, 3, and 5, the first engagement feature 36 may be formed as a ridge 40 and the second engagement feature 38 may be formed as a channel 42 adapted to receive the ridge 40, for example.

So configured, in a single manufacturing step, the lid member 26, the first engagement feature 36, and the second engagement feature 38 may be formed in the film of the container 12, thereby eliminating the need to attach a separately-fabricated lid assembly that is secured to a container. Because the features are formed in a single process step, and because the separately-fabricated lid assembly is not necessary, one having ordinary skill in the art would recognize that manufacturing time and cost are reduced. Moreover, one having ordinary skill in the art would recognize such features allows for reliable resealing of the lid member 26 to the container 12 by a mechanical closure, which is not degraded by the presence of surface contaminants in the sealing area.

Turning to the container 12 of the re-closable packaging assembly 10 in more detail, the container 12 includes the plurality of walls 16 that cooperate to define the interior volume 18, as illustrated in FIG. 1. The plurality of walls 16 may cooperate to form any suitable shape or combination of shapes. For example, the plurality of walls 16 may include a top wall 16a, a first side wall 16b, a second side wall 16c, a third side wall 16d, a fourth side wall 16e, and a bottom wall 16f. The top wall 16a may be planar or substantially planar and may extend in a horizontal direction (i.e., parallel to the X-Y plane of the reference coordinate system provided in FIG. 1) or a substantially horizontal direction. The bottom wall 16f may be planar or substantially planar may extend in a horizontal direction or a substantially horizontal direction, and the bottom wall 16f may be vertically (i.e., in a direction parallel to of along the Z-axis of the reference coordinate system provided in FIG. 1) offset from the top wall 16a. The first side wall 16b may vertically extend between the top wall 16a and the bottom wall 16f, and the first side wall 16b may be parallel or substantially parallel to the X-Z plane of the reference coordinate system provided in FIG. 1. A first portion of the first side wall 16b may extend vertically beyond the top wall 16a to form a portion of a top ridge wall 44 that extends along and around the perimeter of the top wall 16a. A second portion of the first side wall 16b may extend vertically beyond the bottom wall 16f to form a portion of a bottom ridge wall 46 that extends along and around the perimeter of the bottom wall 16f.

Still referring to FIG. 1, the second side wall 16c may vertically extend between the top wall 16a and the bottom wall 16f, and the first side wall 16b may be offset from the second side wall 16c along the Y-axis of the reference coordinate system provided in FIG. 1. A first portion of the second side wall 16c may extend vertically beyond the top wall 16a to form a portion of the top ridge wall 44. A second portion of the second side wall 16c may extend vertically beyond the bottom wall 16f to form a portion of the bottom ridge wall 46. The third side wall 16d may vertically extend between the top wall 16a and the bottom wall 16f, and the third side wall 16d may be parallel or substantially parallel to the Y-Z plane of the reference coordinate system provided in FIG. 1. A first portion of the third side wall 16d may extend vertically beyond the top wall 16a to form a portion of the top ridge wall 44. A second portion of the third side wall 16d may extend vertically beyond the bottom wall 16f to form a portion of the bottom ridge wall 46. A first sealed edge 48 may vertically extend from the top ridge wall 44 to the bottom ridge wall 46. The third side wall 16d may not be directly attached to the top wall 16a, and a portion of the first sheet 14 making up the top wall 16a may be inserted through a gap between the third side wall 16d and the top wall 16a such that the portion of the first sheet 14 is disposed against a portion of an internal surface of the third side wall 16d (i.e., tucking the portion of the top wall 16a into the gap). Similarly, the third side wall 16d may not be directly attached to the bottom wall 16b, and a portion of the first sheet 14 making up the bottom wall 16b may be inserted through a gap between the third side wall 16d and the bottom wall 16b such that the portion of the first sheet 14 is disposed against a portion of the internal surface of the third side wall 16d (i.e., tucking the portion of the bottom wall 16b into the gap).

Referring again to FIG. 1, the fourth side wall 16e may vertically extend between the top wall 16a and the bottom wall 16f, and the fourth side wall 16e may be parallel or substantially parallel to the Y-Z plane of the reference coordinate system provided in FIG. 1. A first portion of the fourth side wall 16e may extend vertically beyond the top wall 16a to form a portion of the top ridge wall 44. A second portion of the fourth side wall 16e may extend vertically beyond the bottom wall 16f to form a portion of the bottom ridge wall 46. A second sealed edge 50 may vertically extend from the top ridge wall 44 to the bottom ridge wall 46. The fourth side wall 16e may not be directly attached to the top wall 16a, and a portion of the first sheet 14 making up the top wall 16a may be inserted through a gap between the fourth side wall 16e and the top wall 16a such that the portion of the first sheet 14 is disposed against a portion of an internal surface of the fourth side wall 16e (i.e., tucking the portion of the top wall 16a into the gap). Similarly, the fourth side wall 16e may not be directly attached to the bottom wall 16b, and a portion of the first sheet 14 making up the bottom wall 16b may be inserted through a gap between the fourth side wall 16e and the bottom wall 16b such that the portion of the first sheet 14 is disposed against a portion of the internal surface of the fourth side wall 16e (i.e., tucking the portion of the bottom wall 16b into the gap).

The plurality of walls 16 of the container 12 may cooperate to form any suitable shape or combination of shapes that form a sealed or partially sealed enclosure. In other contemplated embodiments, for example, the plurality of walls 16 may form a substantially elongated tubular shape. The container 12 may include any container known in the art, such as quad-sealed packaging, Horizontal Flow Wrap Packages (such as those manufactured by Ilapak, Hayssen-Sandiacre, Bosch, or Doboy), Vertical-Form-Fill Seal "Pillow" style bags (such as those manufactured by Hayssen, Ilapak, Bosch, or Triangle), Horizontal-Form-Fill-Seal packages included a formed bottom and a lidding material (such as those manufactured by Multivac or Tiromat), Stand-Up Pouches (such as those manufactured by KHS-Bartelt or Laudenberg), and tray sealing equipment such as such as those manufactured by Pack-Line, Osgood or Modern.

An exemplary quad seal package and methods of folding a quad seal package which can be used as the container for the packages of the disclosure is described in U.S. Patent Application Publication No. 2012/0312868, the disclosure of which is incorporated herein by reference in its entirety. Such quad seal packages can include corner seals that extend and surround one or more panels of the package. For example, the package can include a top wall in which the opening is disposed and an oppositely disposed bottom wall. Corners seals can extend from and surround one or both of the top and bottom walls. In alternative embodiments, the corner seals can extend from one or more of the side walls.

Figure 26:
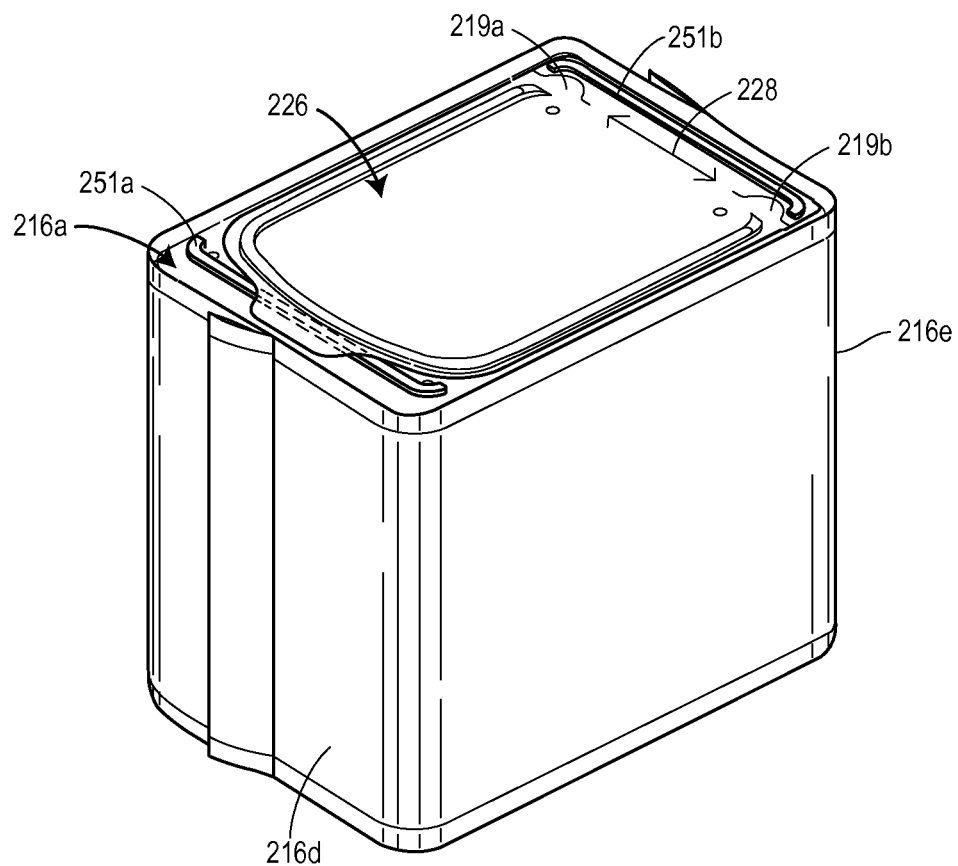
FIG. 26 is a perspective view of a container in accordance with an embodiment of the disclosure.

As illustrated in FIG. 1, one or more ribs 51 may be formed along one or more surfaces of the container 12. For example, a rib 51 may extend along the top wall 16a of the container 12 adjacent to and aligned with the third side wall 16d of the container. In some embodiments, as illustrated in FIG. 26, for example, a first rib 251a may extend along the top wall 216a of the container adjacent to and aligned with the third side wall 216d and a second rib 251b may extend along the top wall 216a of the container adjacent to and aligned with the fourth side wall 216e. The one or more ribs 51 may be formed as an elongated protrusion that upwardly extends from the top wall 16a of the container 12, and the protrusion may provide stiffness to a desired area of the container 12. In addition, one or more ribs 51 may extend along all or part of one or more of the side walls 16b-d of the container 12 and upwardly from the wall of the container as described above with respect to the top wall. In various embodiments, the one or more ribs 51 can be formed in the wall containing the closure assembly 22 as well as on one or more of the walls adjacent to the panel having the closure assembly. The one or more ribs 51 may be formed in a thermoforming operation that will be described in more detail below.

Figure 7:
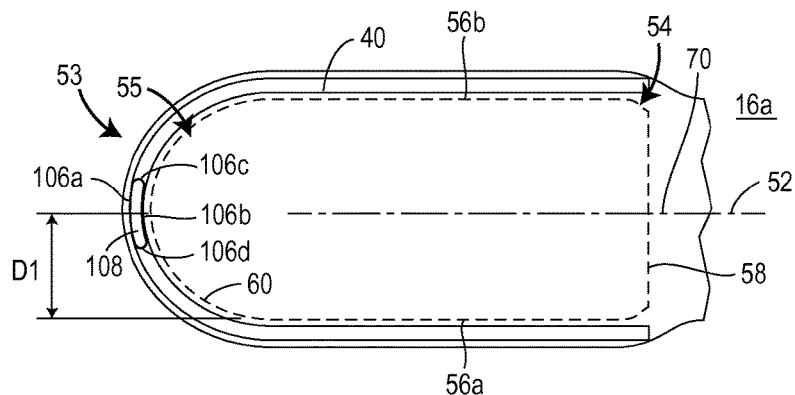
FIG. 7 is a top view of a top wall of the container of the embodiment of the re-closable packaging assembly of FIG. 1.

As illustrated in FIG. 1, the container 12 includes the opening 20 through at least one of the plurality of walls 16. The opening 20 may be disposed through any suitable wall or walls of the plurality of walls 16. For example, the opening 20 may be disposed through the top wall 16a (i.e., an access panel or opening panel), as illustrated in FIG. 1. As used herein, the term opening panel is used to describe any panel in which the opening is formed or defined. The opening 20 may have any suitable shape or combination of shapes to allow a user to access the interior volume 18 through the opening 20. For example, as illustrated in FIGS. 1 and 7, the opening 20 may have an elongated shape that extends along a horizontal opening axis 52 that is parallel to the X-axis of the reference coordinate system of FIG. 1. The opening axis 52 may extend from a first end 53 of the opening 20 to a second end 54 that is opposite the first end 53, and the opening axis 52 may at least partially extend along or adjacent to a top surface of the first sheet 14 comprising the top wall 16a. The opening axis 52 may be equidistant from the first side wall 16b and the second side wall 16c when viewed along the Z-axis of the reference coordinate system of FIG. 1. The perimeter of the opening 20 may be defined by an opening edge 55 that may include one or more segments. For example, the opening edge 55 may include a first side edge 56a and a second side edge 56b, and each of the first side edge 56a and the second side edge 56b may be parallel to and equidistantly offset from the opening axis 52. Each of the first side edge 56a and the second side edge 56b may be disposed a first distance D1 from the opening axis 52. The opening edge 55 may also include an end edge 58 that may extend between a first end of the first side edge 56a and a first end of the second side edge 56b at the second end 54 of the opening 20. A curved front edge 60 may extend from a second end of the first side edge 56a and a second end of the second side edge 56b towards the first end 53 of the opening 20. The front edge 60 may be symmetrically formed about the opening axis 60 and a distance between the front edge 60 and the opening axis 24 may increase from the first end 53 of the opening 20 to the second end of the first and second side edges 56a, 56b. The front edge 60 may have the shape of a portion of a circle, a portion of an oval, or a portion of a parabola, a square, or a rectangle, for example. The front edge 60 may also have a point or chevron (not shown) to create a starting point. The edge surface of the opening edge 55 may be smooth, wavy, scalloped, or have any other suitable texture or shape. The opening 20 can have a symmetrical or an asymmetric shape.

The opening 20 may be formed in a cutting operation. For example, in one embodiment a cutting operation can include forming cuts for the first and second side edges 56a, 56b and the front edge 60 from the first sheet 14, while all or a portion of the end edge 58 may remain integrally secured to the first sheet 14 to form a portion of the hinge portion 28. In such an operation, an underportion 62 of the first sheet 14 is formed that is disposed inward of the first and second side edges 56a, 56b and inward of the front edge 60 (when formed during the cutting operation) and that may be pivotably coupled to the container 12 about the portion of the first sheet 14 at or adjacent to the end edge 58. In alternative embodiments, the opening 20 may be formed in a cutting operation that cuts along the entire opening edge 55. The cutting operation may cut substantially along the entire opening edge 55, and gaps or brides may be provided along the opening edge 55 as desired.

In alternative embodiments, an opening 20 can be defined in the container 12 (such as on the top wall 16a of the container) by forming or defining the underportion 62 in a portion of the top wall 16a such that when the underportion 62 is at least partially removed from the remaining portion of the top wall 16a the opening 20 is defined. That is, the underportion 62 may not be secured to the lid member 26.

This can allow the re-closable packaging assembly 10 to remain sealed, for example, hermetically sealed, until the first use by the users. Such an embodiment can advantageously be utilized to provide a tamper evident packaging assembly 10 in which the user would readily be able to determine if the package 10 was previously opened by observing whether the underportion 62 had been at least partially detached from the container 12. Any other known tamper evident mechanisms can be provided on the container 12 as is known in the art. The underportion 62 may be configured to complete or partially detach from the remaining portion of the container 12. For example, the underportion 62 may be configured to partially detach from the container 12 such that it remains at least partially attached to the container 12. In other embodiments, the underportion 62 can completely detach from the access panel 14.

The underportion 62 may be defined in any suitable way. For example, the underportion 62 (and, by extension) the opening 20) may be defined by a path of reduced strength that allows the underportion 62 to be at least partially detached along the path of reduced strength when a force is applied to pull the underportion 62 away from the remaining portion of the container 12. The path of reduced strength defining the underportion 62 in the container 12 may be provided by any suitable method, including, for example, by laser scoring, mechanical scoring or a similar process for forming perforations in the first sheet 14 without puncturing the sheet, but allowing puncturing if necessary or desired based on the requirements for the re-closable packaging assembly 10 and/or the stored product. Alternatively, blade scoring with approximately 60%-100% penetration, for example, may be used to form a score line defining the underportion 62 instead of individual perforations. In such embodiments, it can be possible to retain a hermetic seal in the container until the first opening of the container as there is not full penetration through the first sheet 14 until the underportion 62 is separated from the first sheet 14. In other embodiments, full penetration through the first sheet 14 may be performed by blade scoring to facilitate detachment of the underportion 62. For example, a continuous blade score with full penetration through the first sheet 14 may be performed with intermittent interruptions or bridges in the score line being provided to hold the underportion 62 in place until the underportion 62 is detached by the user. The distance between the bridges may range from 200 micron to 2.0", and the length of the bridges may fall within the range of 50 microns 2500 microns depending on the implementation.

Other suitable methods of forming a score or perforation to define the opening edge include laser scoring/cutting, laser perforation or micro perforation methods, for example, using dies or knifes.

As illustrated in FIG. 1, the first engagement feature 36 may be disposed on the container 12 adjacent to the opening 20, and the first engagement feature may be integrally formed on or with the container 12. The first engagement feature 36 may be adapted to engage the second engagement feature 38 disposed on the lid member 26 of the closure assembly 22 such that the first engagement feature 36 engages the second engagement feature 38 to removably secure the lid member 26 to the container 12 when the lid member 26 is in the first position 30 illustrated in FIG. 4. The first engagement feature 36 may be any element or combination of elements that engage a corresponding second engagement feature 38 to allow the lid member to releasably engage the container 12. For example, the first engagement feature 36 may be a ridge 40 that may vertically extend upward from the top wall 16a and that may be integrally formed on or with the top wall 16a. The ridge 40 may extend along a ridge axis 64 that has a general U-shape (when viewed along the Z-axis of the reference coordinate system of FIG. 1) and that extends around the opening 20, and the open end of the U-shaped ridge axis 64 may be at or adjacent to the second end 54 of the opening 20. The ridge axis 64 may be outwardly offset a uniform distance from the first side edge 56a, the second side edge 56b, and the front edge 60.

As illustrated in FIGS. 1 and 5, the ridge 40 may be formed in the first sheet 14 and may have any suitable cross-sectional shape or combination of shapes (when viewed along the ridge axis 64). For example, the ridge 40 may include a pair of inwardly-tapering sides 66a, 66b and a top wall 68. The cross-sectional shape of the ridge 40 may be uniform or substantially uniform along the ridge axis 64. However, the ends of the ridge 40 that make up the legs of the U-shape that are adjacent to the second end 54 of the opening 20 may gradually downwardly taper such that the top wall 68 is flush or substantially flush with a top surface of the first sheet 14 (i.e., a top surface of the top wall 16a). Instead of a gradual taper, the ends of the ridge 40 may be chamfered or may be rounded. Alternatively, the ends of the ridge 40 may not taper, and the cross-sectional shape of the ridge 40 may be uniform or substantially uniform along the entire ridge axis 64.

As previously explained, the ridge 40 may be adapted to engage a corresponding channel 42 (see FIG. 3) formed in the lid member 26 of the closure assembly 22 when the lid member 26 is in the first position 30 illustrated in FIG. 4, and the channel 42 will be described in more detail below. Instead of a single ridge 40, the first engagement feature 36 may include two or more ridge segments (not shown) that are not continuous over the length of the ridge axis. That is, gaps may separate the two or more ridge segments, and each of the ridge segments may be adapted to engage a corresponding channel segment or a portion of a channel 42 formed in the lid member 26 of the closure assembly 22 when the lid member 26 is in the first position 30.

As illustrated in FIG. 1, the re-closable packaging assembly 10 also includes the closure assembly 22 secured to the container 12 adjacent to the opening 20 or adjacent to an area in which the opening is defined (as when the underportion 62 acts as a removable seal to cover the opening 20). The closure assembly 22 includes the lid member 26 and the hinge portion 28, and the lid member 26 is pivotable about the hinge portion 28 between the first position 30 and the second position 34. At least a portion of the closure assembly 22 may include the second sheet 24 and a portion of the first sheet 14. More specifically, the lid member 26 may partially include the second sheet 24, and the second sheet may be sized and dimensioned to cover the opening 20 when the lid member 26 is in the first position 30. The second sheet 24 may be any suitable material, such as any of the previously-described materials that may comprise the first sheet 14. Specifically, the second sheet 24 may be PP, PET, or PLA, or any other suitable material. The second sheet 24 may have a uniform thickness, or the thickness may vary. In this first position 30, the lid member 26 may have an elongated shape that extends along a longitudinal lid axis 70 from a first end 72 to a second end 74 that is adjacent to the hinge portion 28, as illustrated in FIGS. 2 and 4. The lid axis 70 may at least partially extend along or adjacent to a bottom surface of the second sheet 24 (and a top surface of the first sheet 14) such that the lid axis 70 is collinear (or substantially collinear) with the opening axis 52 when the lid member 26 is in the first position 30. In alternative embodiments, the lid member 26 of the closure assembly 22 may include only the second sheet 24, and the underportion 62 may remain secured to the container 12 to cover the opening 20 and to act as a seal as previously described.

Figure 8:
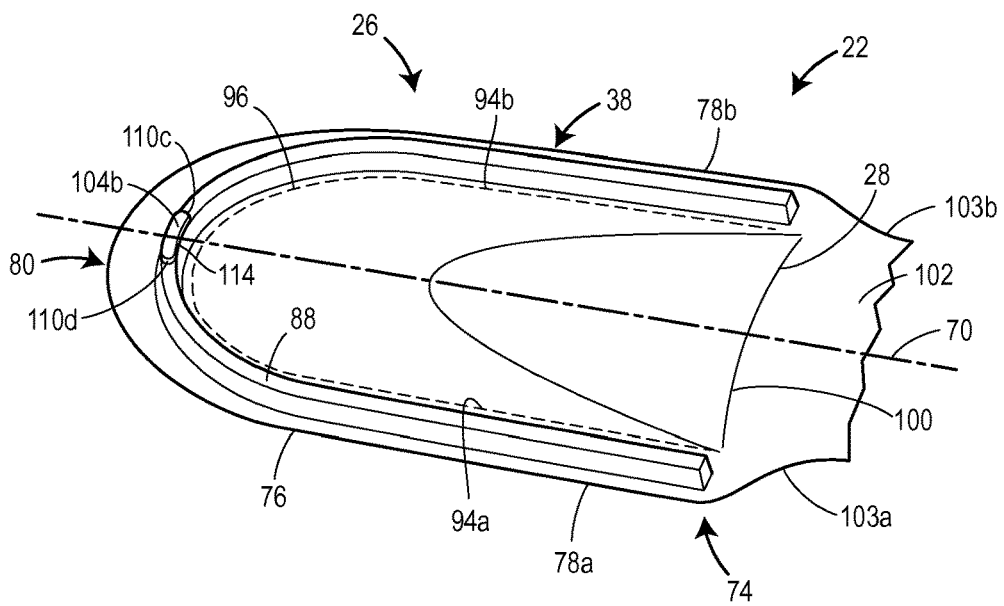
FIG. 8 is an isometric view of a portion of the lid member of the embodiment of the re-closable packaging assembly of FIG. 1.

As illustrated in FIGS. 2 and 8, the lid member 26 may include a lid edge 76 that defines the outer edge (or an outer perimeter edge) of the lid member 26, and the lid edge 76 may include one or more segments. For example, the lid edge 76 may include a first side edge 78a and a second side edge 78b, and each of the first side edge 78a and the second side edge 78b may be parallel to and equidistantly offset from the lid axis 70. Each of the first side edge 78a and the second side edge 78b may be disposed a second distance D2 from the lid axis 70, and the second distance D2 may be greater than the first distance D1 that separates each of the first side edge 56a and the second side edge 56b from the opening axis 52. A first end of the first side edge 78a and a first end of the second side edge 78b may be disposed adjacent to the hinge portion 28 at the second end 54 of the opening 20.

The lid edge 76 may also include a curved front edge 80 that extends from a second end of the first side edge 78a and a second end of the second side edge 56b towards the first end 53 of the opening 20. The front edge 80 may be symmetrically formed about the lid axis 60 and a distance between the front edge 80 and the lid axis 70 may increase from the first end 72 of the lid member 26 to the second end of the first and second side edges 78a, 78b. The front edge 80 may have the same or substantially the same general shape as the front edge 60 of the opening 20. That is, the front edge 80 may have the shape of a portion of a circle, a portion of an oval, or a portion of a parabola, a square, or a rectangle, for example. The front edge 80 may be outwardly offset from the front edge 60 of the opening, and the distance of offset may be uniform. For example, the offset distance may be the difference between the second distance D2 of the lid member 26 and the first difference D1 of the opening 20. The front edge 80 may include a pull tab 117 (illustrated in FIGS. 20A and 20B) that projects away from the second engagement feature 38 to facilitate the opening and closing of the lid member 26 by a user.

Figure 4:
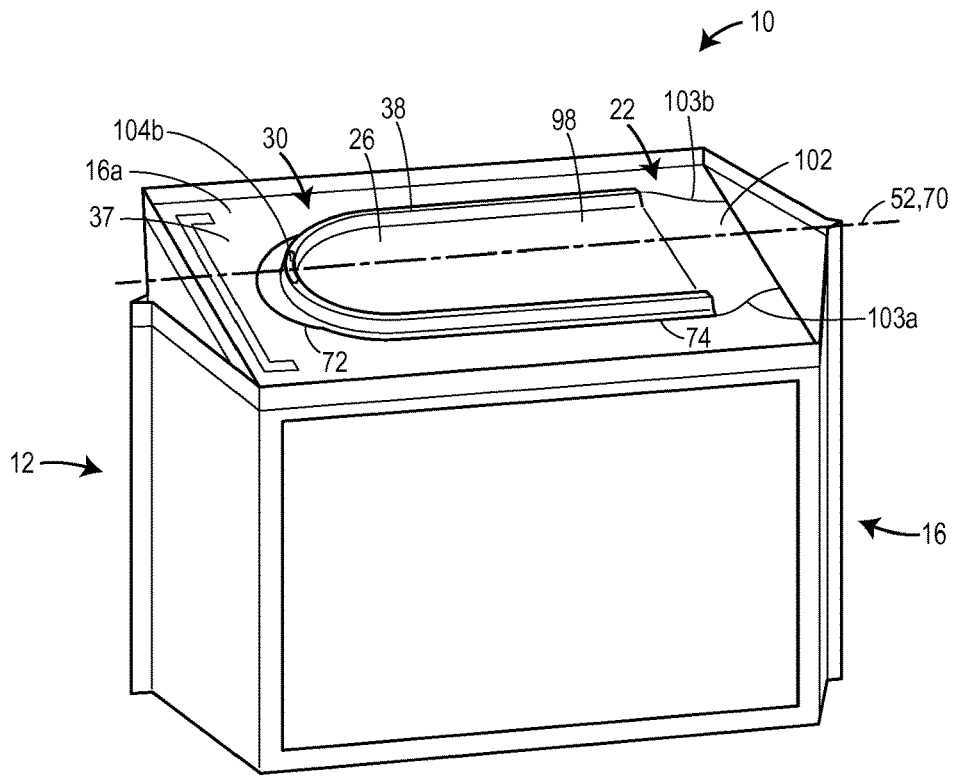
FIG. 4 is an isometric view of the embodiment of the re-closable packaging assembly of FIG. 1 with the lid member in a closed, first position.
Figure 5:
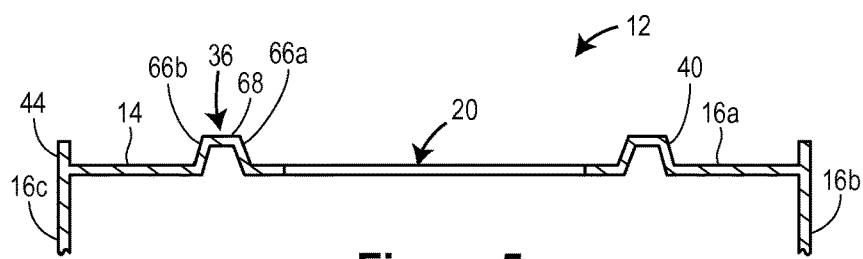
FIG. 5 is a sectional view of the top wall of a container taken along line 5-5 of FIG. 4.

As illustrated in FIGS. 2, 3, 4, and 8, the lid member 26 of the closure assembly 22 includes the second engagement feature 38 adapted to engage the first engagement feature 36 disposed on the container 12 to removably secure the lid member 26 to the container 12 when the lid member 26 is in the first position 30 illustrated in FIG. 4, and the second engagement feature 38 may be integrally formed on or with the lid member 26. The second engagement feature 38 may be any element or combination of elements that engage a corresponding first engagement feature 36 to allow the lid member to sealingly engage the container 12. For example, the second engagement feature 38 may be a channel 42 adapted to receive the ridge 40 formed on the top wall 16a of the container 12. As illustrated in FIG. 3, the channel 42 may vertically extend upward (or substantially vertically upward) from a first surface 82 of the second sheet 24, and, as shown in FIG. 2, the channel may extend along a channel axis 84. The channel axis 84 may have a general U-shape, and the open end of the U-shaped channel axis 84 may be at or adjacent to the second end 74 of the lid member 26. The channel axis 84 may be inwardly offset a uniform distance from the first side edge 78a, the second side edge 78b, and the front edge 80 of the lid member 26. The channel axis 84 may overlap or substantially overlap (i.e., have the same shape, dimension, and relative position) the ridge axis 64 when viewed along the Z-axis of the reference coordinate system of FIG. 1 when the lid member 26 is in the first position 30. The channel 42 may have a uniform or substantially uniform cross-sectional shape along the channel axis 84. Alternatively, the channel 42 may have a non-uniform cross-sectional shape.

Referring to FIG. 3, the channel 42 may be formed in the first sheet 14 and may have any suitable cross-sectional shape or combination of shapes (when viewed along the channel axis 84). For example, the channel 42 may include a pair of inwardly-tapering surfaces 86a, 86b and a bottom surface 88, and the surfaces 86a, 86b, 88 are adapted to contact or be adjacent to a corresponding surface of the ridge 40 (i.e., the inwardly-tapering sides 66a, 66b and a top wall 68, respectively), when the lid member 26 is in the first position 30. The cross-sectional shape of the channel 42 may be uniform or substantially uniform along the channel axis 84, and may correspond to the cross-sectional shape of the ridge 40 along the ridge axis 64. The ends of the channel 42 that make up the legs of the U-shape that are adjacent to the second end 74 of the lid member 26 may gradually taper to receive the corresponding tapered ends of the ridge 40.

Instead of a single channel 42, the second engagement feature 38 may include two or more channel segments (not shown) that are not continuous over the length of the channel axis 84. Each of these channel segments may correspond to a previously-described ridge segments formed on the top wall 16a of the container 12 such that each of the ridge segments may be adapted to engage a corresponding channel segment or a portion of a channel 42 formed in the lid member 26 of the closure assembly 22 when the lid member 26 is in the first position 30.

In an alternative embodiment, the first engagement feature 36 may be a channel 42 that may vertically extend downward from the top wall 16a of the container 12, and the second engagement feature 38 may be ridge 40 that may vertically extend downward from the lid member 26 of the closure assembly 22. In the first position 30, the ridge 40 may be received into the channel 42 to allow the lid member to sealingly engage the container 12.

Referring to FIG. 3, the underportion 62 of the first sheet 14 may be at least partially secured to the second sheet 24 of the lid member 26. More specifically, all or a portion of a first surface 90 of the underportion 62 may be secured to all or a portion of a second surface 92 of the second sheet 24 of lid member 26. Preferably, the entire first surface 90 of the underportion 62 may be secured to a portion of the second surface 92 of the lid member 26. The underportion 62 may be secured to the second sheet 24 of the lid member 26 in any manner known in the art, such as by the use of an adhesive, heat sealing, ultra-sonic sealing, etc. Suitable adhesives may be pressure sensitive acrylics, two-part dry bond, single component polyurethanes, and thermally activated, for example. Because the underportion 62 may be formed in the cutting operation that forms the opening 20, the underportion 62 may have dimensions that are equal or substantially equal to corresponding dimensions of the opening 20. Specifically, the underportion 62 may have first and second side edges 94a, 94b that dimensionally correspond to the first and second side edges 56a, 56b of the opening 20 and a front edge 96 that dimensionally corresponds to the front edge 60, as illustrated in FIGS. 2, 3, 6, and FIG. 8. In the first position 30, a longitudinal axis of the underportion 62 may be collinear with the opening axis 52, and the underportion 62 may be symmetrically formed about the longitudinal axis.

Figure 6:
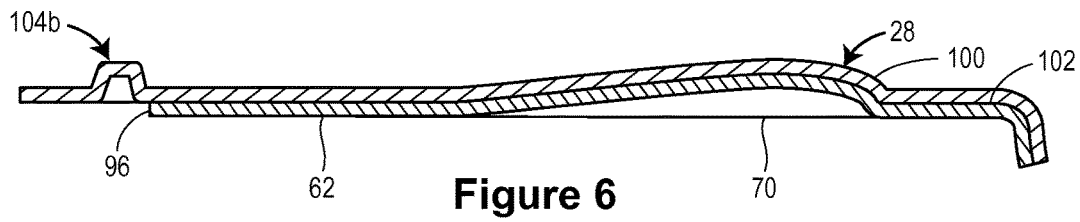
FIG. 6 is a sectional view of the lid member taken along line 6-6 of FIG. 2.

As illustrated in FIGS. 1, 6, and 8, the lid member 26 of the closure assembly 22 may include a convex portion 98 to provide structural support to the lid member 26. The convex portion 98 may extend from the second end 74 of the lid member 26 towards the first end 72, and a back edge 100 of the convex portion 98 adjacent to the second end 74 may comprise a portion of the hinge portion 28. More specifically, the lid member 26 may pivot about the back edge 100 of the convex portion to displace from the first position 30 to the second position 34. The back edge 100 may have the shape of a portion of an arc when viewed along the Z-axis, and the shape of the back edge 100 coupled with the shape of the convex portion 98 cooperate to maintain the lid member 26 in a rigidly erect position when in the second position 34. For example, the lid axis 70 may form an angle between 45 degrees and 125 degrees with the opening axis 52 when the lid member 26 is in the second position 34. Instead of an arc, the back edge 100 may include a plurality of arc segments or linear segments that form a zigzag pattern.

Figure 9:
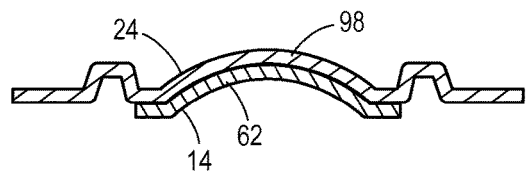
FIG. 9 is a sectional view of the lid member taken along line 9-9 of FIG. 2.

Referring again to FIGS. 1, 6, and 8, the convex portion 98 may have a parabolic shape or a substantially parabolic shape when viewed along the Z-axis of the reference coordinate system of FIG. 1. The convex portion 98 may be symmetrically formed along the lid axis 70, and the distance between a top surface of the first sheet 14 comprising the convex portion 98 and the lid axis 70 may gradually decrease as the convex portion 98 extends from the second end 74 of the lid member 26 towards the first end 72, as illustrated in FIG. 6. In addition, when view in cross-section along the lid axis 70; the convex portion 98 may have a curved or substantially curved shape. For example, the distance between a top surface of the first sheet 14 comprising the convex portion 98 and the lid axis 70 may gradually decrease as the convex portion 98 extends from the lid axis 70 towards the each of the first and second side edge 78a, 78b, as illustrated in FIG. 9. In alternative embodiments, the convex portion 98 may be have a generally triangle shape when viewed along the Z-axis of the reference coordinate system of FIG. 1, as provided in the illustrations of the thermoforming molds of FIGS. 17A to 17J.

Referring now to FIG. 1, the closure assembly 22 may include a support portion 102 that extends from the second end 74 of the lid member 26 towards the fourth side wall 16e of the container 12, and a portion of the support portion 102 adjacent to the second end 74 of the lid member 26 may comprise a portion of the hinge portion 28. The support portion 102 may be formed from the second sheet 24, and the all or a portion of the second sheet 24 of the support portion 102 may be secured to a portion of the first sheet 14 (e.g., the top wall 16a of the container 12) adjacent to the fourth side wall 16e of the container 12. The support portion 102 may structurally secure the lid member 26 to the container 12 and allow the lid member 26 to pivot about the hinge portion 28. A portion of the support portion 102 (either or both of the first sheet 14 and the second sheet 24) may extend from the hinge portion 28 through the gap between the fourth side wall 16e and the top wall 16a such that the portion of the first sheet 14 is disposed against a portion of the internal surface of the fourth side wall 16e. The support portion 102 may be partially defined by a pair of lateral edges 103a, 103b that may extend parallel to or substantially parallel to the first and second side edges 78a, 78b when the lid member 26 is in the first position 30. However, the distance between each of the pair of lateral edges 103a, 103b and the lid axis 70 may be less than the distance between the first and second side edges 78a, 78b and the lid axis 70.

Figure 10:
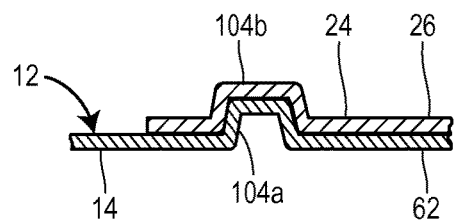
FIG. 10 is a partial sectional view of the first securement feature and the second securement feature of the embodiment of the re-closable packaging assembly of FIG. 1.
Figure 11A:
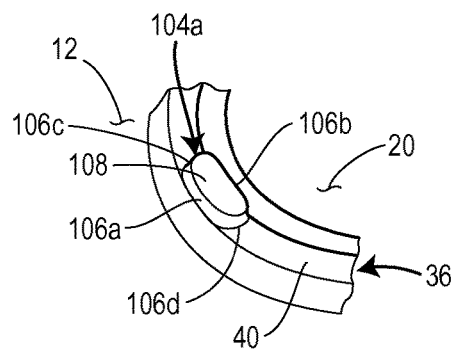
FIG. 11A is a partial isometric view of the first securement feature of the embodiment of the re-closable packaging assembly of FIG. 1.

As illustrated in FIGS. 1, 4, 6 and 7, the re-closable packaging assembly 10 may also include a first securement feature 104a and a second securement feature 104b. The first securement feature 104a may be a protrusion formed on the container 12, and the second securement feature 104b may be a cavity formed on the lid member 26 that is adapted to receive the first securement feature 104a, as illustrated in FIG. 10. More specifically, the first securement feature 104a may be an elongated protrusion formed along a portion of the ridge axis 64, and the protrusion may have a plurality of side walls 106a-d that extend vertically beyond the top wall 68 of the ridge 40, as shown in FIG. 11A. The first side wall 106a and oppositely-disposed second side wall 106b may be curved to correspond to the contour of the ridge axis 64, and the third 106c and fourth side walls 106d may each extend between the first 106a and second side wall 106b. The third 106c and fourth side walls 106d may have any suitable cross-sectional shape, such as curved, linear, a chevron, a triangle, or partially curved. A top surface 108 may be parallel or substantially parallel to and vertically offset from the top wall 68 of the ridge 40. All or part of any or all of the plurality of side walls 106a-d may be formed as an undercut. That is, the one or more side walls 106a-d or a portion of the one or more side walls 106a-d may form an acute angle with the top surface of the top wall 16a (i.e., the first sheet 14) of the container 12. Such an undercut will allow the lid member 26 to "positively" secure to the container 12. The undercut may also be formed on or into the first ridge 40.

Figure 11B:
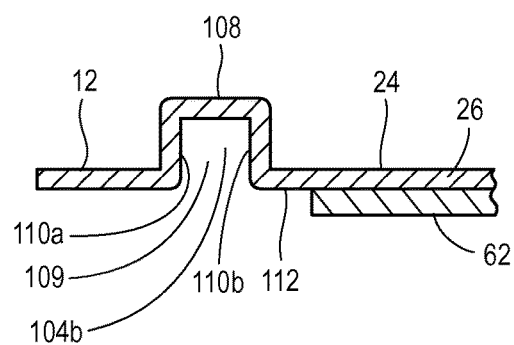
FIG. 11B is a partial sectional view of the second securement feature of the embodiment of the re-closable packaging assembly of FIG. 1.

As previously explained, the second securement feature 104b may be a cavity formed on the lid member 26. More specifically, the second securement feature 104b may be an elongated cavity 109 formed on an underside of a protrusion formed along a portion of the channel axis 84, and the cavity 109 may be adapted to receive the first securement feature 104a. As illustrated in FIGS. 2 and 11B, the cavity 109 may have a plurality of side surfaces 110a-d that each extend vertically upwards from a bottom surface 112 of the second sheet 24 of the lid member 26. A first side surface 110a and an oppositely-disposed second side surface 110b may be curved or contoured to correspond to the curved shape of the first side wall 106a and the second side wall 106b, respectively of the first securement feature 104a. Similarly, a third side surface 110c and a fourth side surface 110d may be shaped to correspond to the shape of the third 106c and fourth side walls 106d of the first securement feature 104a.

Referring to FIGS. 2, 8, and 11B, a top surface 114 may be parallel or substantially parallel to and vertically offset from the bottom surface 88 of the channel 42, and a vertical distance between the top surface 114 and the bottom surface 112 of the second sheet 24 of the lid member 26 may be greater than a vertical distance between the bottom surface 88 of the channel 42 and the bottom surface 112 of the second sheet 24. The first securement feature 104a may be dimensioned and sized such that the first securement feature 104a may be engaged (e.g., be received into) the second securement feature 104b to allow the lid member 26 to sealingly engage the container 12. All or part of any or all of the plurality of side surfaces 110a-d may be formed as an undercut. That is, the one or more side surfaces 110a-d or a portion of the one or more side surfaces 110a-d may form an acute angle with the bottom surface 112 of the second sheet 24 of the lid member 26. The undercut of the first securement feature 104a may engage a corresponding undercut on the second securement feature 104b to releasably lock or secure the lid member 26 to the container 12. Instead of an acute angle, a portion of the one or more side surfaces 110a-d may include a detent that starts 0.050" from the top surface 108, proceeds down and inward at a 45° angle for about 0.070", and transitions downward for 0.050", then down and outward at 35°. These dimensions are for illustrative purposes only, other dimensions may be suitable. One having ordinary skill in the art would recognize that a corresponding similar detent or protrusion may be formed on or in the first securement feature 104a.

In alternative embodiments, the first securement feature 104a may be a cavity formed in a channel 42 that may vertically extend downward from the top wall 16a of the container 12, and the second securement feature 104b may be a protrusion that may extend downwardly from the lid member 26 of the closure assembly 22. In the first position 30, the protrusion may be received into the cavity to allow the lid member to sealingly engage the container 12.

Figure 20A:
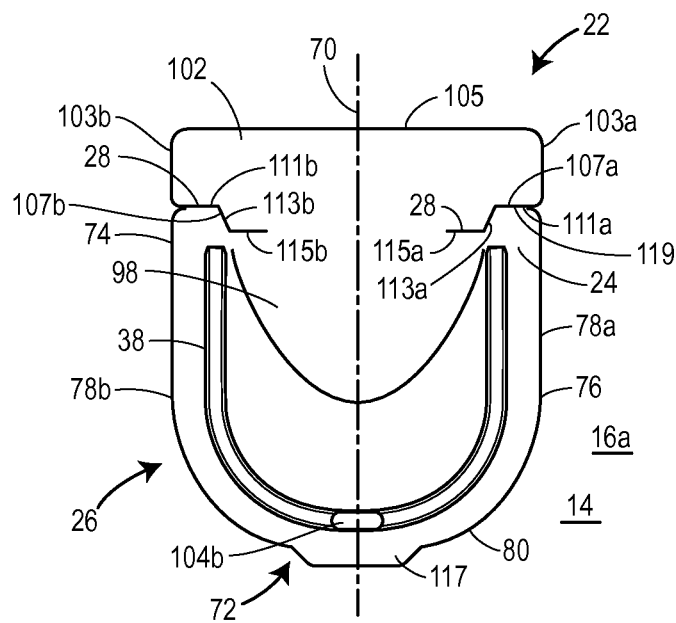
FIG. 20A is a top view of a closure assembly of a container of an embodiment of a re-closable packaging assembly.
Figure 20B:
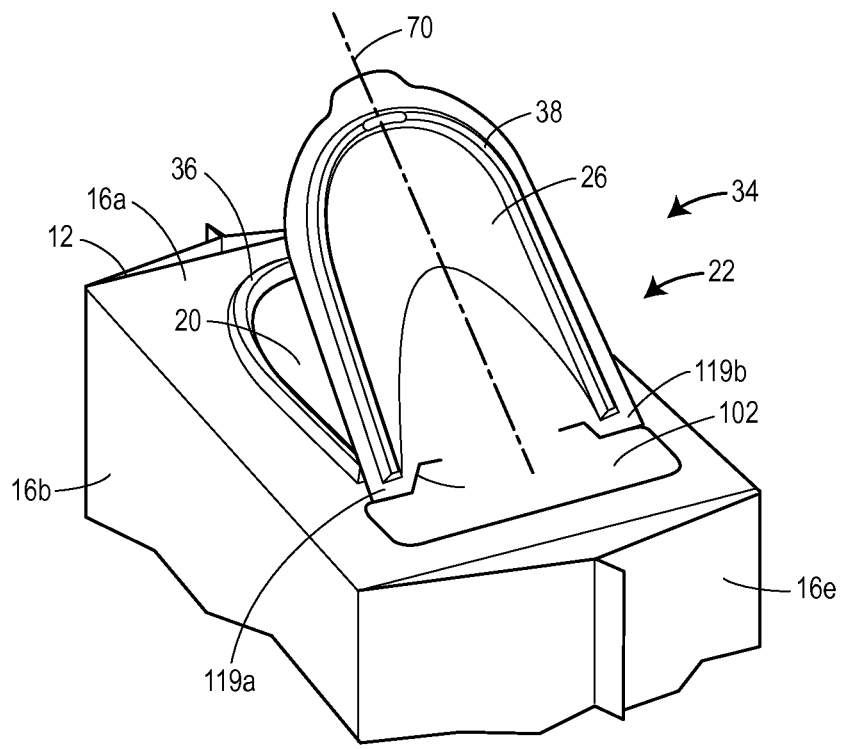
FIG. 20B is an isometric view of the closure assembly of the re-closable packaging assembly of FIG. 20A in a second position.
Figure 21:
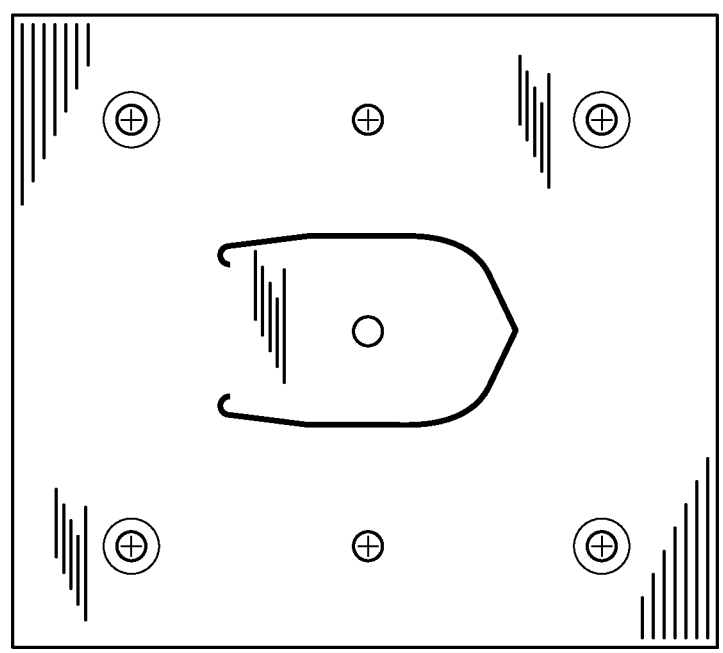
FIG. 21 is an example forming die for an embodiment of the re-closable packaging assembly.
Figure 22:
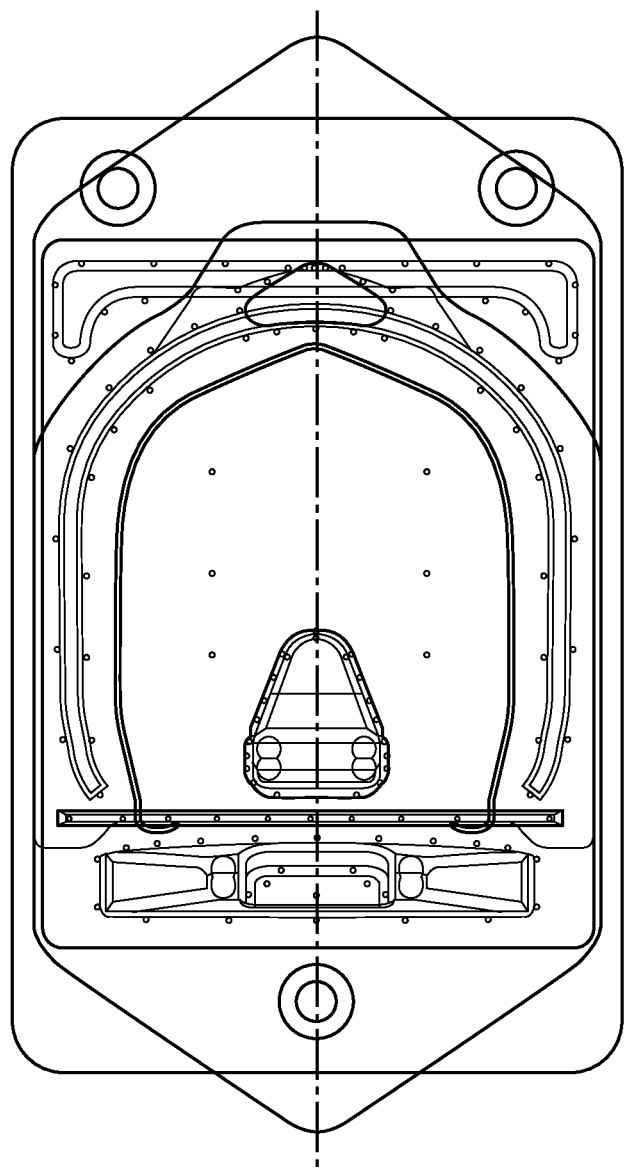
FIG. 22 is an example forming die for an embodiment of the re-closable packaging assembly.
Figure 23:
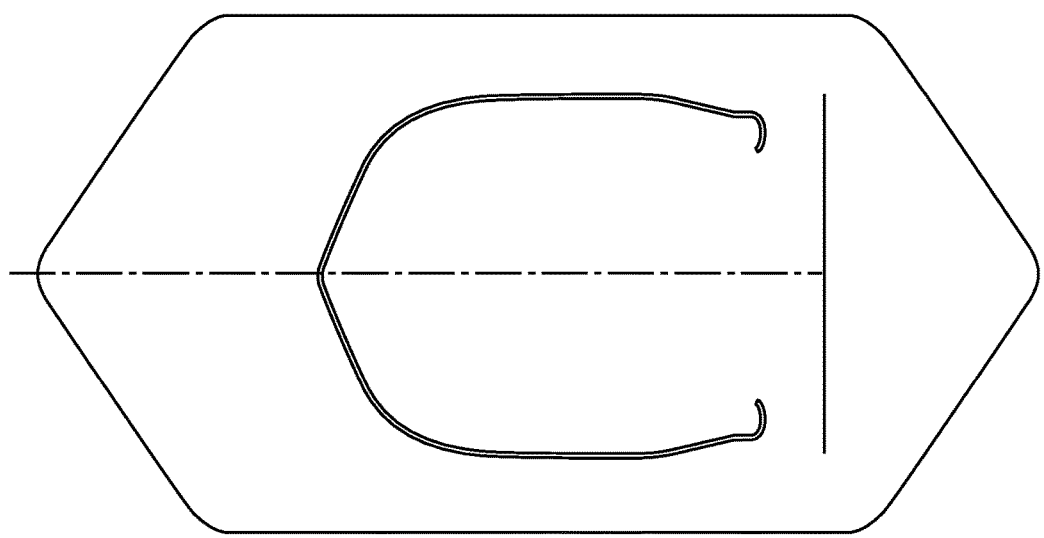
FIG. 23 is an example forming die for an embodiment of the re-closable packaging assembly.
Figure 24:
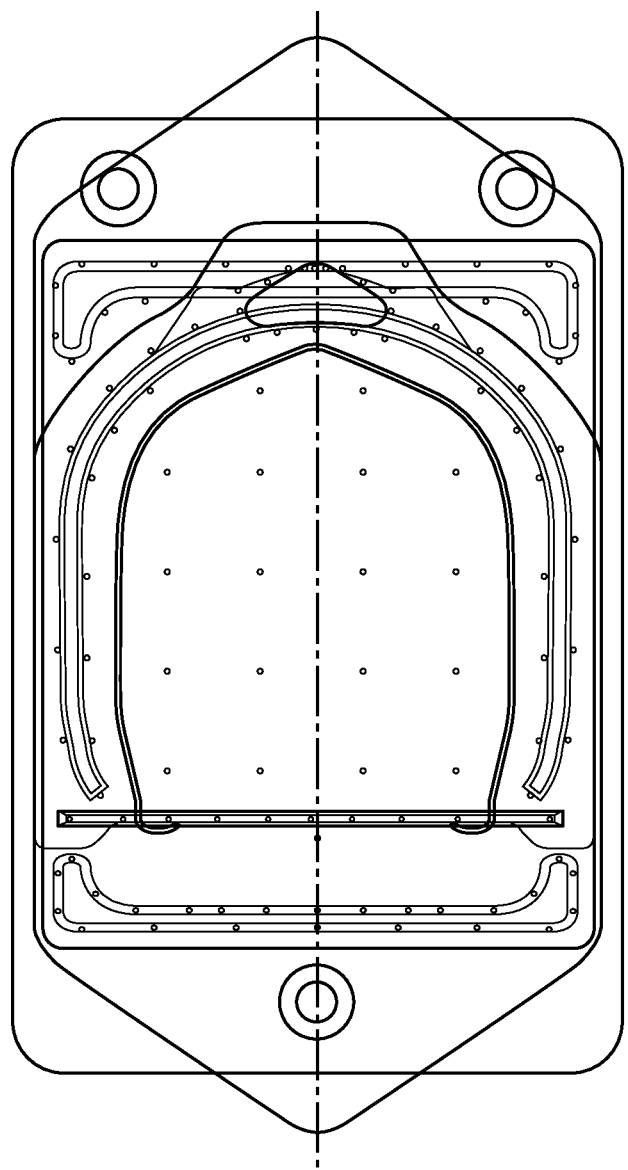
FIG. 24 is an example forming die for an embodiment of the re-closable packaging assembly.
Figure 25:
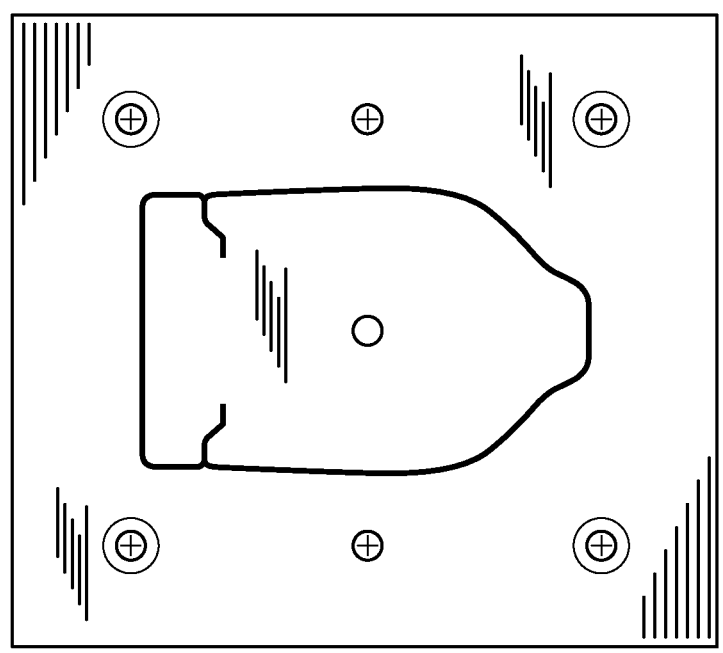
FIG. 25 is an example forming die for an embodiment of the re-closable packaging assembly.

An alternative closure assembly 22 is illustrated in FIGS. 20A and 20B. In this embodiment, the support portion 102 may be at least partially disposed on or secured to the top wall 16a of the container 12. When viewed parallel to the Z-axis of the reference coordinate system of FIG. 1, the support portion 102 may be defined by a pair of parallel lateral edges 103a, 103b, and a rear edge 105 extends between the lateral edges 103a, 103b such that the support portion 102 is disposed on the top wall 16a. Alternatively, a portion of the support portion 102 may be inserted through a gap between the top wall 16a and the fourth side wall 16e. The hinge portion 28 may include a pair of oppositely-disposed cuts 107a, 107b that may inwardly extend from each of the pair of parallel lateral edges 103a, 103b (and inward from the first and second side edges 78a, 78b of the lid member 26 adjacent to the second end 74 of the lid member 26). The cuts 107a, 107b may be symmetrical about the lid axis 70. Each of the cuts 107a, 107b may include a first segment 111a, 111b normal to the corresponding lateral edge 103a, 103b. A second segment 113a, 113b may obliquely extend from an end of the first segment 111a, 111b towards the first end 72 of the lid member 26. A third segment 115a, 115b may inwardly extend from a corresponding end of the second segment 113a, 113b parallel to the first segment 111a, 111b. A terminal end of the third segment 115a, 115b may be disposed a suitable distance from the lid axis 70 such that the lid member 26 may pivot from a first position 30 to the second position 34 about a portion of the closure member extending between a terminal end of each of the cuts 107a, 107b (i.e., a terminal end of each of the third segments 115a, 115b). Specifically, the lid member 26 may pivot from a first position 30 to the second position 34 about a crease or fold (that may be scored, perforated, or formed as a feature on the closure member 22) that extends between the terminal ends of each of the third segment 115a, 115b.

When the lid member 26 is pivoted into a second position 34 illustrated in FIG. 20B, a first lid projection 119a and a second lid projection 119b may snap, deform, or move to a position in which an edge formed by one of more of the segments 111a, 111b, 113a, 113b, 115a, 115b engages the support portion 102 to support the lid member 26 in the second position 34. Alternatively, the first lid projection 119a and the second lid projection 119b may remain stationary relative to the remainder of the lid member 25 when engaging the support portion 102 to support the lid member 26 in the second position 34. As the lid member 26 is pivoted from the first position 30 to the second position 34, the lid member 26 may deform (e.g., take on a cambered shape) to provide longitudinal rigidity to the lid member 26. The second position 34 may be a position that is intermediate between a first position (e.g., a closed position) and a fully open position (a third position) in which the lid member 26 or a portion of the lid member may be adjacent to a top portion of the fourth side wall 16e. In the second position, the lid axis 70 may form an angle with the top wall 16a of the container 12 (or with the position of the lid axis 70 when the lid member is in the first position 30) that is between 30° and 120°.

The hinge portion 28 including the cuts 107a, 107b may be used in embodiments in which the lid member 26 includes an underportion 62, and the cuts 107a, 107b may extend through each of the first sheet 14 (the underportion 62) and the second sheet 24. Alternatively, the cuts 107a, 107b may extend only through the second sheet 24 and not the underportion 62. The hinge portion 28 including the cuts 107a, 107b may also be used in embodiments in which the lid member 26 is formed of only the second sheet 24 (i.e., when the lid member 26 does not have an underportion 62). The cuts 107a, 107b may extend through the second sheet 24 (and, optionally, the underportion 62), partially through the second sheet 24 (and, optionally, the underportion 62), or a combination thereof. The cuts 107a, 107b may be continuous or may comprise cut segments and gaps between the segments. The cuts 107a, 107b may be perforated or scored (or any combination thereof).

The above-described hinge portion 28 that includes the cuts 107a, 107b can also be suitable for use in a package not including a lid member 26. For example, packages can generally include a re-sealable or re-closable label disposed on the first sheet 14, covering the opening 20. The hinge portion 28 as described above can be formed, as described above, in the re-sealable label to allow the re-sealable label to pivot about the hinge portion 22 and reside in a position that is intermediate from a closed position and a fully open position (i.e., the second position).

Figure 18:
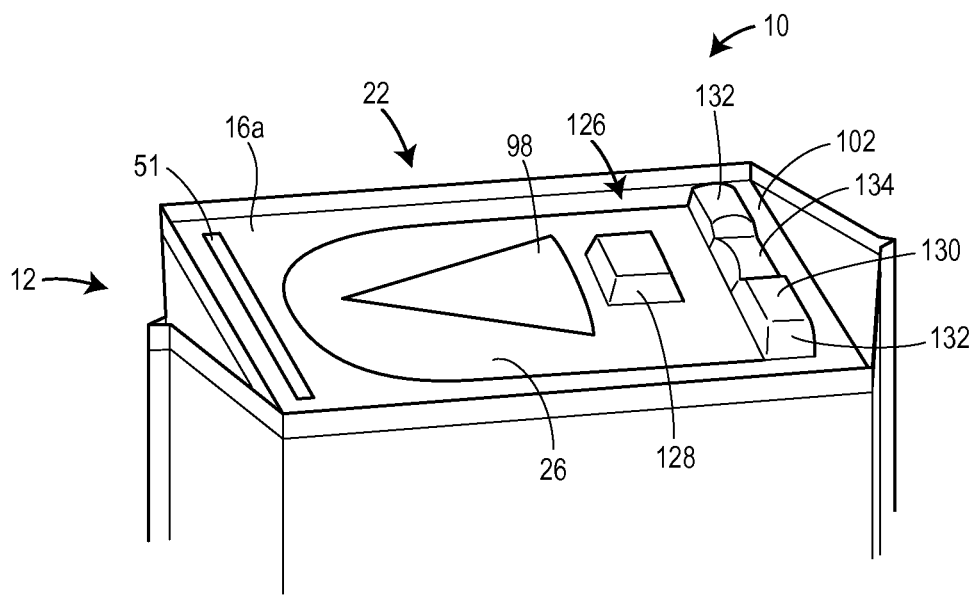
Figure 15E:
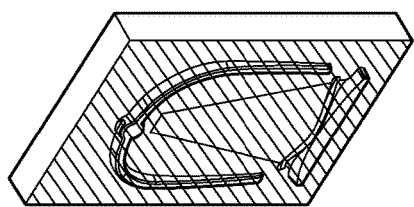
FIGS. 15A to 15H are various views of a mold used to form the first and second engagement features and the hinge portion on the container and the lid member.
Figure 15C:
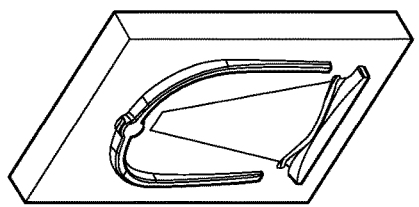
Figure 15F:
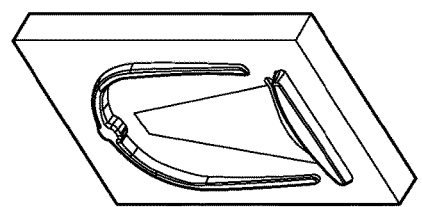
Figure 15G:
Figure 15H:
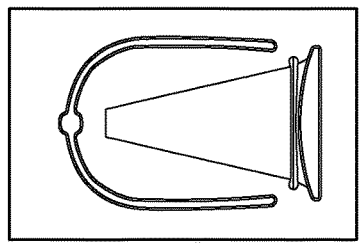
Figure 15D:
Figure 15A:
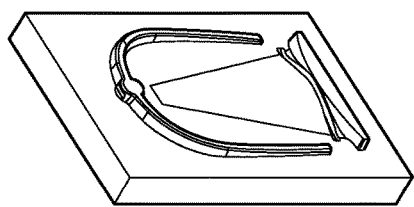
Figure 15B:
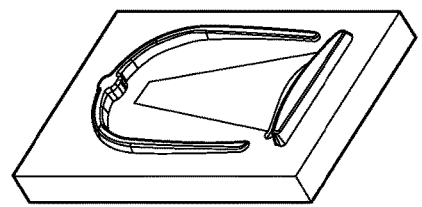
Figure 16I:
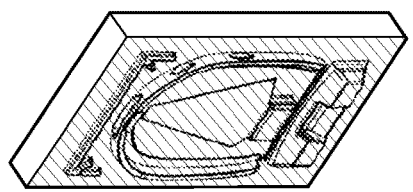
FIGS. 16A to 16I are various views of a mold used to form the first and second engagement features and the hinge portion on the container and the lid member.
Figure 16H:
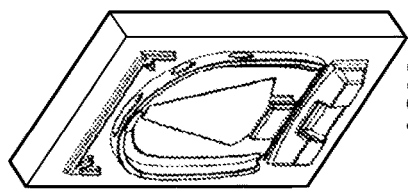
Figure 16G:
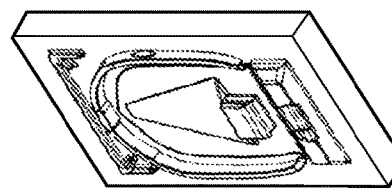
Figure 16F:
Figure 16C:
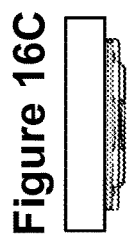
Figure 16D:
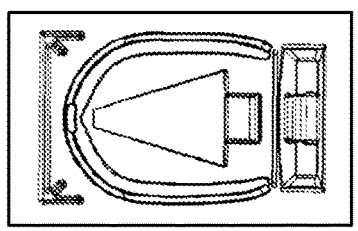
Figure 16E:
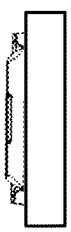
Figure 16A:
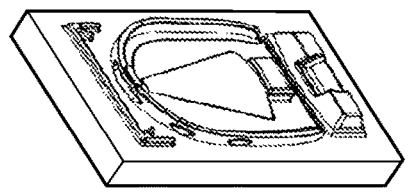
Figure 16B:
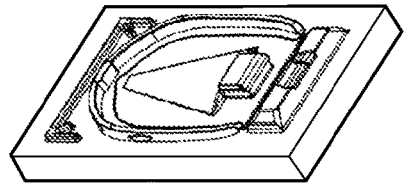
Figure 17I:
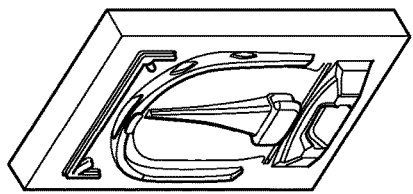
FIGS. 17A to 17I are various views of a mold used to form the first and second engagement features and the hinge portion on the container and the lid member.
Figure 17F:
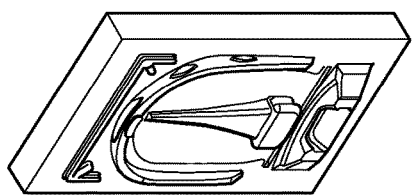
Figure 17G:
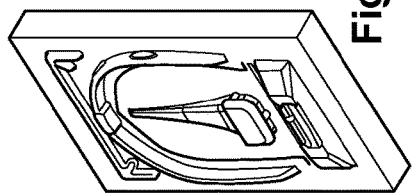
Figure 17H:
Figure 17C:
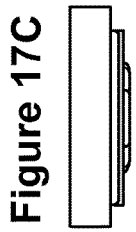
Figure 17D:
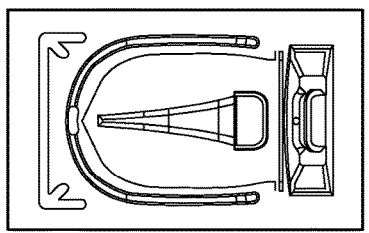
Figure 17E:
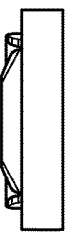
Figure 17A:
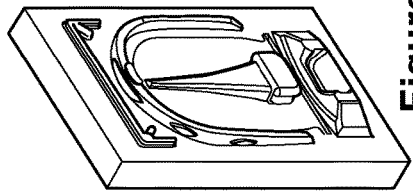
Figure 17B:
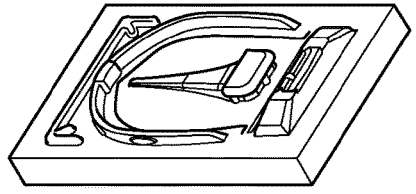
Figure 19A:
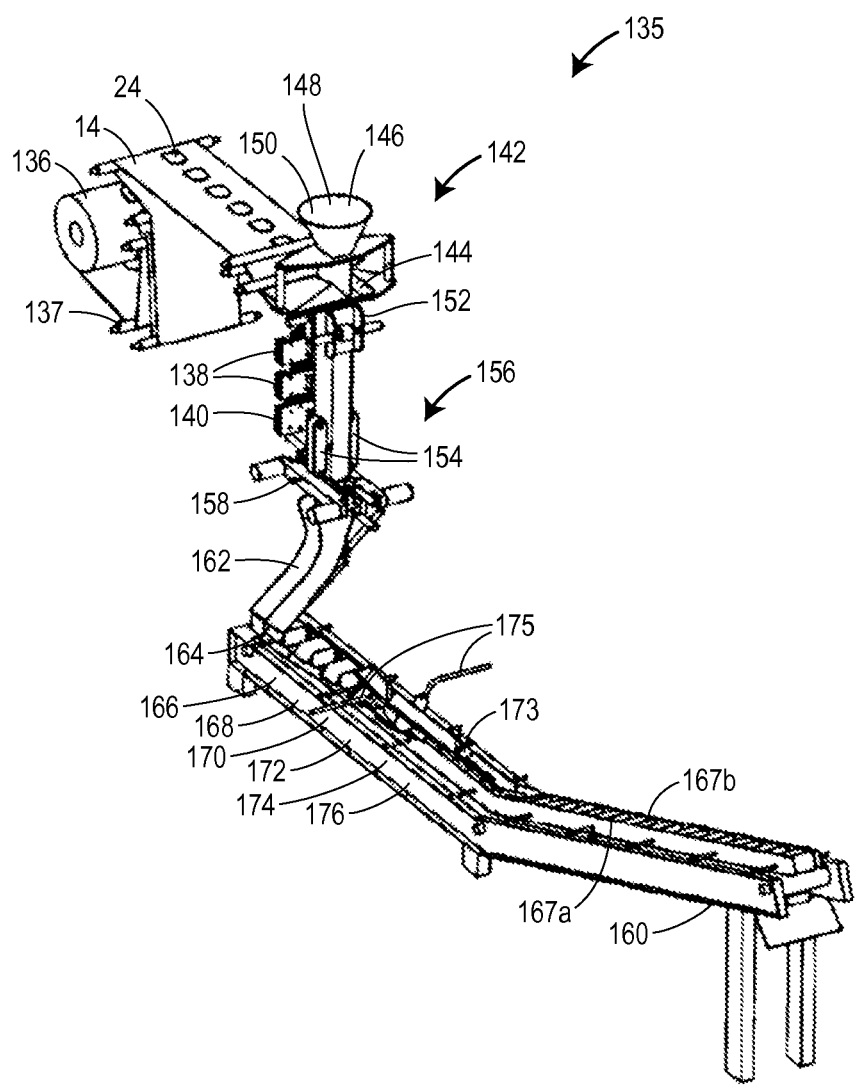
FIG. 19A is a first isometric view of an embodiment of a packaging machine used to manufacture an embodiment of a re-closable packaging assembly 10.
Figure 19B:
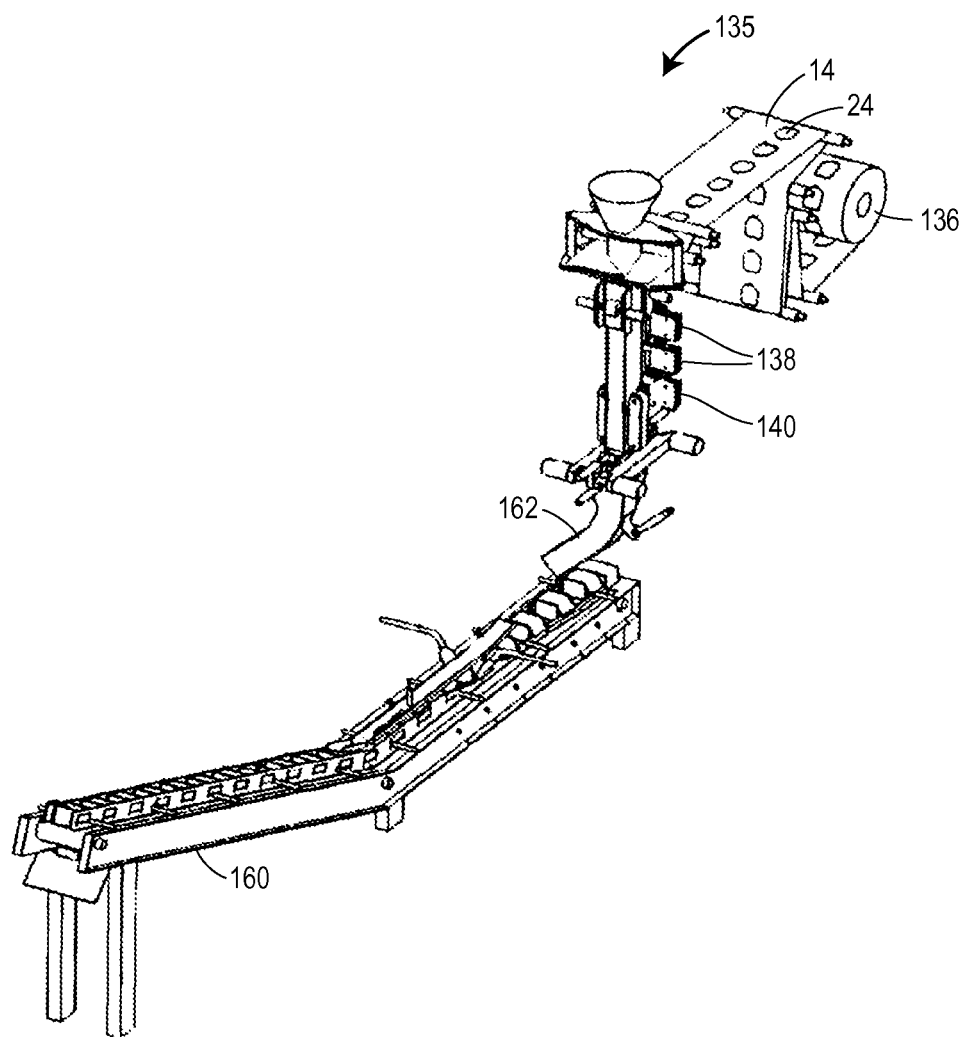
FIG. 19B is a second isometric view of the embodiment of the packaging machine illustrated in FIG. 19A.
Figure 19C:
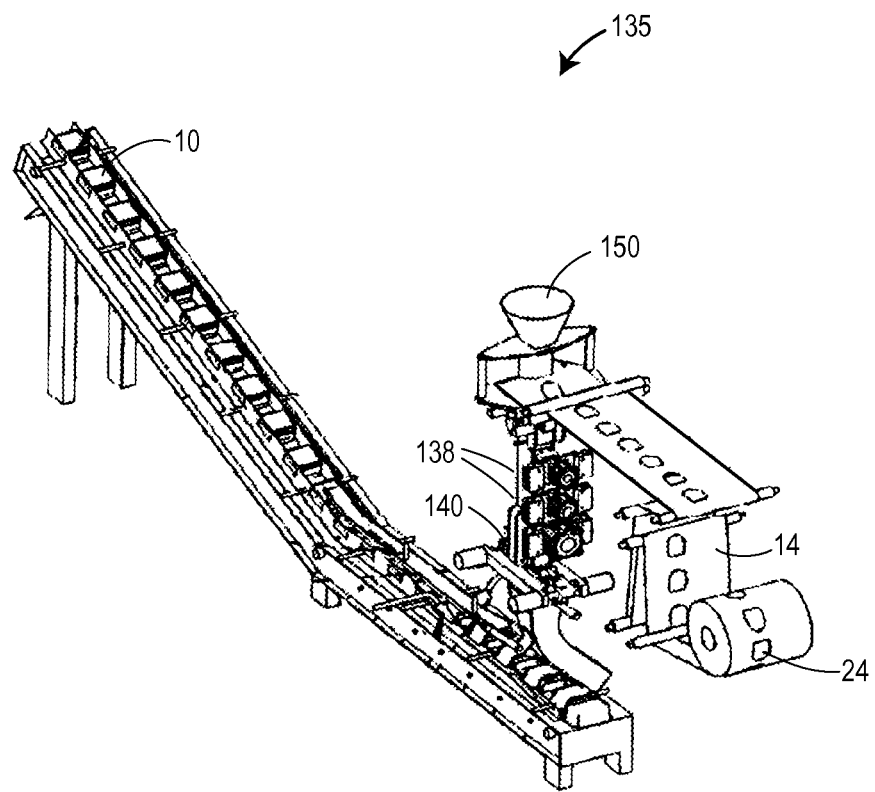
FIG. 19C is a third isometric view of the embodiment of the packaging machine illustrated in FIG. 19A.
Figure 19D:
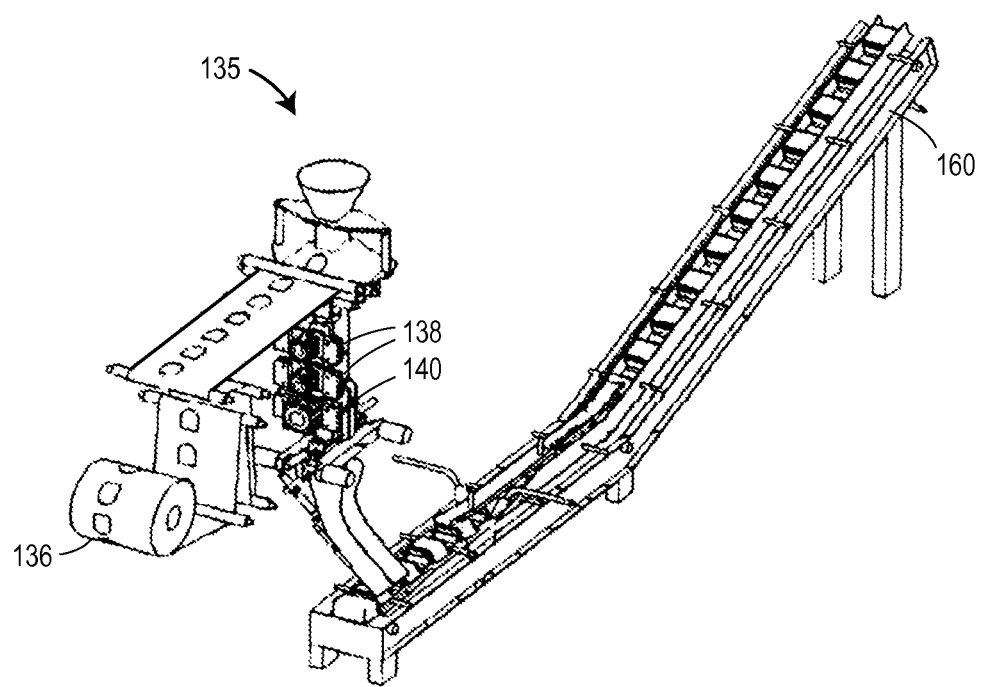
FIG. 19D is a fourth isometric view of the embodiment of the packaging machine illustrated in FIG. 19A.
Figure 19E:
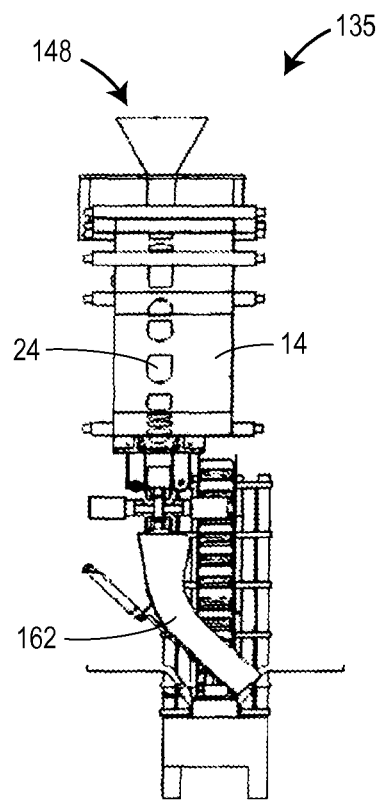
FIG. 19E is a front view of the embodiment of the packaging machine illustrated in FIG. 19A.
Figure 19F:
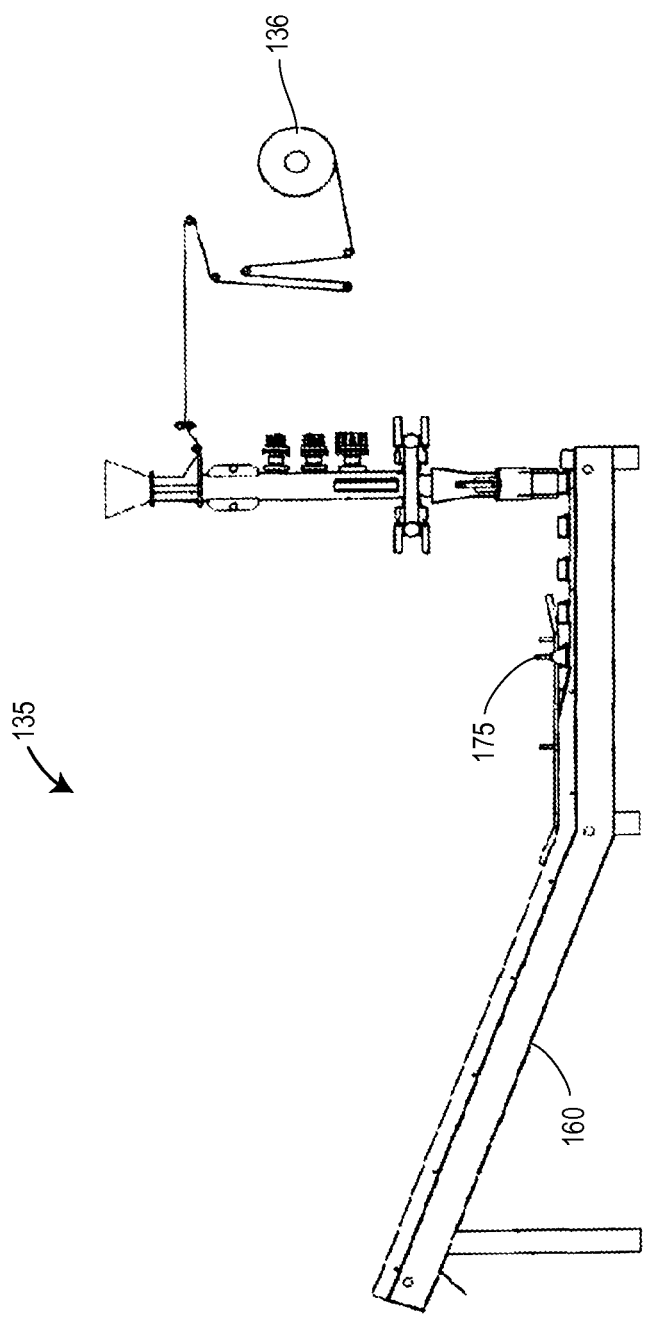
FIG. 19F is a side view of the embodiment of the packaging machine illustrated in FIG. 19A.

As illustrated in FIG. 18, the closure assembly 22 may include a locking mechanism 126 that includes a locking feature 128 that is received into a receiving feature 130 when the lid member 26 is in a fully open position. The locking feature 128 may be a protrusion that upwardly extends from the lid member 26, and the protrusion may have a rectangular, square, round, or any other suitable cross-sectional shape or combination of cross-sectional shapes. The receiving feature 130 may be formed in the support portion 102 (or in the container 12 itself) on an opposite side of the hinge portion 28, and the receiving feature 130 may include a pair of receiver protrusions 132 that are separated to form a receiving slot 134 therebetween. Each of the pair of receiver protrusions 132 may have a rectangular, square, round, or any other suitable cross-sectional shape or combination of cross-sectional shapes. The width of the receiving slot 134 is approximately equal to or slightly less than a corresponding width of the locking feature 128 such that the locking feature 128 (and, consequently, the entire lid member 26) is retained in the receiving slot 134 when the lid member 26 is pivoted about the hinge portion 28 such that the lid member 26 is in a fully open position. An undercut may be formed in the pair of receiver protrusions 132 and/or in the locking feature 128 to positively lock the locking feature 128 within the receiving slot 134. The locking mechanism 126 may be formed in a thermoforming operation using one of the molds illustrated in FIGS. 16A to 17J, for example.

Features for Retaining the Lid in an Open Position

Figure 27:
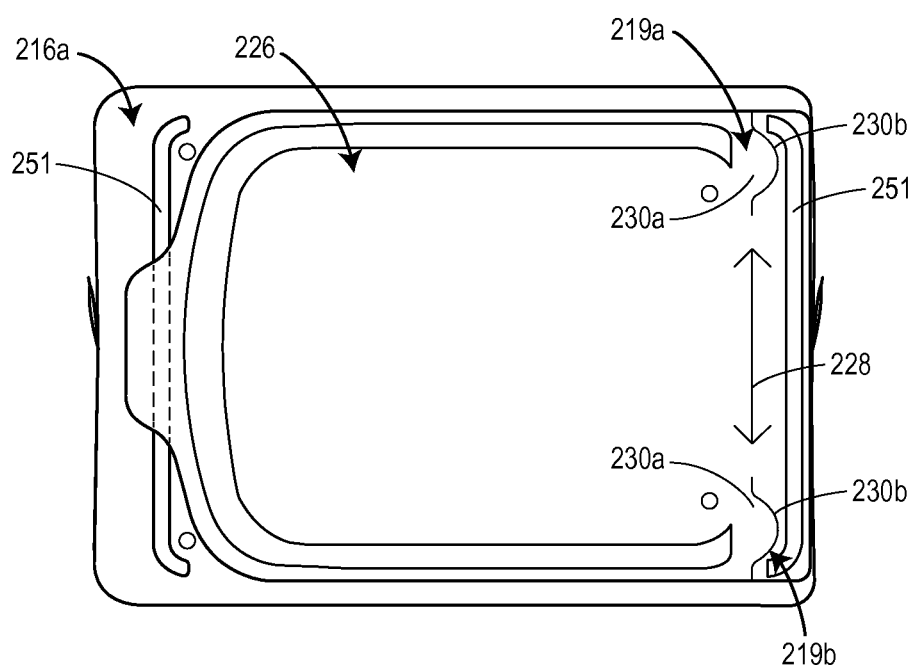
FIG. 27 is a top view of the container of FIG. 26, illustrating the closure assembly of a container in accordance with an embodiment of the disclosed packaging assembly
Figure 28:
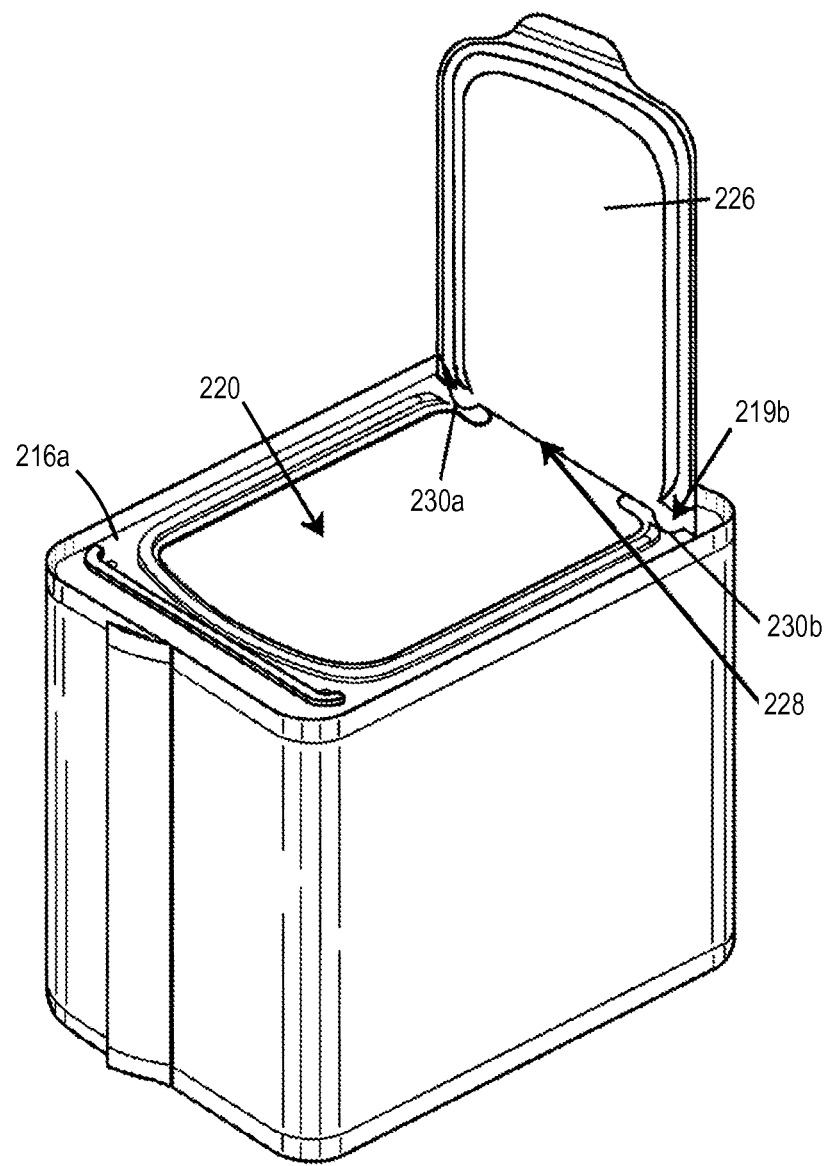
FIG. 28 is a perspective view of a package assembly of FIG. 26, illustrating the lid in the open position.

In various embodiments, the closure assembly can include features disposed on the lid member that retain the lid member in an open position (second position), which can facilitate access to the package. Referring to FIG. 26, the lid member 226 can include first and second projections 219a, 219b that pivot upon opening of the lid member 226 from a first (closed) position to the second (open) position. While description below is provided with respect to the lid including two projections, it should be understood that the lid can include any suitable number of projections, including a single projection or greater than two projections. The projection or projections facilitate retaining the lid member 226 in the second position. The first and second projections 219a, 219b can be disposed in the region of the hinge portion 228 of the lid member 226 and are positioned so that the axis of the hinge lies between the projections and the distal end of the lid 226. Referring to FIG. 27, the first and second projections 219a, 219b each have a first end 230a and a second end 230b. The projections are formed by cuts in the lid member such that the first end 230a of the projections 219a, 219b remain attached to the lid member 226 and the second end 230b and periphery of the projections 219a, 219b can detach from a portion of the second sheet 224 and pivot from a first position to a second position when the lid member 226 is moved from the first position to the second position. In the first position, the lid projections 219a, 219b can be generally disposed parallel to the top wall 216a of the package. Referring to FIG. 28, in the second position the lid projections 219a, 219b can be positioned generally perpendicular to the top wall 216a of the package 212, with the second end 230b of each lid projection 219a, 219b being in contact with the top wall 216a, thereby retaining the lid member 226 in the second position. For example, the friction between the projections 219a, 219b and the top wall 216a can resist the lid from closing by gravity force. The friction interference between the projections 219a, 219b can be a function of how far the top wall 216a is deflected by the projections 219a, 219b during movement from the first to second position. The amount of friction is sufficient to retain the lid 226 in the second position, but can be overcome without damage to the projections 219a, 219b to return the lid and the projections to the first (closed position).

Figure 29:
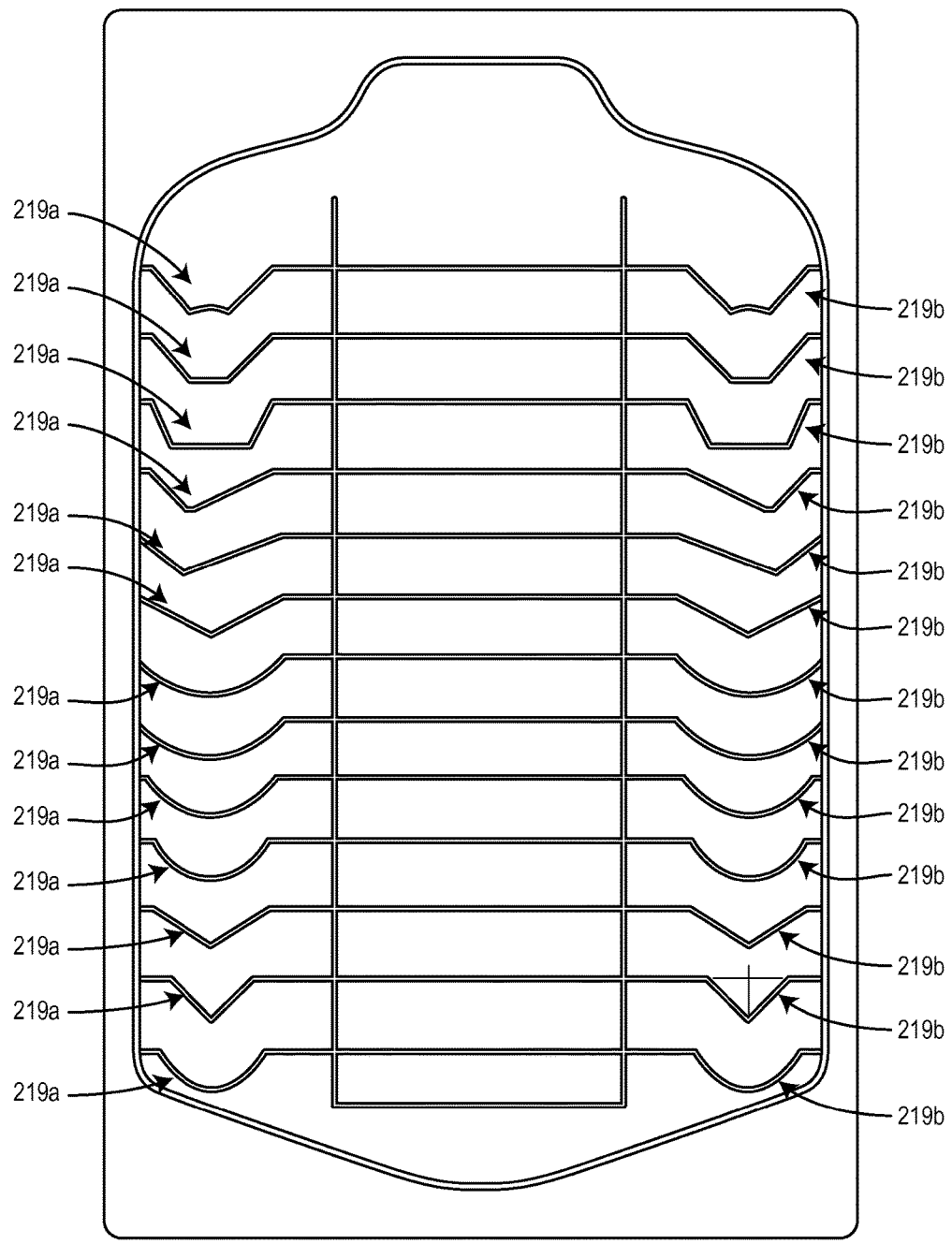
FIG. 29 is a schematic illustrating embodiments of first and second projections of a closure assembly in accordance with embodiments of the disclosure.

The first and second projections 219a, 219b can have any suitable shape, such as for example, semi-circular, triangular, semi-hexagonal, and "W-shaped". FIG. 29 is a schematic illustration of the region of hinge portions 228 of lid members 226 having differently shaped and sized projections 219a, 219b. In various embodiments, the first and second projections 219a, 219b have the same shape and the same size. In some embodiments, the first and second projections 219a, 219b can have different shapes and/or different sizes.

The first and second projections 219a, 219b have a length between the first and second ends such that upon pivoting of the lid, the first and second projections 219a, 219b move from the first position to the second position, the first and second projections 219a, 219b can contact the top wall 216a at least at their respective second edges 230b. The length of the projections 219a, 219b can be adjusted to tailor the amount of force acting on and resultant deflection of the top wall 216a by the projections 219a, 219b. In various embodiments, the first and second projections 219a, 219b have a length such that the projections 219a, 219b do not excessively bend or deform during movement from the first and second positions and can retain sufficient stiffness to retain the lid member 226 in the second (open) position.

Referring to FIG. 30, the first and second projections 219a, 219b can have any suitable width or diameter. In various embodiments, the width of the projections 219a, 219b are selected such that the cuts in the lid member 226 for forming the projections 219a, 219b do not overlap with cuts in the first sheet and the underportion (if provided) for forming the opening in the package. By arranging the various cuts in such a fashion, the package can be provided such that there is no opening in the package that is not covered by the lid member.

Referring again to FIG. 27, a hinge portion 228 of the lid 226 is disposed between the first and second projections 219a, 219b. In one embodiment, the hinge portion 228 is disposed in line with the first end of the projections 230a. The hinge portion 228 can be provided by a cut in the lid. The cut defining the hinge portion extends between but does not overlap with the cuts defining the first and second projections. The cut can have a length such that the cut for the hinge portion also does not overlap with cuts in the first sheet 214 and the underportion 262 (if provided) for defining the opening 220 of the package 212.

The above described first and second projections 219a, 219b and associated hinge portion 228 can be incorporated into embodiments of the package 212 including either the formed lid or the unformed lid in which a portion of the second sheet 224 removably attaches to the first sheet 214 to cover the opening 220 of the package 212.

Figure 13:
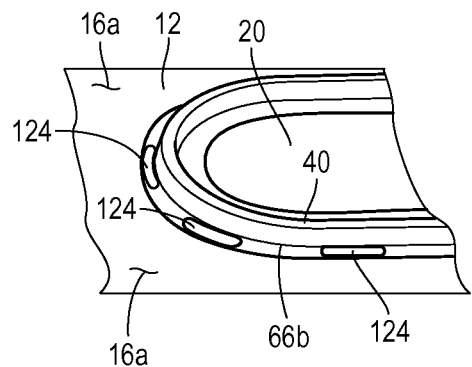
FIG. 13 is a partial isometric view of the first engagement feature of an embodiment of the re-closable packaging assembly.

One or more additional features may be disposed on the ridge 40 of the first engagement feature 36 to further secure the lid member 26 to the container 12. For example, as illustrated in FIG. 13, one or more oblong protrusions 124 may outwardly project from the exterior tapering side 66b of the ridge 40, and each protrusion 124 may be adapted to engage a corresponding surface of the channel 42 of the lid member 26 to secure the lid member 26 to the container 12 in the first position 30. Alternatively, or in addition, one or more protrusions 124 or undercuts may be disposed on a surface of the channel 42 of the lid member 26 to engage a corresponding surface or undercut of the ridge 40 to secure the lid member 26 to the container 12 in the first position 30.

To further assist in the coupling of the lid member 26 to the container 12 in the first position 30, a releasable surface adhesive may be applied to all or a portion of the lid member 26 that contacts (and sealingly engages) the top wall 16a of the container 12 when the lid member 26 is in the first position 30. Alternatively, or in addition to the adhesive described above, a releasable surface adhesive may be applied to all or a portion of the top wall 16a of the container 12 that contacts the lid member 26 when the lid member 26 is in the first position 30. For example, a releasable surface adhesive. The surface adhesive may be any suitable adhesive that provides for adhesion between the lid member 26 and the container 12 over the course of a suitable number of openings and closings by the user. Suitable adhesives may be pressure sensitive acrylics, for example.

Figure 12:
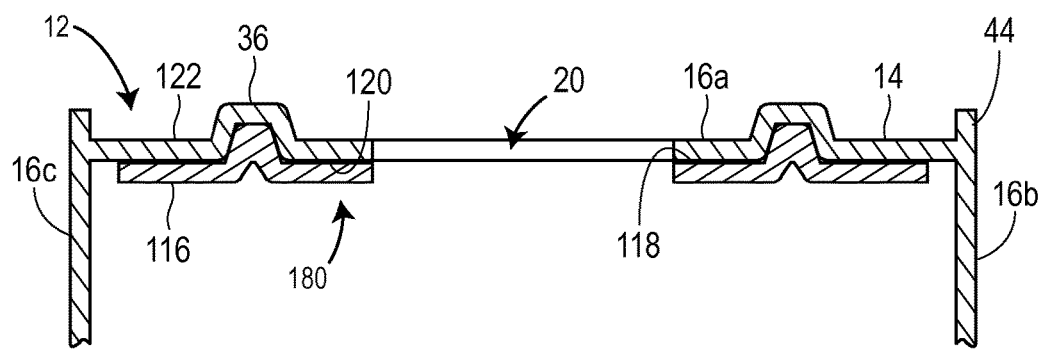
FIG. 12 is a sectional view of the top wall of the a container along line 7-7 of FIG. 5 that includes a third sheet secured to a first sheet.
Figure 32:
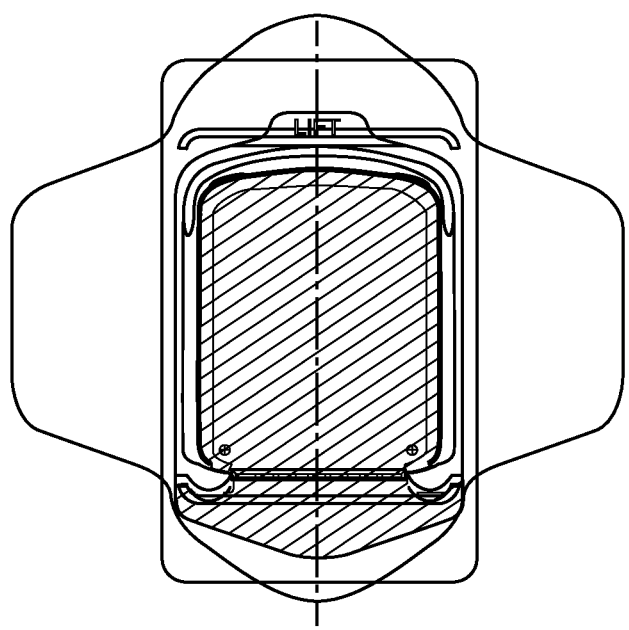
FIG. 32 is a schematic illustrating embodiments of first and second projections of a closure assembly and extensions of the second sheet into two sidewalls in accordance with embodiments of the disclosure.
Figure 34D:
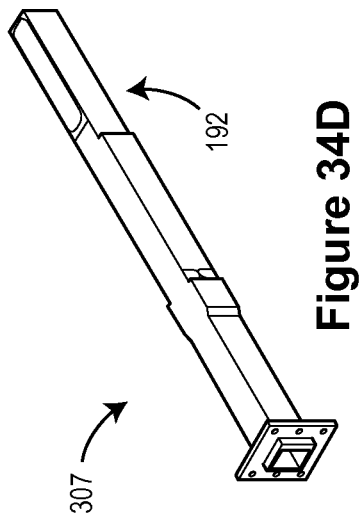
FIGS. 34A-34E include various views of an embodiment of a forming tube of an embodiment of a forming tube assembly.
Figure 34E:
Figure 34A:
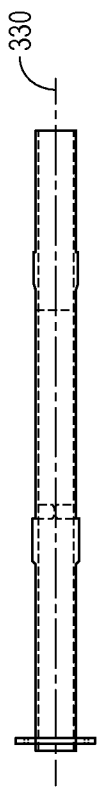
Figure 34B:
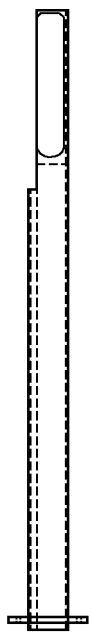
Figure 34C:
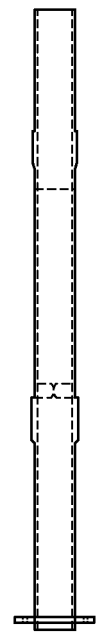
Figure 35:
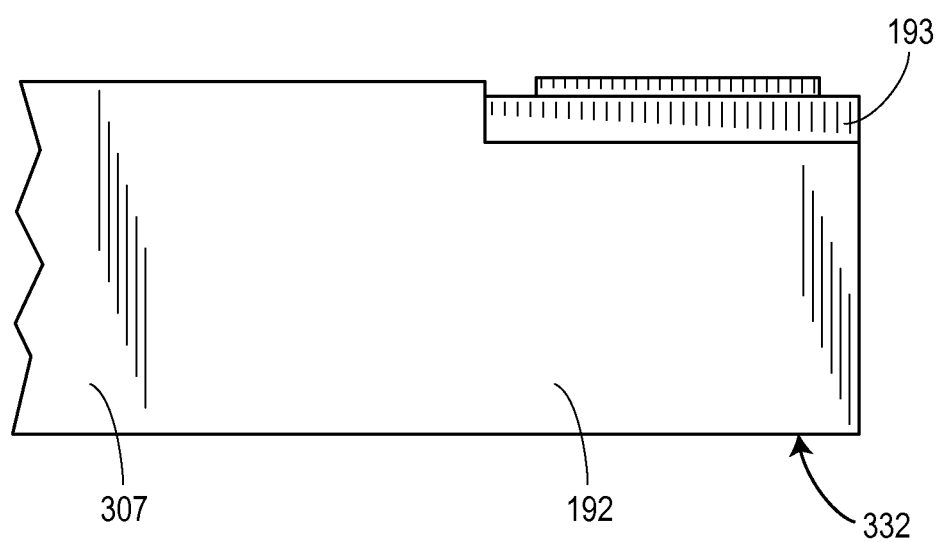
FIG. 35 is a partial side view of an embodiment of a forming tube of an embodiment of a forming tube assembly.

As illustrated in FIG. 12, a stabilizing portion 180, such as a third sheet 116 (or a third film), may be secured (or integrally formed with) the first sheet 14 comprising the container 12 to increase the gauge of the container 12 in the region of the stabilizing portion 180 to provide added stiffness to the container 12 in a desired area. The stabilizing portion 180 may advantageously be provided only at a portion of the top wall 16a of the container 12 without affecting the gauge of other portions of the container 12. This can be advantages when forming various re-closable packaging assembly 10 configurations in which sealing of edges and/or folding of portions of the first sheet 14 may be made more difficult if a film having an overall large gauge was used. Referring to FIG. 32, in some embodiments, the third sheet can have one or more portions that extend outwardly from a main body such that upon forming of the package the main body remains in the region of the top wall and the one or more outwardly extended portions are disposed on one or more sidewalls. The stabilizing portion 180 may be secured to (or integrally formed with) the first sheet 14 in any manner known in the art. Specifically, all or a portion of a top surface 118 (i.e., a first side or first surface) of the third sheet 116 may be secured to all or a portion of a bottom surface 120 (i.e., a second side or second surface) of the first sheet 14 that comprises all or a portion of the top wall 16a, with a top surface 122 (i.e., a first side or first surface) of the first sheet 14 may be an exterior surface of the top wall 16a. For example, the third sheet 116 may be secured to the bottom surface 120 of the first sheet 14 such that the opening 20 in the first sheet 14 is entirely surrounded by the third sheet 116. The third sheet 116 may extend to the opening edge 55, or may be outwardly offset from the opening edge 55. The third sheet 116 may also extend to any one or more of the first, second, third, and fourth side walls 16b-16e, or the third sheet 116 may be inwardly offset from any or all of the first, second, third, and fourth side walls 16b-16e. The distance of the inward offset may vary or may be uniform from each side wall 16b-16e. To secure the third sheet 116 to the first sheet 14, an adhesive may be applied to all or a portion of the top surface of the third sheet 116. In addition, or alternatively, an adhesive may be applied to all or a portion of the bottom surface 120 of the first sheet 14. As an alternative to adhesive, the third sheet 116 may be integrally formed with, heat sealed to, or ultra-sonically welded to the first sheet 14. The thickness of the third sheet 116 may be uniform or may vary, and may have any thickness that provides a desired stiffness to the top wall 16a of the container 12 to allow for suitable sealing engagement of the lid member 26 and the container 12 in the first position 30.

The stabilizing portion 180 may also include a coating, such as an ink or an adhesive, applied selectively to the bottom surface 120 of the first sheet 14. The stabilizing portion 180 may also include an additional material layer disposed on the bottom surface 120 of the first sheet 14. For example, the material may have a foam structure. In one embodiment, a coating of a polymeric material may be applied to at least a portion of the bottom surface 120 of the first sheet 14 and reacted to form a foam structure and thereby form the stabilizing portion 180. In various embodiments, the stabilizing portion 180 may be provided when forming the first sheet 14. For example, the first sheet 14 may be extruded to have an increased gauge portion in the region of the first sheet 14 that is adapted to be adjacent to the opening 20. For example, the first sheet 14 may be provided with an additional laminated layer in the region of the first sheet 14 that is adapted to be adjacent to the opening 20, as compared to the number of layers in other regions of the first sheet 14, thereby increasing the gauge of the first sheet 14 in the region of the opening 20.

The one or more ribs 51 (see FIG. 18) or any other protrusion or combination of protrusions formed on or along the top wall 16a of the container 12, including the second engagement feature 38, may allow for the vertical stacking of re-closable packaging assembles 10. More specifically, the vertically-projecting feature/features may engage a portion of the wall downwardly projecting from the bottom wall 16f of the container, and such engagement limits or prevents relative horizontal movement between stacked assemblies 10.

As illustrated in FIGS. 55A, 55B, and 56A to 56D, the re-closable packaging assembly 10 may include a closure assembly 339 that may include a lid member 340 similar (or identical) to the hinged embodiment of the previously-disclosed lid member 26 with the exception that the lid member 340 is completely removable from the container 12. That is, the lid member 340 is movable between a first position (FIG. 55A) in which the lid member 340 releasably engages a first portion of the container 12 surrounding the opening 20 and a second position (FIG. 55B) in which the lid member is not in contact with the container 12, thereby allowing for a user to access the interior volume through the opening. The opening 20 may have any suitable shape or combination of shapes, such as a rectangular, oval, oblong, round, and/or polygonal shape.

Referring to FIGS. 54A to 54N, 55A, 55B, and 56A to 56D, the lid member 340 may have any suitable shape or combination of shapes, such as square, oval, oblong, and/or polygonal, for example. More specifically, the lid member 340 may be rectangular. The lid member 340 may be defined by a first lateral edge 341 and a second lateral edge 432 parallel or substantially parallel to the first lateral edge 341. Alternatively, the first lateral edge 341 and the second lateral edge 432 may each have any suitable orientation. A first end edge 343 may extend between a first end of the first lateral edge 341 and a first end of the second lateral edge 432. A second end edge 344 may extend between a second end of the first lateral edge 341 and a second end of the second lateral edge 432. The first end edge 343 may be parallel or substantially parallel to the second end edge 344, but the first end edge 343 and the second end edge 344 may have any suitable orientation. Each of the edges 341-344 may be linear or may be curved, partially, curved, contoured, partially contoured, scalloped, and/or partially scalloped, for example.

Figure 55A:
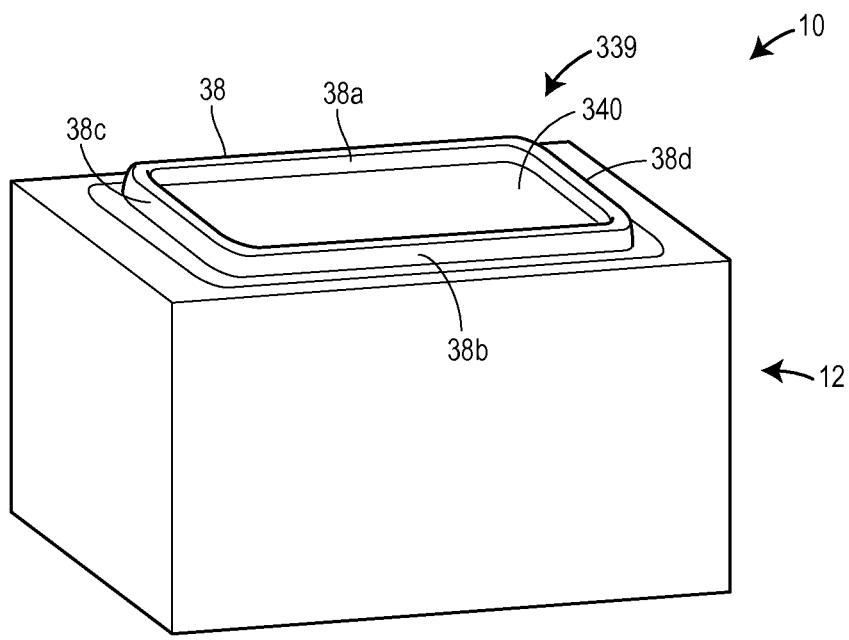
FIGS. 55A and 55B are various views of a container and a removable lid member.
Figure 55B:
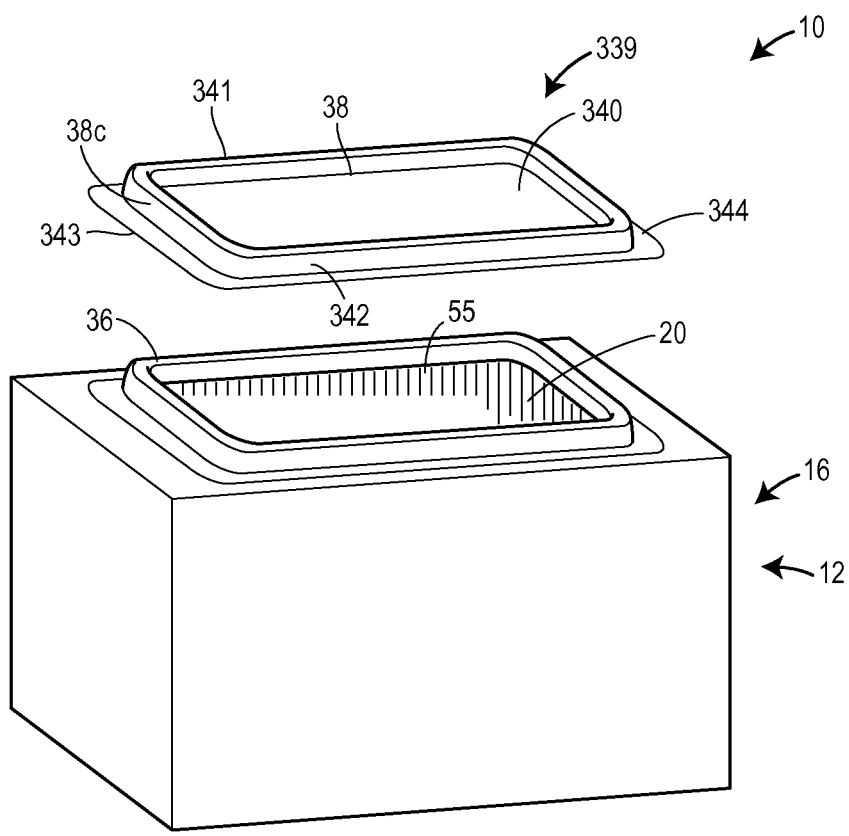
Figure 57:
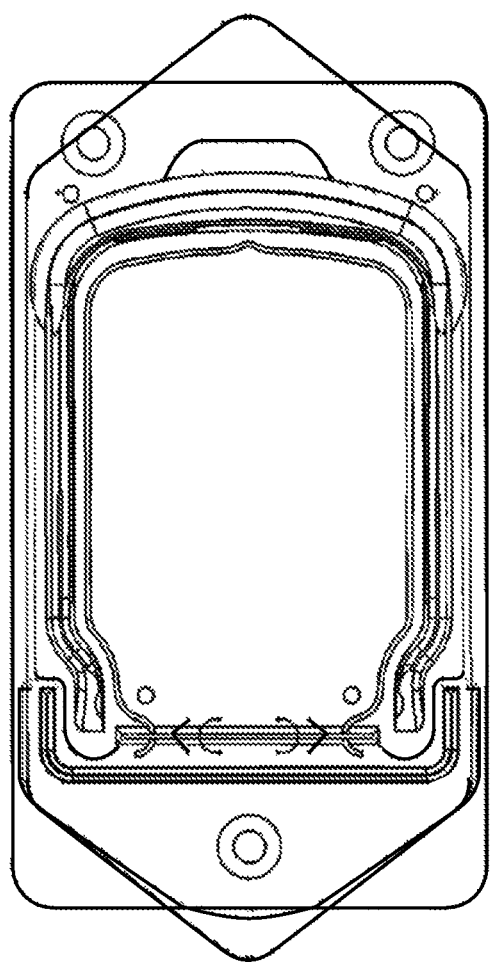
FIG. 57 is an example forming die for an embodiment of the re-closable packaging assembly.
Figure 58:
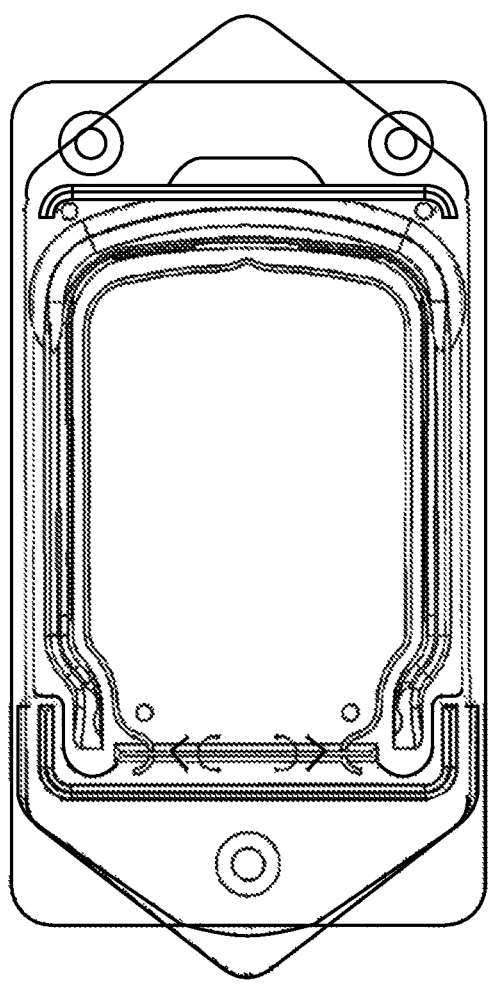
FIG. 58 is an example forming die for an embodiment of the re-closable packaging assembly.

The lid member 340 of the closure assembly 339 may include the second engagement feature 38 adapted to engage the first engagement feature 36 disposed on the container 12 to removably secure the lid member 26 to the container 12 when the lid member 339 is in the first position 30 illustrated in FIG. 55A, and the second engagement feature 38 may be integrally formed on or with the lid member 340. The second engagement feature 38 may be any element or combination of elements that engage a corresponding first engagement feature 36 to allow the lid member 340 to sealingly engage the container 12. For example, the second engagement feature 38 may be a channel 42 adapted to receive the ridge 40 formed on the top wall 16a of the container 12, as previously described. As an additional example, the first engagement feature 36 may be a channel 42 that may vertically extend downward from the top wall 16a of the container 12, and the second engagement feature 38 may be ridge 40 that may vertically extend downward from the lid member 340 of the closure assembly 339. In the first position, the ridge 40 may be received into the channel 42 to allow the lid member 340 to sealingly engage the container 12.

The second engagement feature 38 may include a first portion 38a, a second portion 38b, a third portion 38c, and a fourth portion 38d, and the first portion 38a, the second portion 38b, the third portion 38c, and the fourth portion 38d may be in alignment with a first portion 36a, a second portion 36b, a third portion 36c, and a fourth portion 36d of the first engagement feature 36, respectively, when the lid member 339 is in the first position 30 illustrated in FIG. 55A. Each of the first portion 38a, the second portion 38b, the third portion 38c, and the fourth portion 38d may be inwardly (and, optionally, equidistant) from the first lateral edge 341, the second lateral edge 342, the first end edge 343, and the second end edge 344, respectively. Each of the first portion 38a and second portion 38b may be elongated and may have a longitudinal axis parallel to the first lateral edge 341. Alternatively, each of the first portion 38a and second portion 38b may be elongated and may have a longitudinal axis that is curved or bowed (or inwardly curved or bowed) relative to the first lateral edge 341. Each of the third portion 38c and fourth portion 38d may be elongated and may have a longitudinal axis parallel to the first end edge 343. Alternatively, each of the third portion 38c and fourth portion 38d may be elongated and may have a longitudinal axis that is curved or bowed (or inwardly curved or bowed) relative to the to the first end edge 343. Each of the corresponding first portion 36a, second portion 36b, third portion 36c, and fourth portion 36d of the first engagement feature 36 may be similarly formed on the container 12. Each of the first portion 38a, the second portion 38b, the third portion 38c, and the fourth portion 38d of the second engagement feature 38 may form a continuous, single, uninterrupted feature that completely surrounds the opening 20. Alternatively, one or more gaps or interruptions may be disposed in or between the first portion 38a, the second portion 38b, the third portion 38c, and the fourth portion 38d of the second engagement feature 38.

The re-closable packaging assembly 10 may also include a pour spout feature 345, as illustrated in FIGS. 54K to 54N. The pour spout feature 345 may include any feature or combination of features that allows for easier pouring out or dispensing of materials stored in the interior volume of the container 12. For example, the pour spout feature 345 may be a contoured edge 346 partially defining the opening 20 formed on the container 12 or partially defining an edge of a removable cut-out through the lid member 340. In addition, the pour spout feature 345 may comprise or partially comprise a vertical projection in contact with or adjacent to the opening 20, and the vertical projection may be a upwardly-extending ridge or lip that extends from the top wall 16a of the container. The vertical projection may be a thermoformed feature that may be formed when the features of the closure assembly 22 are formed. Alternatively, the vertical projection may be formed prior to or after the forming of the features of the closure assembly 22.

Flexible Materials for Forming Flexible Containers

The plurality of walls 16 of the container 12 may be formed from a single sheet of material, (e.g., the first sheet 14), and the material may be flexible. However, the container 12 may be made of any suitable number of sheets of material. The first sheet 14 can include any suitable number of laminate layers needed to achieve the desired composition and/or film properties. The first sheet 14 may have a composition and structure that are appropriate for the product to be stored within the container 12. The first sheet 14 may be formed from materials such as polypropylene (PP), ethyl vinyl alcohol, polyethylene (PE), EVA co-polymers, foil (such as aluminum foil), paper, polyester (PET), nylon (poly amide), and laminates and composites thereof. In other embodiments, the first sheet 14 may be formed from metalized polypropylene or metalized polyethylene terephthalate (PET), or combinations of such materials. Still further, the first sheet 14 may include or be infused with a degradable or biodegradable component that may allow the container to degrade in a relatively short amount of time after the useful life of the container 12, such as after the container 12 is disposed in a landfill or other disposal facility. If necessary or desired based on the implementation, the first sheet 14 may include an outer ply of heat sealable polypropylene or other material suitable for heat sealing so that the seals joining portions of the film as the container 12 is fabricated may be sealed and/or attached to the outer surface of the container 12 to form and shape the container 12.

A flexible material 400 for forming a flexible package 400 includes an opening panel region 420 that is configured to define a panel of the package having an opening for accessing the internal volume of the package (also referred to herein as an opening panel). For ease of reference, the FIGS. 30a-c, and 50-51 illustrate formed features 422 in the opening panel region 420 that correspond to the closure assembly. It should be understood that the formed feature need not be included in the flexible material 400 and can be formed during forming of the package, as described herein. The flexible material 400 can further include one or more wall regions 424 that are configured to define one or more walls of the flexible package, including, for example one or more side wall and/or a bottom wall.

The flexible material can be provided as a web of material capable of forming a plurality of package, which can be rolled into a flexible material roll. The flexible material can include a plurality of opening panel regions and optionally a plurality wall regions discretely spaced along a longitudinal direction of the flexible material, wherein the plurality of opening panel regions and the plurality of wall regions comprise the first sheet. That is, the first sheet can be a common sheet material extending between each of the plurality of regions configured to be folded or formed into the plurality of packages. The flexible material can further include a plurality of second sheets and/or third sheets in the opening panel regions and wall regions as described below.

The flexible material includes a first sheet 414, which as disclosed above is configured to be formed into the opening panel and open or more walls of the first sheet 414. The opening panel region and one or more wall regions comprise the first sheet 414. The flexible material 400 can further include a second sheet 416 that is secured to the first sheet 414 in the opening panel region 420. In various embodiments, the second sheet 416 or at least a portion thereof is thermoformable.

As used herein the term "secured" refers joining of one layer or sheet to another layer or sheet and can include intermediate layers or adhesives. Layers or sheets can be joined using any known methods including adhesive, heat sealing, ultrasonic sealing, welding, crimping, and combinations thereof. It should be understood herein that unless otherwise specified, sheets or layers can be secured in whole or in part to another sheet or layer. Layers or sheets can be permanently secured or releasable secured. As used herein, the term "permanently secured" refers to a connection between two adjacent layers or sheets that requires at least partial destruction of the one or both of the layers or sheets to separate the layers or sheets at the connection. As used herein, the term "releasable secured" refers to a connection between two adjacent layers or sheets such that the layers or sheets can be separated without destruction. In some embodiments, two sheets can be resealably secured, meaning that the sheets layers can be separated and then re-secured without application of a further adhesive or seal.

Figure 50:
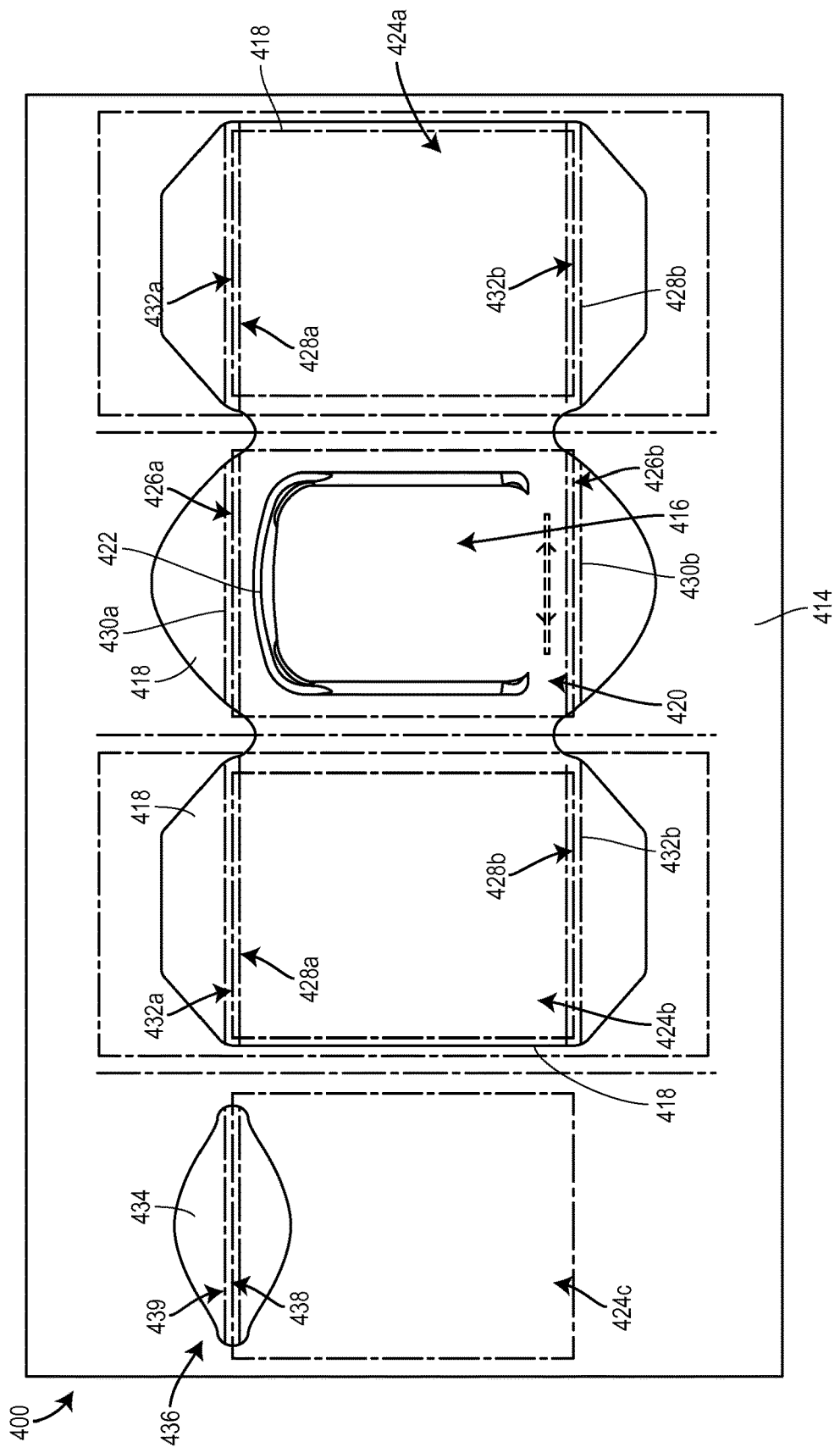
FIG. 50 is a schematic illustration of a flexible material in accordance with an embodiment of the disclosure.
Figure 51:
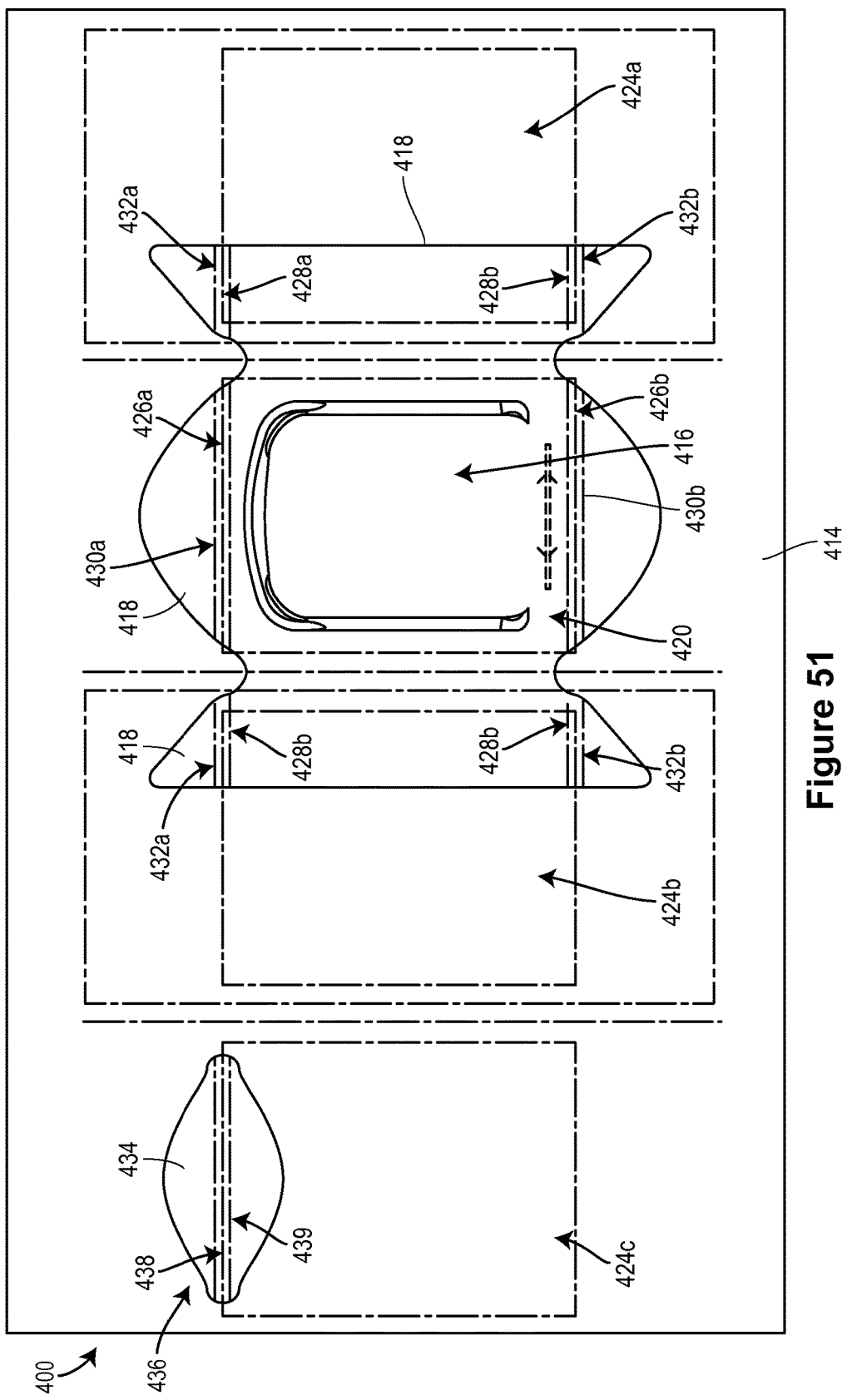
FIG. 51 is a schematic illustration of a flexible material in accordance with an embodiment of the disclosure.

The flexible material can further include a third sheet 418 secured to the first sheet 414 at least in the opening panel region 420. In one embodiment, the third sheet 418 is secured to the first sheet 414 and the second sheet 416 is secured to the third sheet 418. In another embodiment, the first sheet 414 is disposed between the second and third sheets 416, 418. As described in detail below, the third sheet 418 can additionally or alternatively be secured to the first sheet 414 in the one or more wall regions 424 of the flexible sheet 400. The third sheet 418 can partially or completely overlap with first sheet 414 in the opening panel region 420 and/or the one or more wall regions. For example, FIG. 50 illustrates an embodiment wherein the third sheet 418 completely overlaps with the first sheet in the opening panel region 420 and two adjacent wall regions 424a, 424b. FIG. 51 illustrates an embodiment wherein the third sheet 418 only partially overlaps with the first sheet 414 in two adjacent wall regions 424a, 424b.

Figure 30A:
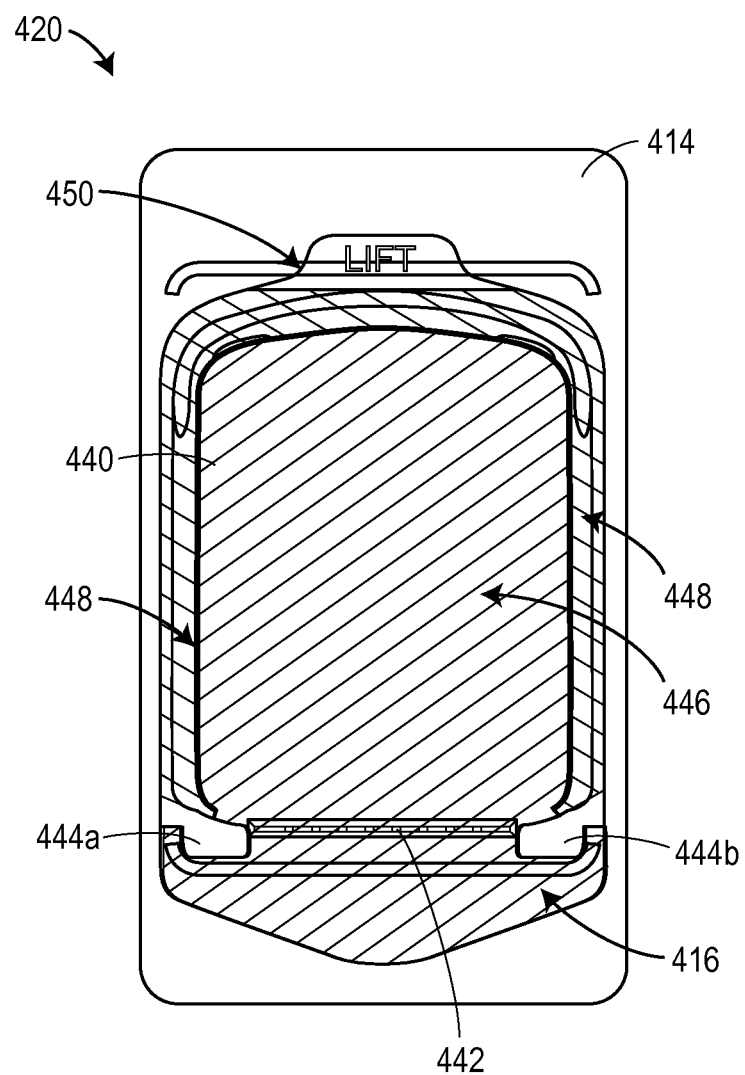
FIGS. 30a-30c are schematic illustrations of an opening panel region of a flexible material in accordance with embodiments of the disclosure, illustrating the zones of the opening panel region.
Figure 30B:
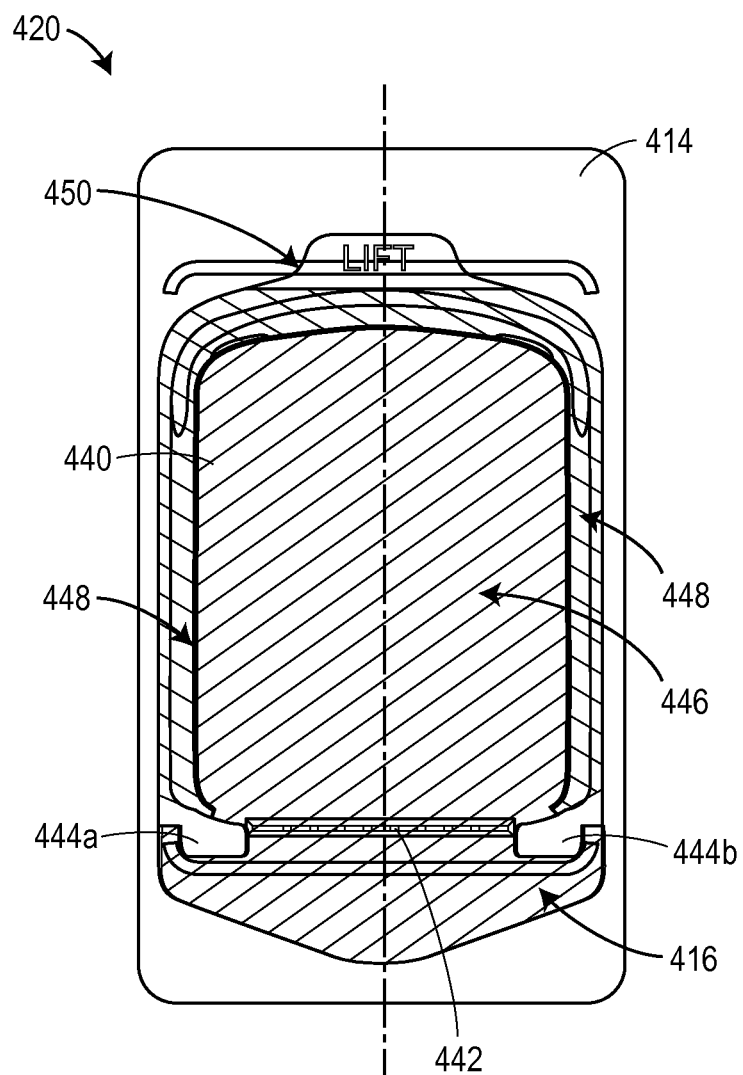

Referring to FIG. 30b, which illustrates an opening panel region of the flexible material, the flexible material can include a line or path of reduced strength 440 in the first sheet 414 of the opening panel region 420 that is configured to define the opening of the package. In embodiments in which the flexible material 400 further includes a third sheet 418 the third sheet 418 can line or path of reduced strength can be provided in the third sheet to define the opening through the first and third sheets 414, 418. As used herein, the terms "line of reduced strength" and "path of reduced strength" are used interchangeable and can be straight, curved, or have any suitable shape. A line or path of reduced strength can be formed in a flexible material or sheet using any know method including, for example, laser scoring, mechanical scoring or a similar process for forming perforations. Perforations can either puncture the sheet or be provided without puncturing the sheet if desired.

The flexible material can further include a line or path of reduced strength 442 or a continuous cut defining in the second sheet 416 in the opening panel region 420 that is configured to define a hinge 442 about which a lid of a closure assembly of the package can pivot. Additional cuts or lines or paths of reduced strength 444a, 444b can be provided in the second sheet 416, if desired, to define first and second projections of the closure assembly as described in detail below. The cuts or paths or lines of reduced strength for the hinge 442 and the projections 443a, 443b can be provided in the second sheet such that they do not overlap with each other or with a line or path of reduced strength 440 defining the opening of the package. This can help to ensure that the package remains hermetically sealed prior to first use.

In various embodiments, as illustrated in FIGS. 50 and 51, the third sheet 418 can be a single sheet that extends across one or more regions of the flexible material 400, for example, the opening panel region 420 and one or more wall regions 420. In other embodiments, the third sheet 418 can be provided as separated sheets overlapping with the first sheet in one or more regions of the flexible material. The third sheet 418 can between boundaries 426a, 426b, 428a, 428b, of a region as illustrated in FIGS. 50, 51. Alternatively, the third sheet can extend only partially in a face of a region and/or can be provided as separated sheets that overlap with the boundaries but are not contiguous. FIG. 50 illustrates a third sheet portion 434 that extends only partially in the face of the region. As described in detail below, the third sheet portion 434 can in some embodiments be selectively placed at a boundary in a tuck folding region of the flexible material. In such embodiments, the third sheet portion 434 is also referred to as a fourth sheet 434. It should be understood herein that in such embodiments the fourth sheet can be same or a different material as the third sheet.

Referring to FIGS. 50 and 51, in some embodiments, the flexible material can include first 414, second 416, and third 418 sheets in the opening panel region 420. The opening panel region can have first and second boundaries 426a, 426b that are configured to define first and second edges of the opening panel of the package. The third sheet 314 can overlap with one or both of the first and second boundaries 426a, 426b and optionally extend past the boundary and be secured to the first sheet 414 on opposed sides of the boundary. The third sheet 314 can further include a line of reduced strength 430a, 430b in the portion of the third sheet that overlaps with the boundary 426a, 426b. As shown in FIG. 50, the line of reduced strength 430a, 430b can be defined by one or more paths or lines of reduced strength, for example, two paths of reduced strength disposed on opposed sides of the boundary. Extension of the third sheet 418 to overlap with one or more boundaries and even extend past the boundary can beneficially strengthen a corner or edge of the package when formed. The line of reduced strength facilitate bending of the secured first and second sheets in the region of the corner or the edge and can aid in the defining a sharp or curved edge of the package that has improved rigidity. As illustrated in FIG. 50, the extension of the third sheet to overlap with the boundary of a region can be provided in any one of the regions of the film including the opening panel region and one or more wall regions. FIG. 50 illustrates an embodiment in which the third sheet is secured to the first sheet in the opening panel region and two adjacent wall regions. In this embodiment, the third sheet overlaps and extends beyond the boundaries 426a, 426b, 428a, 428b, of the opening panel region and the wall regions. In the embodiment of FIG. 50, the third sheet 418 overlaps along the entire length of the boundaries. As illustrated in FIG. 51, the third sheet 418 can overlap with only a portion of the boundaries in one or more of the regions. Additionally, the third sheet 418 may overlap with both the opposed boundaries 426a and 426b and 428a and 428n of the region. If desired, however, the third sheet can overlap with only one boundary.

In some embodiments, for example, for flexible materials for quad-seal packages as described in U.S. Patent Application Publication No. 2012/0312868, the flexible film can include at least one tucking region 436 that is adjacent to a boundary of the opening panel region and/or a boundary 438 of at least one wall region 424c (as illustrated in FIG. 50). The tuck folding region is configured to be tucked inward to define an edge of wall or panel of the package. The flexible film can include a fourth sheet 434 secured to the first sheet in the tuck folding region 436. As described above with the third sheet, the fourth sheet can include a line of reduced strength 439 in the region of the boundary 438 to facilitate folding the flexible film into the tuck fold. The fourth sheet can provide improved rigidity to the edge of the package at the tuck fold, which in turn can provide improved rigidity to the panel or wall of the package adjacent to the tuck fold. In some embodiments, as noted above, the third sheet can function as the fourth sheet and be disposed in the tuck folding region. For example, the flexible material can be folded into the package such that tuck fold regions are provided at the boundaries of the opening panel region. Extension of the third sheet past the boundary as illustrated in FIG. 50 can result in the third sheet extending into and supporting the tuck fold, as described with respect to the fourth sheet.

Figure 31:
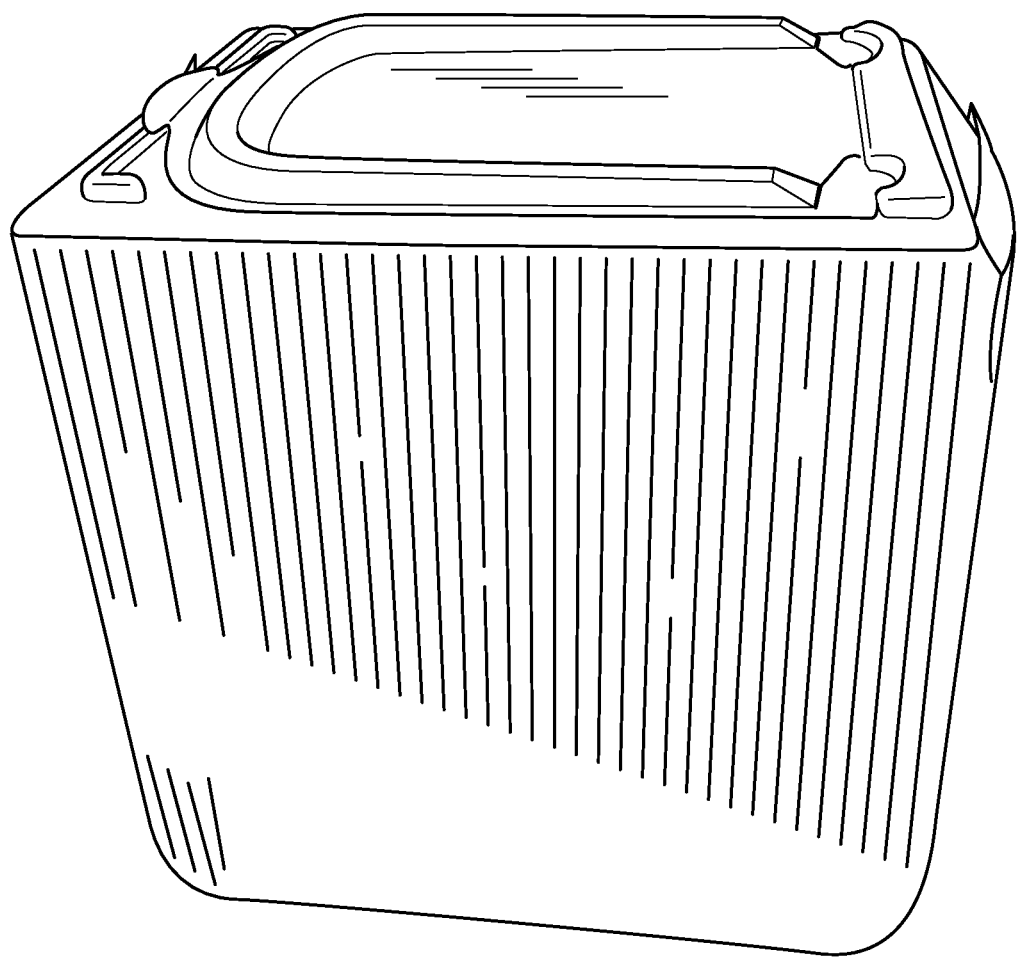
FIG. 31 is a perspective view of a container in accordance with an embodiment of the disclosure, the containing having a portion of film that is transparent or translucent to provide a window through which the product disposed in the container can be viewed.
Figure 47:
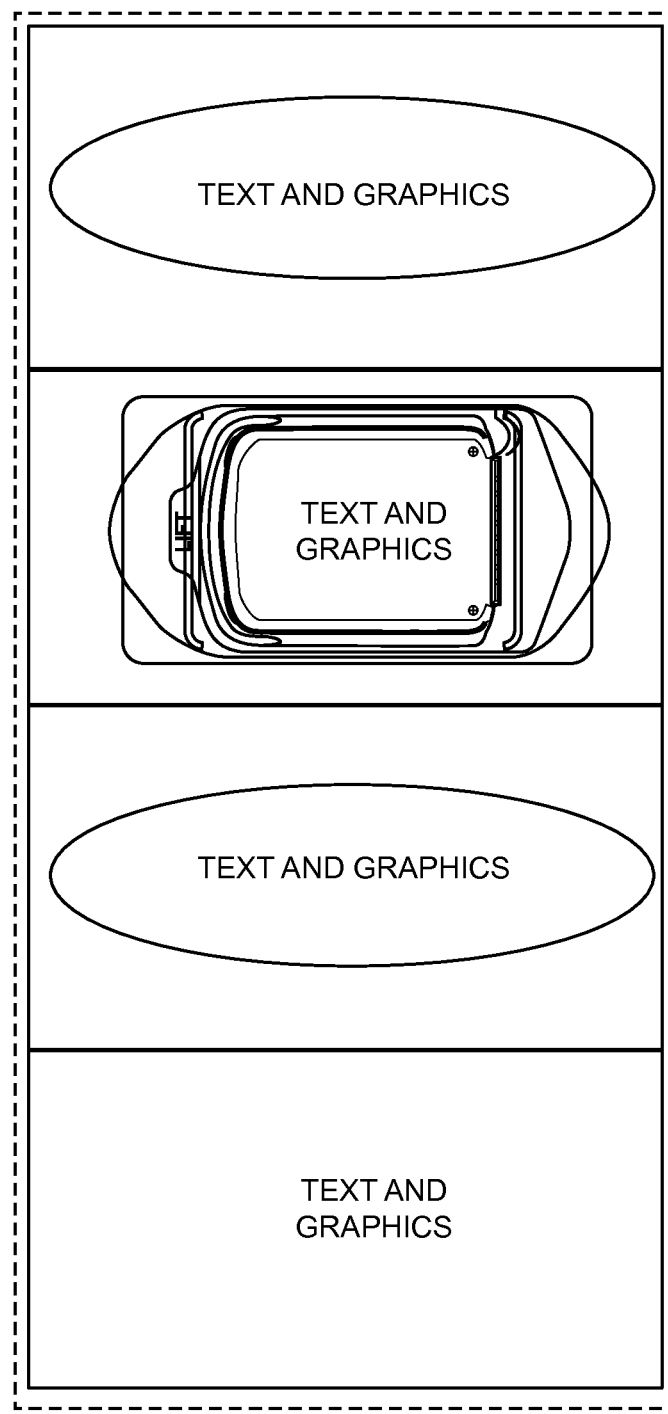
FIG. 47 is a first example of a graphical layout for the patterning and/or coloring on the film.
Figure 48:
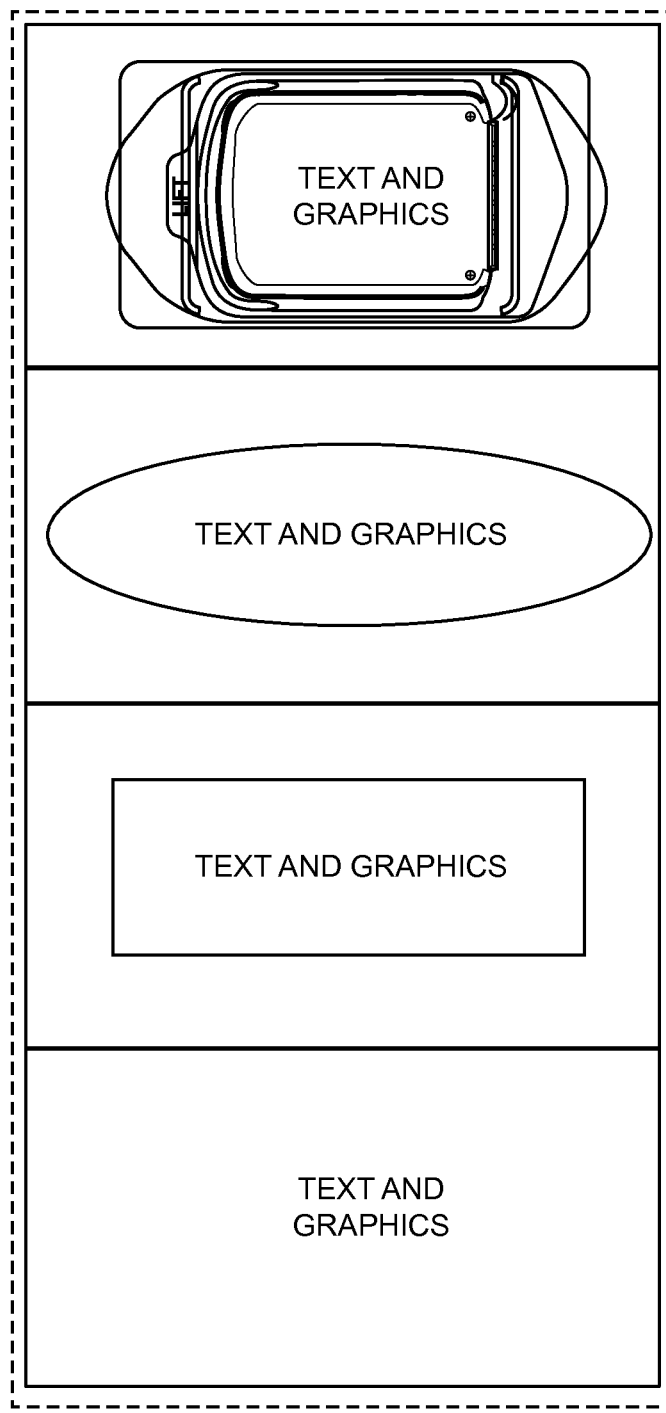
FIG. 48 is a second example of a graphical layout for the patterning and/or coloring on the film.

The film can include any suitable printed or graphics. For example, all or portions of the film can be colored. Referring to FIG. 31, in one embodiment, the film can be colored such that a portion of the film remains transparent or translucent to provide a window for viewing the product contained therein. The graphical layout for the patterning and/or coloring on the film can be adapted based on the package configuration and graphics to be displayed on the package. In embodiments in which a closure assembly is formed into the lid, the graphical layout illustrated in FIG. 47 can be used when the lid-forming process is performed on the side of the forming tube. In other embodiments in which a closure assembly is formed into the lid, the graphical layout illustrated in FIG. 48 can be used when the lid-forming process is performed on the front of the forming tube. The lid forming process can be performed on any one side of the forming tube.

The First Sheet

The first sheet 414 may have any suitable thickness, and the thickness may be a uniform thickness or may vary. In various embodiments, the first sheet 414 has a nominal thickness of about 1 mils to about 10 mils, about 3 mils to about 9 mils, about 4 mils to about 8 mils, about 5 mils to about 7 mils, about 2 mils to about 6 mils. Other suitable nominal thicknesses include, for example, about 1, 2, 3, 4, 5, 5.1, 5.2, 5.3, 5.4, 5.5, 5.6, 5.7, 5.8, 5.9, 6, 7, 8, 9, and 10 mils. As used herein, the term "nominal thickness" refers to the thickness of a film or sheet material, not including ink or adhesive layers.

Exemplary materials suitable for use as the first sheet 414 include, but are not limited to, a laminate of 150 ga cast polypropylene, 120 ga polylactic acid, and 2.875 milcoex ethylene vinyl alcohol (EVOH) (12321.302 W), a laminate of 150 ga cast polypropylene, 76 ga formable polyethylene terephthalate (PET), and 3.5 mil high clarity polyethylene, a laminate of 140 ga biaxially oriented polypropylene, 92 ga PET, and 3.5 mil high clarity polyethylene. The laminate layers can be adhered together using any suitable adhesives. The thicknesses referred to in this paragraph are nominal thicknesses of the laminate layers. As desired inks to color or apply graphics to the film can be applied between the laminate layers or can be applied to an exposed surface of the film.

The material can be selected based on the product to be incorporated therein. For example, for salty snack foods, the material of the package film generally provides one or more of a moisture barrier to keep the food crisp, an oxygen barrier to reduce rancidity of the oils that are often used as ingredients or cooking aids for the product, and a light barrier to reduce the presence of light in the package, which for some products can cause or increase rancidity of the product.

The first sheet can be polypropylene, which can provide good moisture barrier properties. The polypropylene can be metalized to improve the moisture barrier properties as well as provide oxygen barrier properties and reduce light transmission. Other exemplary materials include, for example, polyesters, such as PET, and nylons, such as polyamides.

As described above the first sheet can be a composite or laminate structure. For example, in some embodiments, the material of the first sheet can include a polyethylene as a tie or adhesion layer between two layers of polypropylene. Such layering can improve the ability of the film to resist tearing or tear propagation. Sealants can also be used in the film. Sealants can be provided as coextrusions (i.e., as distinct layers within a film), blends (mixtures of polymers in a single layer), and combinations thereof. Suitable sealants include linear low density polyethylene, ultra low density polyethylene, high density polyethylene, metallocene, plastomer, hexene, butene, and combinations thereof. Other sealants include EVA copolymers, SURLYN® (Ionomers), and EMA's.

Additional coatings or structure can be added to base material or laminate of the first sheet to enhance desired properties. For example, PVDC (SARAN®) can be coated on first sheet material to enhance the oxygen barrier properties. Acrylic coating can be applied to the first sheet material to provide the desired surface energies and characteristics for enhancing the efficiency of processing the film on a packaging machine.

The Second Sheet

The second sheet may be formed from materials such as polypropylene (PP), ethyl vinyl alcohol, polylactic acid (PLA), polyethylene terephthalate (PET), polyethylene (PE), EVA co-polymers, foil (such as aluminum foil), paper, polyester (PET), nylon (poly amide), and laminates and composites thereof.

In various embodiments, the second sheet can be a resealable label. For example, the resealable label can be as described in U.S. Pat. Nos. 6,113,271, 6,918,532, 7,344,744, 7,681,732, and 8,182,891, the disclosures of which are incorporated herein by reference. For example, the resealable label 20 can be formed by delaminating a web of pressure sensitive film, for example, bi-axially oriented polypropylene (BOPP) film, having a resealable pressure sensitive adhesive, from a release liner. Other suitable materials for the resealable label include, for example, EarthFirst® polylactic acid (PLA), BOPP (for example clear or white), polystyrene (PS), and polyethylene terephthalate (PET). Any other known resealable label materials can also be used. The resealable label can also include any known pressure sensitive adhesive, including but not limited to, emulsion acrylic and solvent acrylic. Suitable labels are commercially available as well, such as the Avery Dennison RS195 and RS423 labels, and Flexcon V-312, V-314, and V-233 labels.

The second sheet can have any suitable thickness. For example, the second sheet can have a nominal thickness in a range of about 1 mil to about 15 mil, about 2 mil to about 10 mils, about 3 mils to about 7 mils, about 4 mils to about 10 mils, or about 7 mils to about 12 mils. Other suitable nominal thicknesses include, for example, about 1, 2, 3, 4, 5, 6, 7, 8, 8, 9, 10, 11, 12, 13, 14, and 15 mils. In one embodiment, the second sheet is formed of 10 mil (nominally thick) PET. In some embodiments, the second sheet can be adhered to the first sheet such that at least a portion of the second sheet is adhesively resealable to the first sheet. For example, a portion of the second sheet can be attached to the second sheet using a resealable adhesive. In an embodiment, a portion of the second sheet is permanently adhered to the first sheet such that the second sheet cannot be completely removed from the first sheet. As used herein the term "permanently adhered" refers to bond between the sheets cannot be broken without at least partial destruction of at least one of the sheets.

In other embodiments, the second sheet is not resealably adhered to the first sheet, but with at least a portion of the second sheet being removable from the first sheet. For example, the second sheet can be adhered to the first sheet such that the second sheet has a peel strength in a range of 500 to 1200 grams/inch when peel from cast polypropylene film. The cast polypropylene film can have, for example, a surface energy in a range of about 30 dines to about 50 dines, about 32 dines to about 44 dines, about 32 dines to about 36 dines, about 45 dines to about 50 dines, about 30 dines to about 45 dines, and about 40 dines to about 50 dines. Other suitable surface energies include about 30, 31, 32, 33, 34, 35, 36, 37, 38, 39, 40, 41, 42, 43, 44, 45, 46, 47, 48, 49, or 50 dines. The second sheet is selected and adhered to the first sheet such that there is no residual stickiness once the package is opened and at least a portion of the second sheet is pulled away from the first sheet. In some embodiments, portions of the adhesive used to adhere the second sheet to the first sheet can be deadened, for example by using a varnish or lacquer, in regions in which it is undesirable to include an adhesive. For example, regions of the adhesive can be deadened to facilitate opening of the package and reduce the strength required to open a package. In some embodiments, the second sheet is adhered to the first sheet using an adhesive and upon peeling of the second sheet from the first sheet, there is no adhesive transfer to the first sheet. In some embodiments, for example, embodiments in which a moist or wet product is to be stored in the package, a moisture-resistant adhesive can be used to adhere the first and second sheets. For example, the moisture-resistant adhesive can be a non-whitening adhesive. As used herein the term "non-whitening adhesive" refers to adhesives that are not aesthetically changed when contacted with water or moisture. As described in detail below, the package can further include a third sheet attached to the first sheet in the region of the opening. The third sheet can add stability to the region about the opening by increasing the gauge of the package in that region. In one embodiment, the third sheet is applied to the first sheet on a surface opposite to the surface to which the second sheet is applied. In another embodiment, the third sheet is applied to a surface of the first sheet and the second sheet is applied to a surface of the third sheet.

The Third Sheet

The third sheet may be formed from materials such as polypropylene (PP), ethyl vinyl alcohol, polylactic acid (PLA), polyethylene terephthalate (PET), polyethylene (PE), EVA co-polymers, foil (such as aluminum foil), paper, polyester (PET), nylon (poly amide), and laminates and composites thereof.

The third sheet can have any suitable thickness. For example, the third sheet can have a thickness in a range of about 1 mil to about 15 mil, about 2 mil to about 10 mils, about 3 mils to about 7 mils, about 4 mils to about 10 mils, or about 7 mils to about 12 mils. Other suitable thicknesses include, for example, about 1, 2, 3, 4, 5, 6, 7, 8, 8, 9, 10, 11, 12, 13, 14, and 15 mils. In one embodiment, the third sheet is formed of 10 mil PET. In another embodiment, the third sheet is formed of a laminate of PLA and EVOH and has a thickness of 7 mil.

The third sheet can be attached to the first sheet using any known permanent adhesion methods, such as for example, heat sealing and application of permanent adhesives.

Depending on the end use of the product, the film, including the first, second and optional third sheets and any adhesives or inks used therein can be formed with FDA compliant materials.

Zone d Attachment

In various embodiments, the second sheet can be adhered to the first sheet (or in some embodiments a third sheet disposed on the portion of the first that defines the exterior portion of the package) using zoned adhesion. The adhesion between the first and second sheet can be defined by a suitable number of zones, with each zone having a different level of adhesion. For example, in one embodiment, the second sheet can be adhered to the first sheet using two adhesion zones. A first zone can be defined by the region that is disposed interior the edge of the opening—that is the region in which the portion of the first sheet separates and is designed to remain adhered to the second sheet upon opening of the package. The second zone can be defined by the region disposed outside of the edge of the opening and to which the second sheet reseals to the first sheet and/or where the closure assembly provides a mechanical closure between formed structures in the first and second sheets to reclose the package. In various embodiments, the first zone can have a greater adhesion than the second zone to facilitate opening of the package. In some embodiments, such as embodiments having a mechanical closure, the second zone can be a region of substantially no chemical adhesion between the first and second sheet, relying instead on the mechanical closure. For example, the second zone can be coated with a deadening agent or varnish to reduce or eliminate any adhesive properties of an adhesive which is applied to adhere the second sheet to the first sheet in the first zone. This can eliminate the need to selectively apply adhesive and can facilitate the manufacturing process. Zoned adhesion can be done with heal sealing techniques, selective application of deadening agents, and/or the selective application of adhesives.

In the embodiment illustrated in FIG. 30, the adhesion can be provided in three adhesive zones. For example, the first and second sheets are adhered in a zone that defines a portion of the second sheet that is configured to remain adhered to a portion of the first sheet upon opening of the package. A zone can be defined in an overlapping portion provided in a region of the opening, inside the edge of the opening, in which the second sheet is adhered to a portion of the first sheet surrounding the aperture to provide a hermetic seal despite perforations that are provided in the first sheet to define the aperture. The overlapping portion is dimensioned such that a sufficient seal is provided between the first and second sheets to retain a hermetic seal despite perforations in the first sheet used to define the aperture and the second sheet is capable of detaching from the first sheet in the overlapping portion upon opening of the package for the first time when a portion of the first sheet is detached at the perforations or other edge feature defining the opening. This zone can have an adhesion property such that it is less than the adhesion between the first and second sheet in the first zone, to facilitate opening of the package while maintaining a hermetic seal. Another zone can be defined in a region disposed outside of the edge of the opening. For example, a this zone can be defined where the thermoformed features are formed into the first and second sheet to define a closure assembly. This zone can have substantially no adhesion between the first and second sheet to further facilitate opening of the package.

The second sheet can be adhered to the first sheet using an adhesive. A process of zoning the adhesive can include applying a deadening agent to the first sheet in region in which adhesion between the first and second sheet is not desired. An adhesive can then be applied to the entire second sheet and adhered to the first sheet. The deadening agent will eliminate the adhesive properties of the adhesive in the regions in which it is applied, thereby zoning the adherence without need to apply the adhesive in a zoned manner. This can simplify the adhesive application process.

The selective application of the deadening agent or varnish can be accomplished, for example, during the printing process for printing graphics onto the package. This can advantageously provide a rapid process for defining a deadened or reduced adhesive zone with high throughput printing machines.

In some embodiments, the selective application of an adhesive or different types of adhesive can be accomplished using a printing machine, such as for printing graphics on a film package.

In various embodiments, the flexible material can include the first second sheet secured to the first sheet in zones of the opening panel region. As described above, the third sheet can be interposed between the first and second sheets in some embodiments. It is contemplated that the zones and relative peel strengths described below with respect to securing the first sheet to the second sheet in the opening panel region apply to the peel strengths associated with instead securing the second sheet to the third sheet. The peel strength between the first and second sheets 414, 416 in the opening panel region 420 can be defined by a suitable number of zones. The some of the zones can have different peel strengths. As used herein, the term "peel strength" refers to the strength of the adherence of bond between two sheets or layers. In embodiments in which a sheet or layer is permanently secured to another sheet or layer, the peel strength between the layers or sheets is infinite, as separation of the sheets or layers results in destruction of one or both of the sheets or layers. In embodiments in which two sheets or layers are disposed on each other, but not secured together, there is no peel strength, which is described herein as a peel strength of 0 gms/in.

Figure 30C:
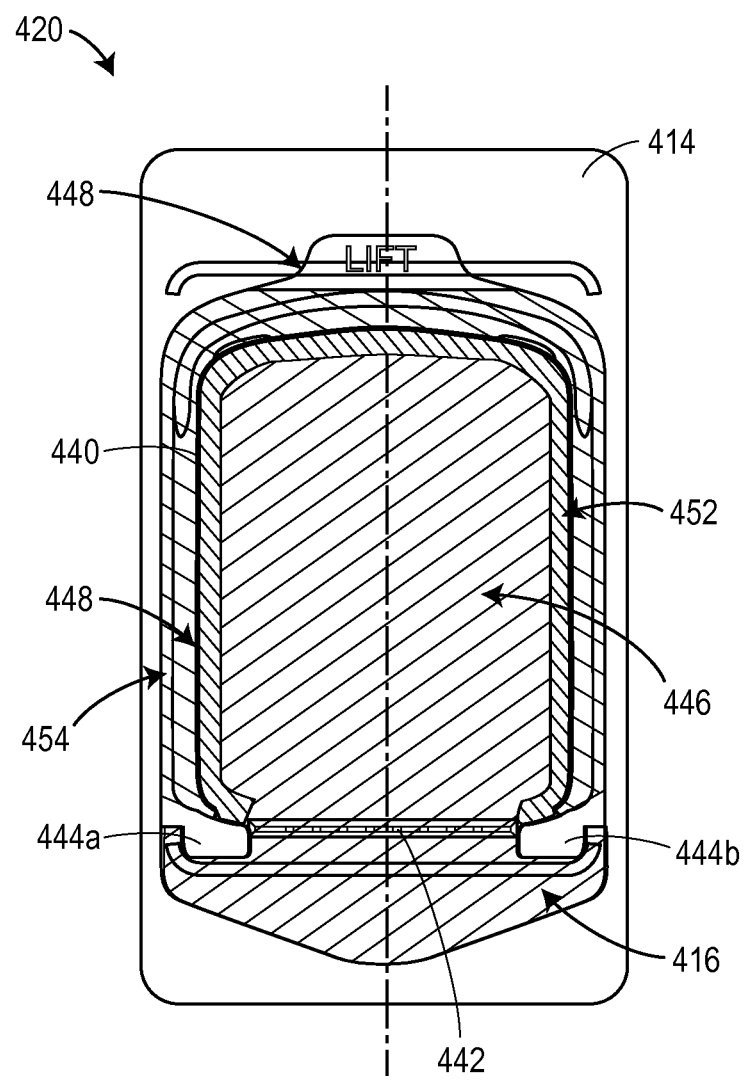
Figure 30D:
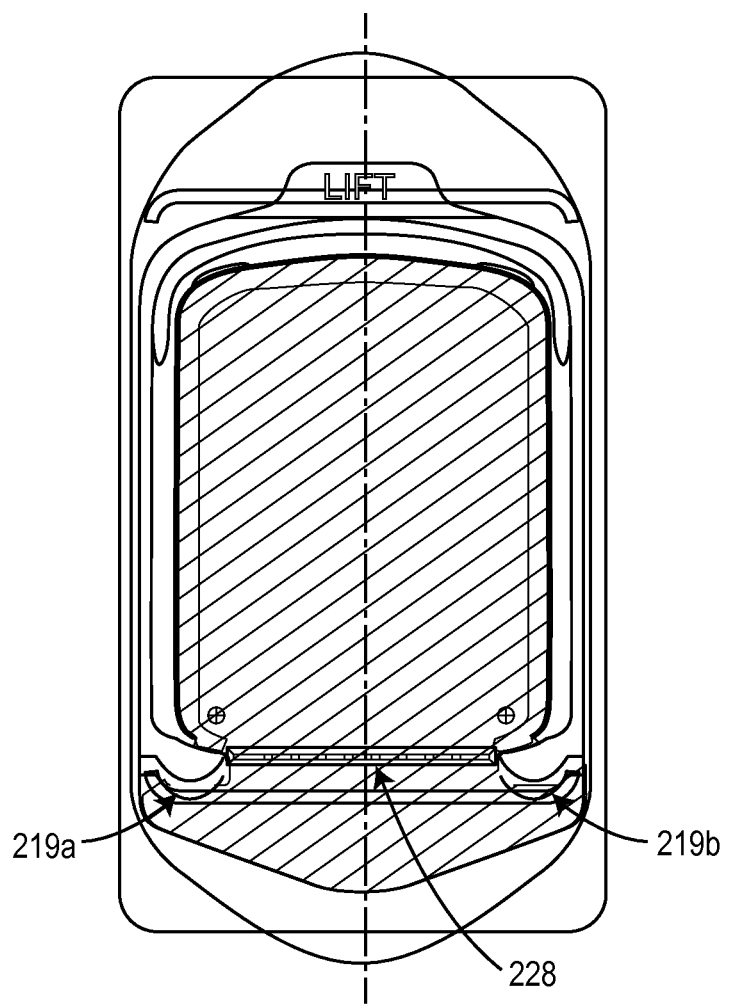
FIG. 30d is a schematic illustration of an opening panel region in accordance with embodiments of the disclosure, illustrating the cuts made in the various layers for forming the closure assembly.

Referring to FIG. 30*a*, for example, in one embodiment, the opening panel can include first and second zones 446, 448. The first zone is adjacent to the second zone and in some embodiments directly adjacent to each other with no intervening zone (as illustrated in FIG. 30*a*). A first portion of the first sheet is secured to a first portion of the second sheet in the first zone, and a second portion of the first sheet is secured to a second portion of the second sheet in the second zone. The peel strength between the first and second sheets in the first zone is greater than the peel strength between the first and second sheets in the second zone. For example, the peel strength in the second zone can be about 10% to about 60% of the peel strength of the first zone. A portion of the second zone can be configured to thermoformed to include the closure assembly features or other formed features as described herein. FIGS. 30*a*-30*c* illustrate formed features in a portion second sheet to illustrate regions of the second sheet that can be configured to be thermoformed. It should be understood that such formed features need not be included in the flexible material prior to package forming and can be formed while configured the flexible material into the package as described herein.

The first zone 446 can include at least the portion of the opening panel region configured to define the opening of the package. Referring to FIGS. 30*a*-*c*, the opening panel region includes an opening boundary, which can optionally be defined by the line of reduced strength 440. The opening boundary is an outer boundary of the opening of the package. In various embodiments, the first zone 446 corresponds to portion of the opening panel region 420 in which the first sheet 414 is configured to remain attached to the second sheet 416. For example, when opening a package formed of the flexible material 400, a portion of the first sheet can detach from a remaining portion of the first sheet 414 at the opening boundary and remain secured to the second sheet 418 upon opening of the package. Additionally, as illustrated in FIG. 30*a*, in some embodiments, the first zone 446 can also include a lid rear region of the opening panel that is configured such that a lid of the closure assembly of a packaged remains secured in the lid rear region.

As illustrated in FIG. 30*a*, the first zone 446 can include portions of the opening panel region disposed on opposed sides of the opening boundary. Referring to FIG. 30*b*, the first zone 446 can be disposed only inward of the opening boundary. The first zone can have a peel strength of at least 500 gms/in. For example, the peel strength in the first zone can be about 500 gms/in to about 2000 gms/in, about 600 gms/in to about 1500 gms/in, about 1000 gms/in to about 2000 gms/in. Other suitable peel strengths include about 500, 600, 700, 800, 900, 1000, 1100, 1200, 1300, 1400, 1500, 1600, 1700, 1800, 1900, and 2000 gms/in. In some embodiments, the first sheet is permanently secured to the second sheet in the first zone.

Referring to FIGS. 30*a*-*c*, the second zone 448 can be directly adjacent to the first zone. The second zone 448 generally includes a portion of the opening panel region configured to be thermoformed. For example, the second zone can include a thermoformed portion of the opening panel region configured to have the second engagement feature or channel thermoformed therein. The second zone can have a peel strength of about 0 gms/in to about 200 gms/in, about 5 gms/in to about 175 gms/in, about 10 gms/in to about 150 gms/in, about 25 gms/in to about 125 gms/in, about 50 gms/in to about 100 gms/in about 75 gms/in to about 150 gms/in, or about 0 gms/in to about 2 gms/in. Other suitable peel strengths include, for example, 0, about 5, 10, 15, 20, 25, 30, 35, 40, 45, 50, 60, 70, 80, 90, 100, 125, 150, 175, or 200 gms/in.

Referring to FIG. 30*a*, for example, the first zone 446 can extend up to a portion of the second sheet that is configured to be thermoformed (referred to herein as the "thermoformed portion"). As illustrated in FIG. 30*a*, for example, the first zone 446 extends up to the thermoformed portion of the opening panel region (illustrated in FIG. 30*a* by inclusion of the formed channel). The second zone 448 contains the thermoformed portion and a portion of the opening panel region having the first sheet 414 secured to the second sheet 416 outward of the thermoformed portion.

Referring again to FIG. 30*b*, in some embodiments the second zone 448 can be disposed inward the thermoformed portion up to the opening boundary.

Referring to FIG. 30*c*, in some embodiments, the opening panel region can include a third zone 452 disposed between the first and second zones 446, 448. For example, as illustrated in FIG. 30*c*, the first zone 446 can be bounded in part by the opening boundary, the third zone 452 can be disposed between the opening boundary and the second zone 448. The third zone 452 can have a peel strength that is less than the peel strength in the first zone 446. Optionally the third zone 452 can have a peel strength that is substantially equal to the peel strength in the second zone.

The third zone can have a peel strength of about 0 gms/in to about 200 gms/in, about 5 gms/in to about 175 gms/in, about 10 gms/in to about 150 gms/in, about 25 gms/in to about 125 gms/in, about 50 gms/in to about 100 gms/in about 75 gms/in to about 150 gms/in, or about 0 gms/in to about 2 gms/in. Other suitable peel strengths include, for example, 0, about 5, 10, 15, 20, 25, 30, 35, 40, 45, 50, 60, 70, 80, 90, 100, 125, 150, 175, or 200 gms/in.

In various embodiments, the second zone 448 can be disposed only in the thermoformed portion (i.e., the region in which the second engagement feature is to be formed. A fourth zone can optionally be provided outward of the second zone 448 thermoformed region. The fourth zone 454 can have a peel strength that is less than or greater than the peel strength of the second zone 458, but is less than the peel strength of the first zone 446.

FIGS. 30*a*-*c* further illustrates an embodiment in which the opening panel region includes a pull tab region. The pull tab region can define a pull tab zone 450. The pull tab zone can have a peel strength of 0 gms/in to about 30 gms/in, about 0 gms/in to about 5 gms/in, about 1 gms/into about 10 gms/in, about 3 gms/in to about 7 gms/in, about 10 gms/into about 30 gms/in, about 15 gms/in to about 20 gms/in, and about 5 gms/in to about 25 gms/in. Other suitable values include, for example, about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, and 30 gms/in. In some embodiments, the second zone can include the pull tab zone, in other embodiments, the second zone can have a peel strength different that the pull tab zone 450.

In various embodiments in which the flexible material is configured to form a package having first and second projections 219a, 219b in the closure assembly, the portion of the opening panel region in which the first and second projections 219a, 219b (illustrated in FIGS. 30a-30c as being defined by lines of reduced strength 444a, 444b) are defined, can define a projections zone 443a, 443b. The peel strength of the projection zone 443a, 443b can about 0 gms/in to about 30 gms/in. Have reduced peel strength in the projection zone 443a, 443b can aid in allowing the projections 219a, 219b to freely move along the first sheet 414 when pivoting between first and second positions as described below.

In some embodiments, such as embodiments having a mechanical closure, the second zone 448 can be a region of substantially no chemical adhesion between the first and second sheet 414, 416, relying instead on the mechanical closure. For example, the second zone 448 can be coated with a deadening agent or varnish to reduce or eliminate any adhesive properties of an adhesive which is applied to secure the second sheet to the first sheet in the first zone. This can eliminate the need to selectively apply adhesive and can facilitate the manufacturing process. Zoned adhesion can be done with heal sealing techniques, selective application of deadening agents, and/or the selective application of adhesives.

A process of zoning the adhesive in the opening panel region having the first sheet secured to the second sheet can include application of the adhesive to one or both of the first and second sheets. The process can then include applying a deadening agent to the first or second sheet in the opening panel region in a zone in which reduced peel strength is desired. For example, a deadening agent can be applied in the second zone and optional third zone at a coverage percentage of about 50% to about 100% to achieve the desired peel strength in the second zone. By way of further example, the deadening agent can be applied at a coating percentage of 100% in the pull tab zone to achieve no peel strength between the pull tab on the second sheet and the first sheet in the pull tab zone. The deadening agent reduces the peel strength where applied with the amount of reduction corresponding to the coating percentage of the deadening agent. Use of a deadening agent to achieve the desired peel strengths in the various zones can simply the flexible material making process by avoiding the need to zone adhesive. Deadening agents can be printed for examples in similar fashion to printing inks and graphics on a sheet material, allowing for precise control over the location and coating percentage of the deadening agent. In alternative embodiments, an adhesive or sealing process can be applied/performed in a zoned fashion. For example, heat seals can be formed in the first zone to achieve the desire peel strength, while adhesives can be used in the second and optional third or fourth zones to achieve the desired reduced peel strengths. In some embodiments, different adhesive chemistries resulting in different adhesion strengths can be selectively applied to the regions to achieve the desired peel strengths.

The selective application of the deadening agent or varnish can be accomplished, for example, during the printing process for printing graphics onto the package. This can advantageously provide a rapid process for defining a deadened or reduced adhesive zone with high throughput printing machines.

In some embodiments, the selective application of an adhesive or different types of adhesive can be accomplished using a printing machine, such as for printing graphics on a film package.

Any of the second, third, fourth, pull tab and/or projection zones can have the first and second sheets secured using a sealing layer. In one embodiment, the sealing layer can be comprised of materials that contain both compatible and incompatible polymers as the surface of the second sheet that is adapted to contact the first sheet. The second sheet can be adhered to the sealing layer using known processes, such as, for example, heat sealing. When the package is opened, the two adjoined surfaces peel apart in the area that was subjected to the sealing process because of the controlled incompatible polymer chosen. In a second embodiment, the sealing layer of the first sheet can be identical to the sealing layer on the second sheet. The second sheet can be adhered to the sealing layer using heat which melts and bonds the two surfaces. In this embodiment, one of the two sealing surfaces is designed to have just a thin layer of the polymer and just adjacent to it (away from the sealing interface) has a layer which is designed to break away. This breakage allows the transfer of one polymeric surface to the other surface and thru such transfer, opens the package. In various embodiments, the flexible material including the first sheet, the second sheet, and optionally the third sheet, can be thermoformed to form a closure assembly having a lid formed in the flexible material. In such embodiments, the flexible material must be adapted for thermoforming and have a desired heat transfer through the flexible material structure (i.e., the second sheet, first sheet, and optional third sheet). In some embodiments of the forming process, the flexible material can be heated from one side, for example, the side of the flexible material that is disposed on the exterior of the package. When heating from one side, the flexible material can have a structure such that the higher melting point materials are disposed closer to the heat source than lower melting point materials. Thermal conductivity of the polymers can be controlled and tailored based on desired packaging machine line speeds.

Other parameters of the flexible material that can be selected or tailored to provide the desired line speed, thermoforming, and/or sealing properties include elastic modulus E. The elastic modulus is a measure of a materials resistance to deformation or its stiffness.

The mechanical properties of polymers, such as those which can be included in the flexible materials of the disclosure, are dependent on temperature. For example, the flexible materials of the disclosure can have 1% secant modulus of greater than about 60,000 psi in the stackable direction, as measured using ASTM D882 at 23° C.

Method and Apparatus for Manufacturing a Flexible Container

Turning to the assembly of the re-closable packaging assembly 10, the container 12 may be formed or assembled in any manner known in the art. For example, the container 12 may be formed as described in U.S. Pat. No. 8,231,024, which is herein incorporated by reference in its entirety. For example, the first sheet 14 may be provided as a roll of material, and the second sheet 24 may be secured to desired portions of the first sheet 14 along the roll. The opening 20 may also be pre-cut on the first sheet 14. In some embodiment in which a lid is formed into the film, the second sheet may be pre-cut to the dimensions of the lid edge 76 such that no additional cutting operations may be required on the second sheet 24 subsequent to attachment to the first sheet 14. One or more forming stations may be provided at a desired location along the assembly line to form desired features of the container 12 and/or the closure assembly 22.

The first forming station may include thermoforming the desired features of the container 12 and/or the closure assembly 22. Thermoforming is a manufacturing process where a plastic sheet, such as the first sheet 14 and/or the second sheet 24, is heated to a pliable forming temperature and formed to a specific shape in a mold. The sheet, or "film" when referring to thinner gauges and certain material types, is heated in an oven to a high-enough temperature that it can be stretched into or onto a mold and cooled to a finished shape. Instead of thermoforming, one skilled in the art would recognize that other manufacturing operations may be used to form the first engagement feature 36 and the first securement feature 104*a* (or any other features described herein).

In a typical thermoforming process, a plastic sheet (such as the first sheet 14) is fed from a roll into a set of indexing chains that transport the plastic sheet through an oven for heating to forming temperature. The heated sheet then indexes into a form station where a mold (such as the molds illustrated in FIGS. 15A to 17J) and pressure-box close on the sheet, with vacuum then applied to remove trapped air and to pull the material into or onto the mold along with pressurized air to form the plastic to the detailed shape of the mold. After a short form cycle, a burst of reverse air pressure is actuated from the vacuum side of the mold as the form tooling opens, commonly referred to as air-eject, to break the vacuum and assist the formed parts off of, or out of, the mold. A stripper plate may also be utilized on the mold as it opens for ejection of more detailed parts or those with negative-draft, undercut areas. As previously explained, one or more forming stations may be provided at any suitable location along the assembly line. For example, a system for making the packages of the disclosure can include a forming tube, about which the film is folded for making the package. Along the forming tube, one or more heating stations (see heating stations 138 in FIGS. 19A to 19F, for example) and forming stations for making the thermoformed features can be included. Referring to FIGS. 33A-33D, in one embodiment, the machine can be provided with two preheating stations that heat the film to a suitable temperature for thermoforming and a forming station that includes a die to which the preheated film is conformed to form the desired features, such as the closure assembly. The heating and/or forming stations can be disposed such that the thermoforming process occurs while the film is folded about the forming tube process to form the package structure. In one embodiment, the film is provided into the machine from a film roll and is folded about the forming tube by passing the film over a collar. While on the forming tube, a portion of the film is preheated for thermoforming. The film then passes over a die having the desired structures for thermoforming and compressed to conform the film to the structures of the die. The film can then proceed to stations for forming the seals of the package.

The forming tube can be adapted such that for a portion of the forming station, for example, the die can be integrally incorporated onto the forming tube or may be directly secured to the forming tube. As illustrated in FIGS. 34A to 34E and 35, the forming tube 307 can have a first portion having a first diameter and a second portion 192 downstream the first portion having a second diameter less than the first diameter. The forming tube 307 may also have a square or rectangular cross-sectional shape, and the perimeter of the second portion 192 may be less than the perimeter of the first portion. A die 193 (such as or similar to the die illustrated in FIGS. 40A to 40F, for example) for thermoforming can be attached to or integrally formed into the forming tube 191 at the second portion 192. The first and second diameters (or perimeters) are selected such that when the film passes from the first portion of the forming tube to the second portion of the forming tube with a die installed thereon, the film remains in substantially the same plane. In some embodiments, the forming tube can also be used as the fill tube for filling the product into the containing. In such embodiments, the interior of the forming tube can include a restriction portion that reduces the diameter on the inside of the forming tube to the size of the second diameter such that product flow through an interior portion of the forming tube having a consistent diameter.

For example, a first forming station may form the first engagement feature 36 (e.g., the ridge 40) and, optionally, the first securement feature 104*a*. The first forming station may also form any or all of the second engagement portion 38, the convex portion 98, the second securement feature 104*b*, the hinge portion 28 of the closure assembly 22, the one or more ribs 51, and/or the locking mechanism 126, for example. Other desired features may also be formed at the first forming station. The first engagement feature 36, the first securement feature 104*a*, the second engagement portion 38, the convex portion 98, the second securement feature 104*b*, the hinge portion 28 of the closure assembly 22, the one or more ribs 51, and/or the locking mechanism 126 may all be formed at the first forming station using a single mold (such as the molds illustrated in FIGS. 15A to 17J) in a single process step. Alternatively, the first engagement feature 36 and the first securement feature 104*a* may be formed at the first forming station using a single mold in a single manufacturing operation, and the second engagement portion 38, the convex portion 98, the second securement feature 104*b*, and the hinge portion 28, or example, may be formed at a second forming station that is remote from the first forming station. If the opening 20 (and/or cuts 107*a*, 107*b* of the hinge portion 28 of the embodiment of FIGS. 20A and 20B) is not pre-cut, the opening 20 or cuts 107*a*, 107*b* may be cut by a die at the first forming station at the same time as the first engagement feature 36, the first securement feature 104*a*, the second engagement portion 38, the convex portion 98, the second securement feature 104*b*, the hinge portion 28 of the closure assembly 22, the one or more ribs 51, and/or the locking mechanism 126 are formed. Alternatively, the opening 20 or cuts 107*a*, 107*b* may be cut by a cutting die prior to, during, or after the forming operation at the first forming station. A cutting operation for the cutting of the opening 20 or cuts 107*a*, 107*b* would include inserting a blade of a cutting die (that corresponds to the shape of the opening 20 or cuts 107*a*, 107*b*) through the first sheet 14 up to (but not through) the second sheet 24.

In various embodiments, the forming die and/or forming structure can include structures to retain the film so that it is able to controllably stretch during the forming process. This can aid in reducing or preventing tearing or pulling of the film when the film is compressed against the forming die to form the closure assembly structures into the film.

In an embodiment, the opening can be formed or defined in the package at the time of forming the closure assembly. For example, the die used for forming the closure assembly into the film can include a cutting die incorporated within the forming die. For example, the cutting die can be including on a back side of the forming die and arranged such that upon sufficient compression of the forming die the cutting die will pass through an opening provided in the face of the forming die to contact a film disposed on the face of the cutting die. For example, in an exemplary forming operation, a heated film can be disposed on the face of a forming die and compressed at a first compression pressure to conform the heated film to the structure defined in the forming die and cool the film to retain the formed shaped, then the film can be compressed onto the die at a second compression pressure greater than the first compression pressure to engage the cutting die disposed on a back side of the forming die such that the cutting die contacts the film to define the opening. The extent to which the cutting die extends to contact the film and/or second compression pressure can be configured such that the cutting die cuts through the first sheet and optional third sheet, but preferably does not cut through the second sheet. In some embodiments, the cutting die can contact the second sheet, partially scoring the second sheet, so long as the second sheet is not weakened by the scoring.

Any suitable packaging machinery may be used to form the re-closable packaging assembly 10. For example, as illustrated in FIGS. 19A to 19F, a vertical form, fill, and seal (VFFS) packaging machine 135 may be used. The packaging machine 135 is capable of intermittently forming a series of re-closable packaging assemblies 10 from a web of film, such as a roll 136 of the first sheet 14 that may be fed into the packaging machine 135. The roll 136 can be adapted to have a larger diameter than conventional film rolls to accommodate a locally thickened portion of the film, for example, by including a third sheet on the films and/or locally thickening portions of the first sheet. For example, the roll can have an increased diameter of ¾ inch to 1 inch. On such a web of film, the opening 20 (and/or cuts 107a, 107b of the hinge portion 28 of the embodiment of FIGS. 20A and 20B) may be pre-cut (or pre-scored or pre-perforated) on the first sheet 14 and the second sheets 24 may be secured to desired portions of the first sheet 14. One having ordinary skill in the art would recognize that the second sheets 24 could be applied while the web of film is directed through the packaging machine 135 at any point prior to heating and thermoforming. In some applications, the web of film may be pre-printed with graphics relating to the product to be disposed within the re-closable packaging assembly 10, such as product information, manufacturer information, nutritional information, bar coding and the like. The roll 136 may be rotatably mounted on a shaft at the inlet end of the packaging machine 135. The web of film is typically fed into the packaging machine 135 over a series of dancer rolls and guide rolls 137, one or more of which may be driven to direct the first sheet 14 in the direction of the transport path of the packaging machine 135.

Before being formed into the shape of the container 12 of the re-closable packaging assembly 10, the web of film may be directed through one or more heating stations 138 that heat the web of film for a subsequent thermoforming step. The web of film is then directed through a first forming station 140 that may thermoform the desired features of the container 12 and/or the closure assembly 22 as described above. For example, at this first forming station 140, the first engagement feature 36, the first securement feature 104a, the second engagement portion 38, the convex portion 98, the second securement feature 104b, the hinge portion 28 of the closure assembly 22, the one or more ribs 51, and/or the optional locking mechanism 126 may all be formed simultaneously using a single mold. Pressure forming or pressure and vacuum forming may be used. An inert gas may be used for pressure forming and/or for reverse air-eject. Following the first forming station 140, the web of film may then be directed through one or more subsequent forming stations (not shown) that may perform further manufacturing operations, such as scoring or further thermoforming of desired features, as described above. However, it is preferable if all of the forming is done at a single forming station, such as the first forming station 140. After passing through the first forming station 140 (and any subsequent forming station(s)), the web of film is directed to a package forming station 142 having a forming shoulder 144, or other device such as a forming box or sequential folding system, configured to wrap the film around a forming tube 146 in a manner known in the art. In the present example, the forming tube 146 is a product fill tube 148 having a funnel 150 for receiving the product to be disposed in the re-closable packaging assembly 10 and filling the re-closable packaging assembly 10 with the product as the film proceeds along the forming tube 146. The forming tube 146 is configured to form the film into the desired shape based on the characteristics of the final package design, such as square, rectangular, oval, trapezoidal, round, irregular and the like. Of course, where other types of non-VFFS packaging machines are used, a forming tube may not necessarily be used, and instead the film may be wrapped directly around the product to be stored in the re-closable packaging assembly 10. As previously described, the first forming station 140 (or any subsequent forming station) may be disposed at and integrally formed with a downstream end of the forming tube 146.

After the film is formed around the forming tube 146, the web of film moves along the transport path to a combination edge seal/corner seal station 152 to form corner seals at the corners between the sides 16a-f of the container 12, and to create combination edge seal and corner seals, if desired, at the lateral edges of the web of film. In various embodiments, corner seals can border and surround one side of the package or opposed sides of the package. The web of film may pass a series of forming plates and shaping bars, and the web of film may then be directed past welding devices of the station 152 that weld overlapping portions of the film to complete the corner seals of the container 12. Of course, the corner seals and the edge seals of the container 12 may be formed by different work stations depending on the particular configuration of the packaging machine.

The one or more heating stations 138, first forming station 140, and any subsequent forming stations have been described as being located upstream of the package forming station 142 or the combination edge seal/corner seal station 152. However, in alternative embodiments of the packaging machine 135, the web of film may be directed into the one or more heating stations 138, the first forming station 140, and any subsequent forming stations following the seal/corner seal station 152. Alternatively, the web of film may be directed into the one or more heating stations 138, the first forming station 140, and any subsequent forming stations at a point between the package forming station 142 and the seal/corner seal station 152.

In order to further control the movement of the web of film along the forming tube 146 and the transport path, pull belts 154 may be provided after the stations 152 (or after the one or more heating stations 138, first forming station 140, and any subsequent forming stations) to engage the film and pull the film through the previous stations 142, 152.

Following the seal/corner seal station 152, the edges of the container 12 may be sealed to close the container 12, and folded and tacked down to conform to the shape of the container 12 at a closing station 156. At the closing station 156, seal bars 158 may simultaneously close upon the film and may seal a trailing edge (such as the first and/or second edge 48, 50, for example) of a preceding container 12 and a leading edge of a current container 12 in a manner known in the art.

As discussed above, the forming tube 146 of the illustrated embodiment of the packaging machine 135 is a product fill tube 148. Once the leading edge of the container 12 is closed during the sealing process at the closing station 156, the product may be added to the package 12. At that point, a specified amount of the product may be poured through the funnel 150 into the fill tube 148 and dropped into the container 12. After or as the container 12 receives the product, the container 12 advances to align a trailing edge of the container 12 at the closing station 156 and the trailing edge may be tucked and is sealed in the manner described above, thereby sealing the container 12 with the product disposed therein.

At the same time the seals of the adjacent containers 12 are formed, a gas flushing operation may be performed if necessary to place a desired atmosphere in the container 12. Once the container 12 of the re-closable packaging assembly 10 is sealed, it may be detached from the web of film in preparation for any final processing steps and containerization. Consequently, the closing station 156 may further include a knife or other separation device (not shown) proximate the seal bars 158 to cut the common seal and separate the adjacent container 12. Alternatively, the separation may occur at a downstream station.

After separation, the re-closable packaging assembly 10 may drop or otherwise be transported to a conveyor 160 for delivery to the remaining processing stations. For example, the re-closable packaging assembly 10 may drop through a package chute 162. The re-closable packaging assembly 10 may fall loosely at a first conveyor location 164, but mostly aligned onto the conveyor 160. At a second conveyor location 166, package side guides 167a, 167b may hold snug against the re-closable packaging assembly 10 and may positively locate it through a third conveyor location 168. At a fourth conveyor location 170, package side guides 167a, 167b may start to taper down towards the re-closable packaging assembly 10. At a fifth conveyor location 172, the package top guide 173 may hold snug against the re-closable packaging assembly 10 and positively locating it in a vertical direction. One or more glue applicators 175 may deposit glue onto one or more open flaps (e.g., the portions of the first sheet 14 fourth side wall 16e illustrated in FIG. 1) that are to be disposed through a gap between the top of the re-closable packaging assembly 10. At a sixth conveyor location 174, the package side guides 167a, 167b transition from a low profile to a high profile and fold the flaps of the re-closable packaging assembly 10 into the position illustrated in FIG. 1. So disposed, the glue begins to "cure" or harden" and may be fully cured or hardened in this position. At a seventh conveyor location 176, the package side guides 167a, 167b are high profile and continue to hold the one or more flaps in a desired position. If the glue is not fully cured or hardened, it may continue to cure or harden in this position and/or subsequent positions. Alternatively, the one or more flaps could be heat sealed to a corresponding side wall 16d, 16e. If necessary, a post-processing station(s) (not shown) may be included along the conveyor 160 for any additional operations to be performed prior to shipment, such as code dating, weight checking, quality control, labeling or marking, RFID installation, and the like. At the conclusion of the sealing and post-processing activities, the finished re-closable packaging assembly 10 may be removed from the conveyor 160 by a case packer (not shown) and placed into a carton (not shown) for storage and/or shipment to customers.

Figure 36:
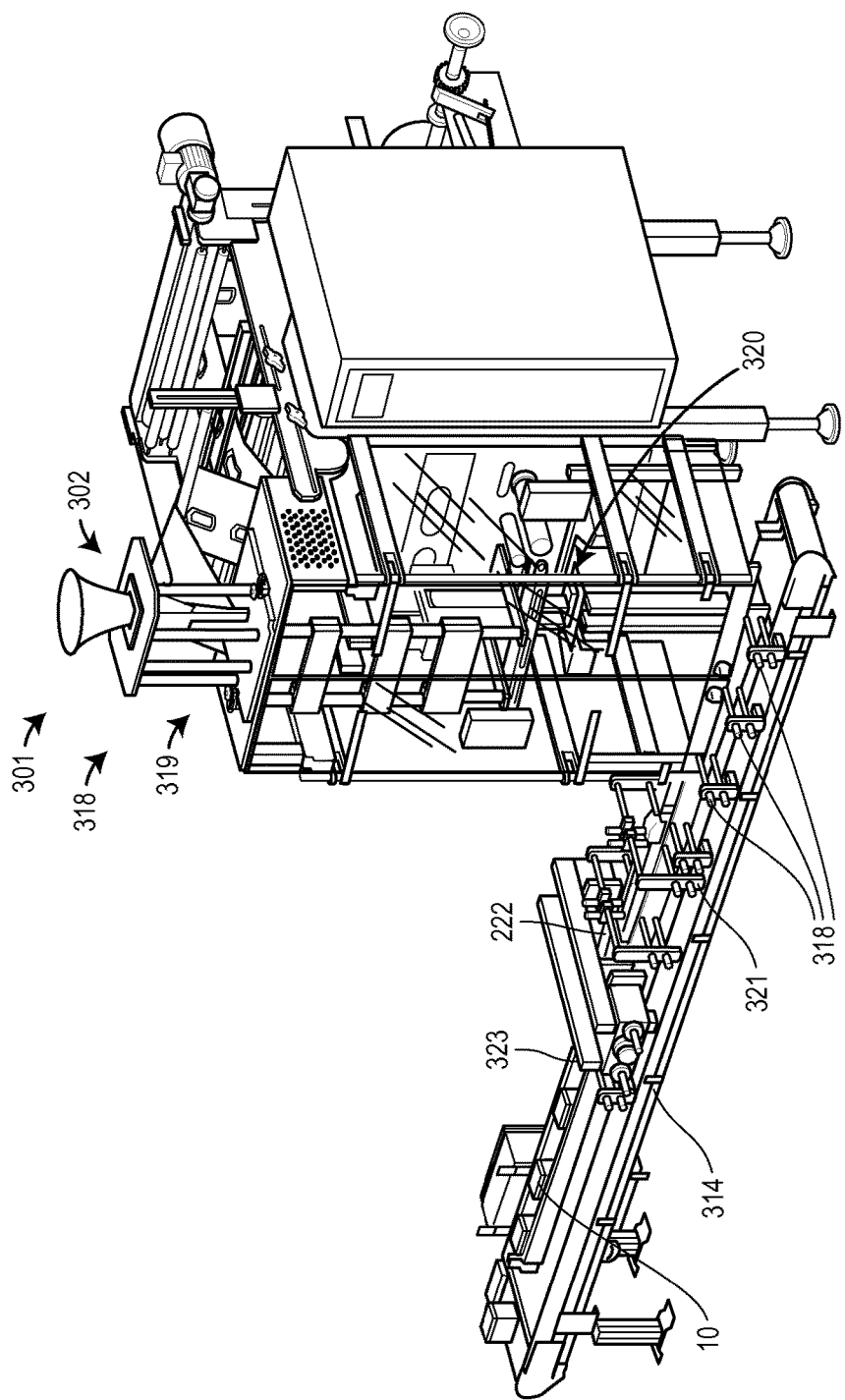
FIG. 36 is a perspective view of an embodiment of a packaging machine used to manufacture an embodiment of a re-closable packaging assembly 10.
Figure 37:
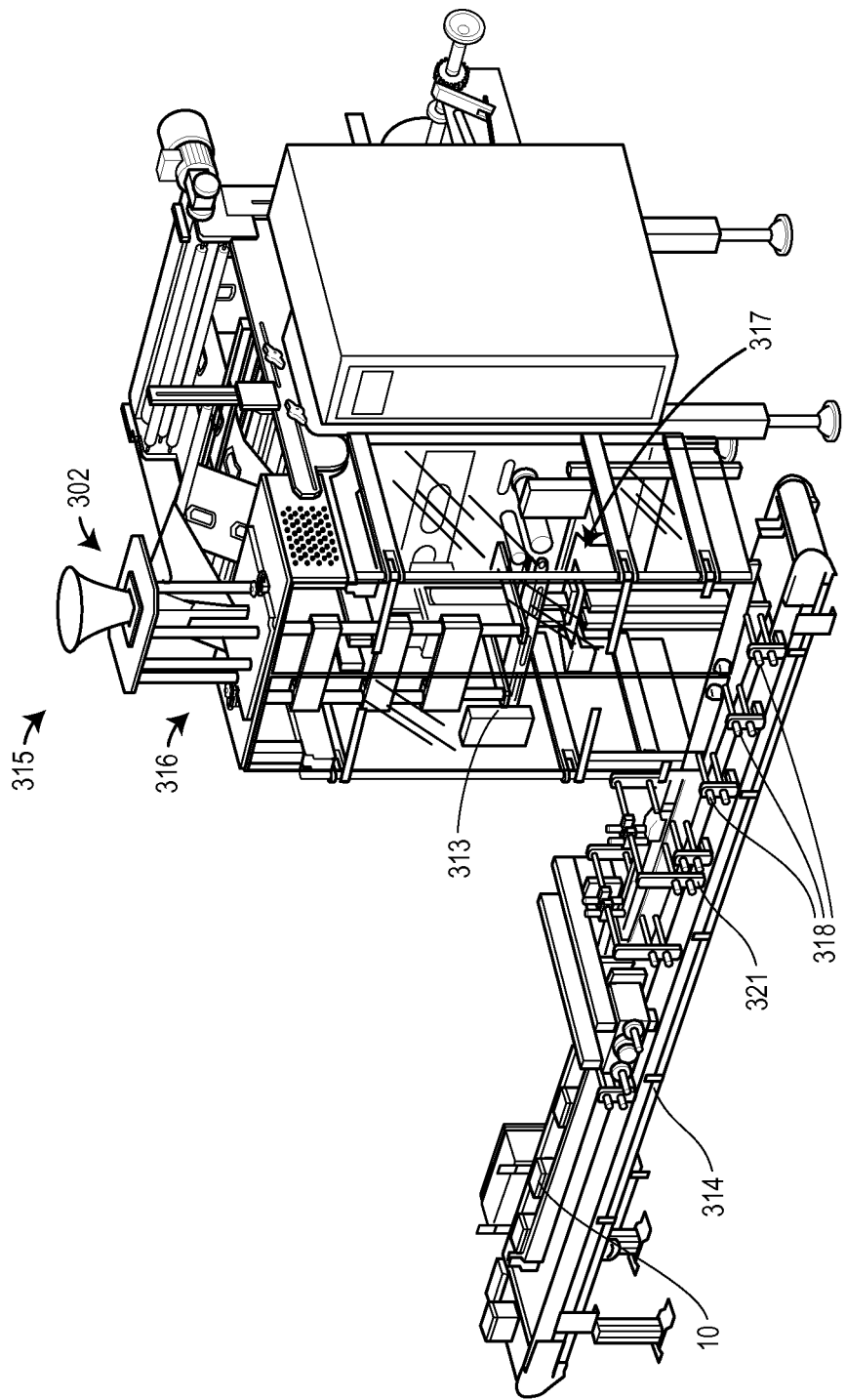
FIG. 37 is a perspective view of an embodiment of a packaging machine used to manufacture an embodiment of a re-closable packaging assembly 10.
Figure 38:
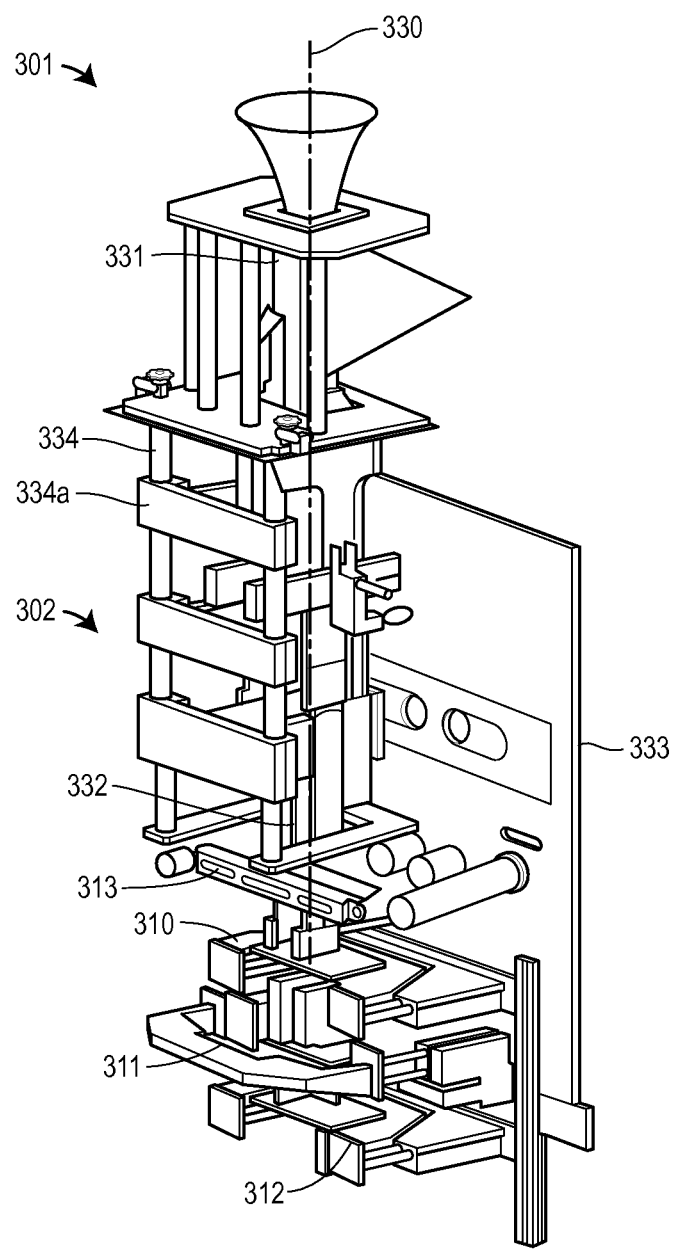
FIG. 38 is a perspective view of an embodiment of a forming station of a packaging machine used to manufacture an embodiment of a re-closable packaging assembly 10.
Figure 39D:
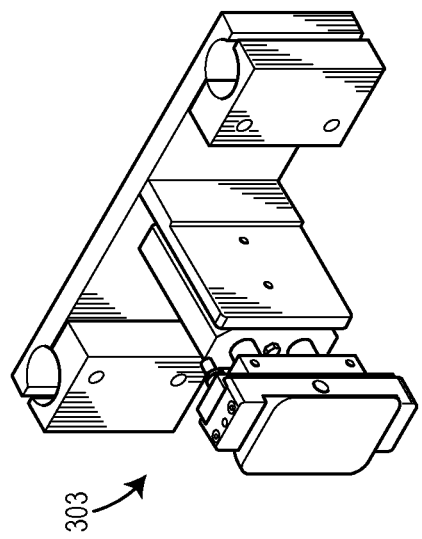
Figure 39C:
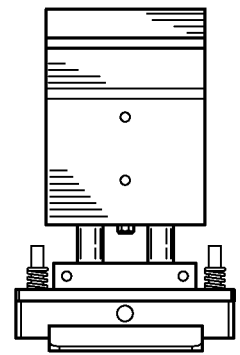
Figure 39A:
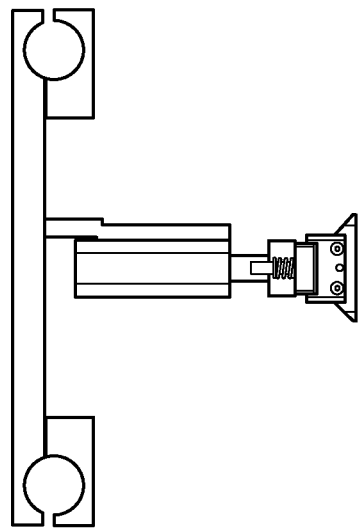
Figure 39B:
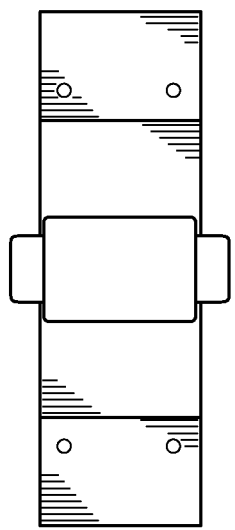
Figure 41D:
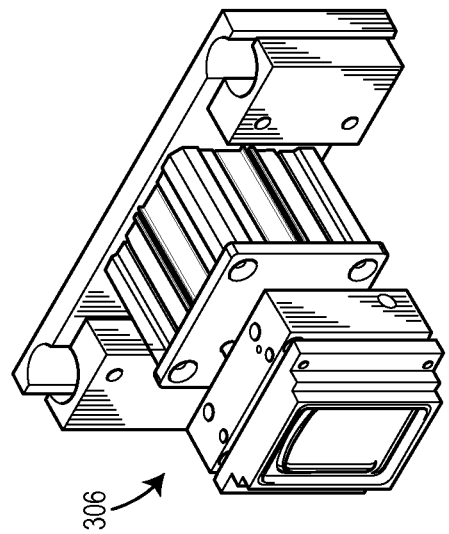
Figure 41C:
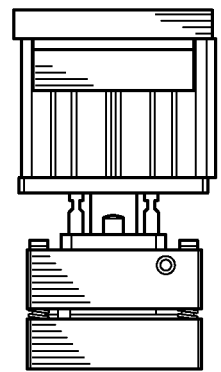
Figure 41A:
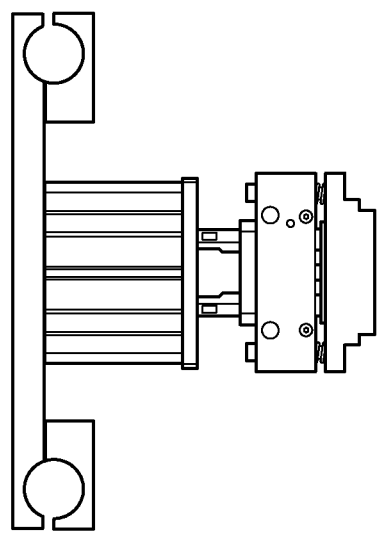
Figure 41B:
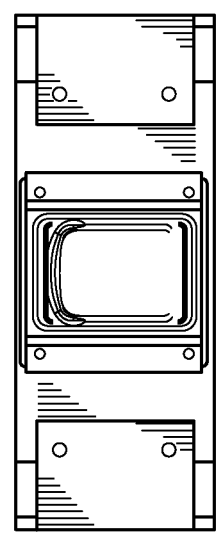
Figure 42D:
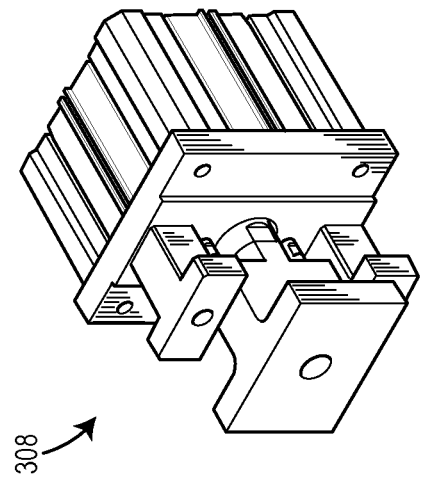
Figure 42C:
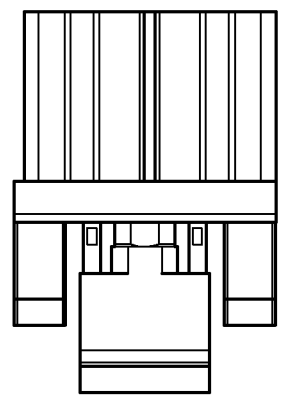
Figure 42A:
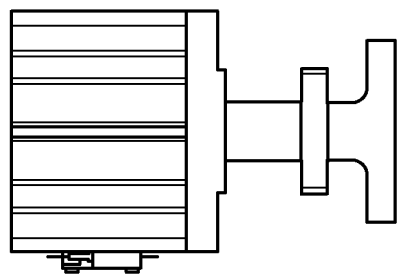
Figure 42B:
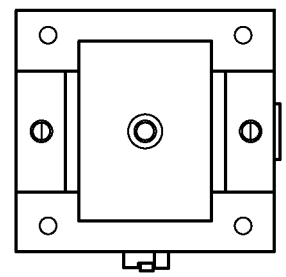
Figure 43E:
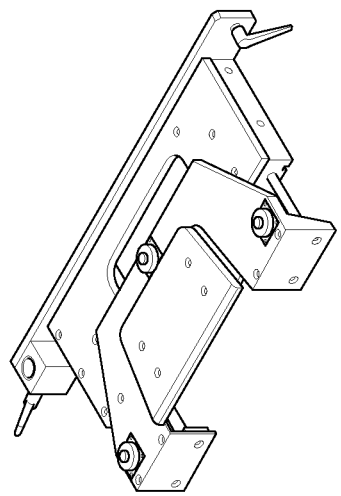
Figure 43F:
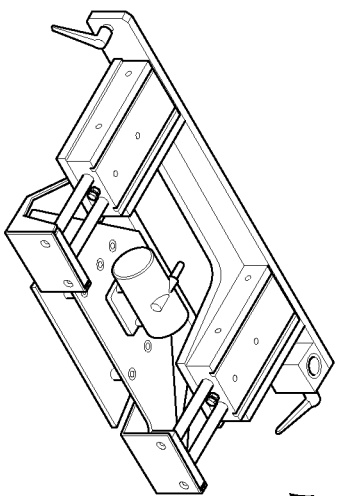
Figure 43D:
Figure 43A:
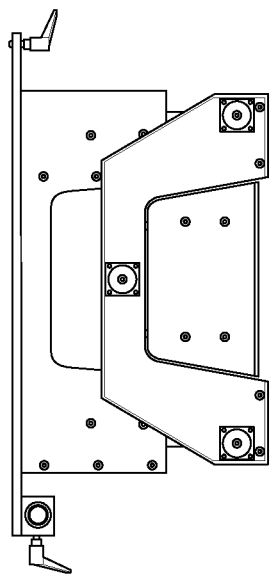
Figure 43B:
Figure 43C:
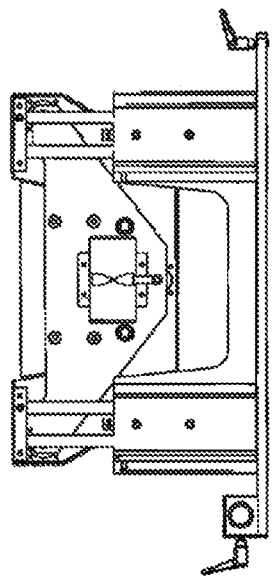
Figure 45E:
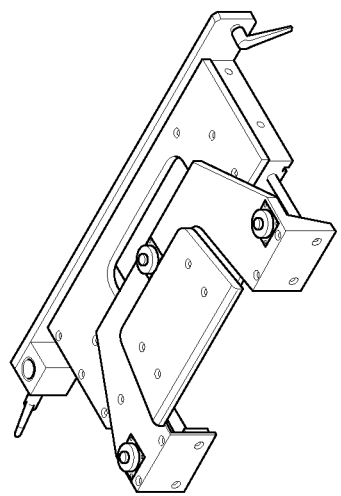
Figure 45F:
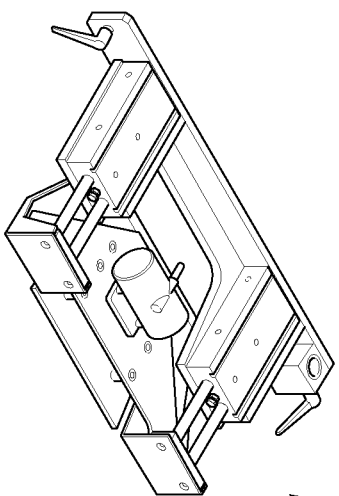
Figure 45D:
Figure 45A:
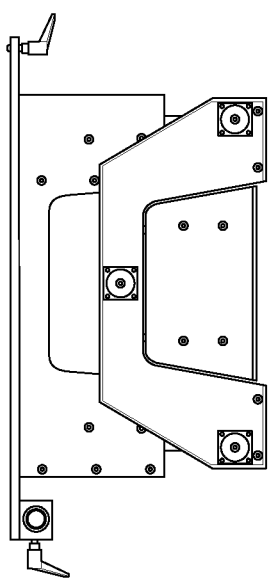
Figure 45B:
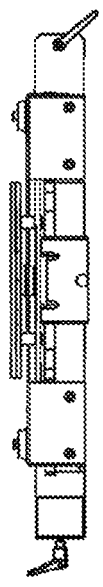
Figure 45C:
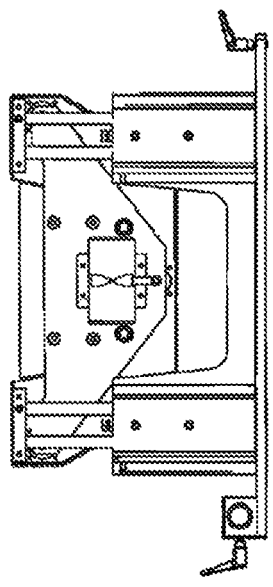
Figure 46:
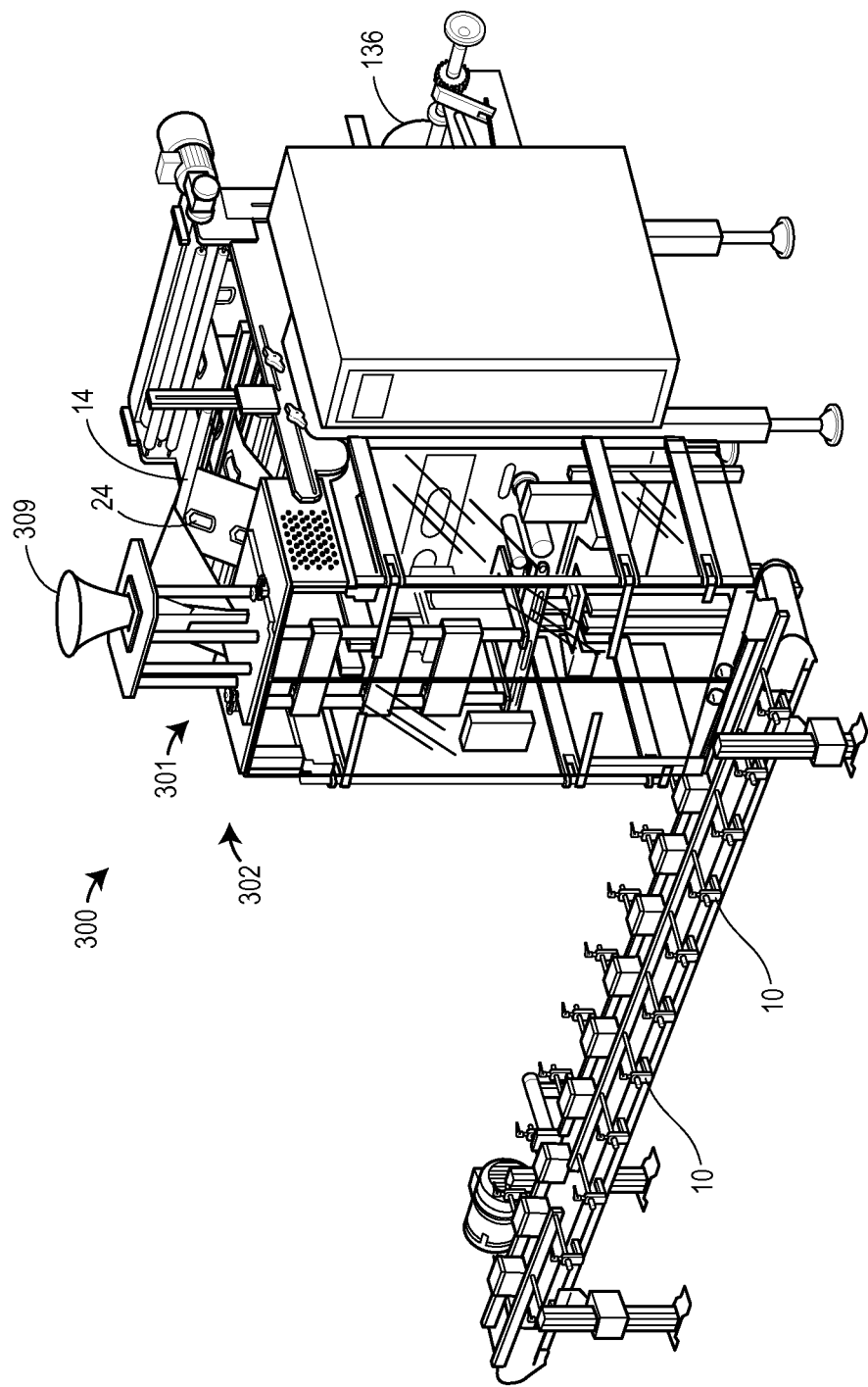
FIG. 46 is a perspective view of an embodiment of a packaging machine used to manufacture an embodiment of a re-closable packaging assembly 10.

FIGS. 36, 37, and 46 illustrate various embodiments of VFFS machines. FIG. 46 illustrates a VFFS machine 300 (Vertical Folding Station Mode) having an embodiment of the vertical forming station 301 illustrated in FIG. 38. The vertical forming station 301 includes the forming tube assembly 302 illustrated in FIGS. 33A to 33D, and the forming tube assembly 302 may include a forming tube 307 extending along a first longitudinal axis 330 from a first end 331 to a longitudinally-opposite second end 332. The first longitudinal axis 330 may be vertical or substantially vertical. As used herein, the term vertical includes a direction parallel or substantially parallel to the Z-axis of the reference coordinate system provided in FIGS. 33A to 33D and 52A. Alternatively, the first longitudinal axis 330 may be horizontal or substantially horizontal. As used herein, the term horizontal includes a direction normal to or substantially normal to the Z-axis of the reference coordinate system provided in FIGS. 33A to 33D and 52A, such as a direction within or substantially within the X-Y plane of the reference coordinate system provided in FIGS. 33A to 33D and 52A. The forming tube assembly 302 may be modular and may be releasably secured to a primary frame assembly or a portion of the primary frame assembly. The forming tube assembly 302 of FIGS. 33A to 33D may include one or more (e.g., two) heating stations 303, and the heating stations 303 may each be identical to the embodiment of FIGS. 39A to 39D. In some embodiments, the heat station 303 can be designed to selectively heat zones of the portion of film disposed within the heating station. The forming tube assembly 302 of FIGS. 33A to 33D may also include a forming station 304, such as a thermoforming station, that may include an inside forming cavity or a first mold element 305 (illustrated in FIGS. 40A to 40F) and an outside forming cavity or a second mold element 306 (illustrated in FIGS. 41A to 41D) to form any or all of the first engagement feature 36, the first securement feature 104a, the second engagement portion 38, the convex portion 98, the second securement feature 104b, the hinge portion 28 of the closure assembly 22, the one or more ribs 51, and/or the optional locking mechanism 126. The forming tube assembly 302 of FIG. 33A to 33D may further include a forming tube 307 (illustrated in FIGS. 34A to 34E) that extends longitudinally (i.e., along the first longitudinal axis 330) relative to the forming tube assembly 302, and the forming tube 307 may function identically to the forming tube 146 described above. That is, the forming tube 307 may be adapted to shape the film as the film displaces in a direction parallel to the first longitudinal axis 330. The first mold element 305 (which may be identical to the die 193 of FIG. 35), or any portion of the forming station 304, may be secured directly to a portion of the forming tube 307, and the portion of the forming tube may be at or adjacent to the second end of the forming tube 332.

The forming tube assembly 302 of FIGS. 33A to 33D may further include a pressure offset assembly 308 (illustrated in FIGS. 42A to 42D) that applies pressure to the forming tube 307 opposite to the inside forming cavity 305 and the outside forming cavity 306. The pressure applied to the forming tube assembly 302 by the pressure offset assembly 308 may be equal or approximately equal to the pressure applied by the inside forming cavity 305 and the outside forming cavity 306, and this offset pressure improves stability and reduces deflection in the forming tube assembly 302. The forming tube assembly 302 of FIGS. 33A to 33D may additionally include a product funnel 309 for receiving the product to be disposed in the re-closable packaging assembly 10.

A primary frame assembly 333 may extend along or substantially along the first longitudinal axis 330, with at least a portion of the forming tube 307 directly or indirectly coupled to a portion of the primary frame assembly 333 to support the forming tube 307 or any portion of the forming tube assembly 302. A first end of the primary frame assembly 333 may be disposed adjacent to (or vertically extend above) the first end 331 of the forming tube 307 and a second end of the frame assembly extend beyond (or vertically extend below) the second end 332 of the forming tube 332. The primary frame assembly 333 may include a frame or other support assembly, such as a plate, (or multiple frames and/or support assemblies) that is adapted to be a permanent or semi-permanent base for the components that comprise the VFFS machine 300. In contemplated embodiments, one or more modular frame assemblies 334, such as a first modular frame assembly 334*a*, may be removably secured to the primary frame assembly 333, One or more components, such as the first heating station 303, may be secured to a first portion of the first modular frame assembly 334 and at least a portion of the first thermoforming station 304 (such as the second mold element of the first thermoforming station 304) may be secured to a second portion of the first modular frame assembly 334. One skilled in the art would recognize that such modular frame assemblies 334 allow a user or technician to quickly and efficiently switch out components secured to the modular frame assemblies 334. The second modular frame assembly 334*b* may have one or more different heating stations 303 and/or one or more different thermoforming stations 304 (or a portion of a thermoforming station) than the first modular assembly 334. However, such modular frame assemblies 334 are optional, and the first heating station 303 and at least a portion of the thermoforming station 304 may be secured directly (or indirectly) to the primary frame assembly 333.

Figure 52A:
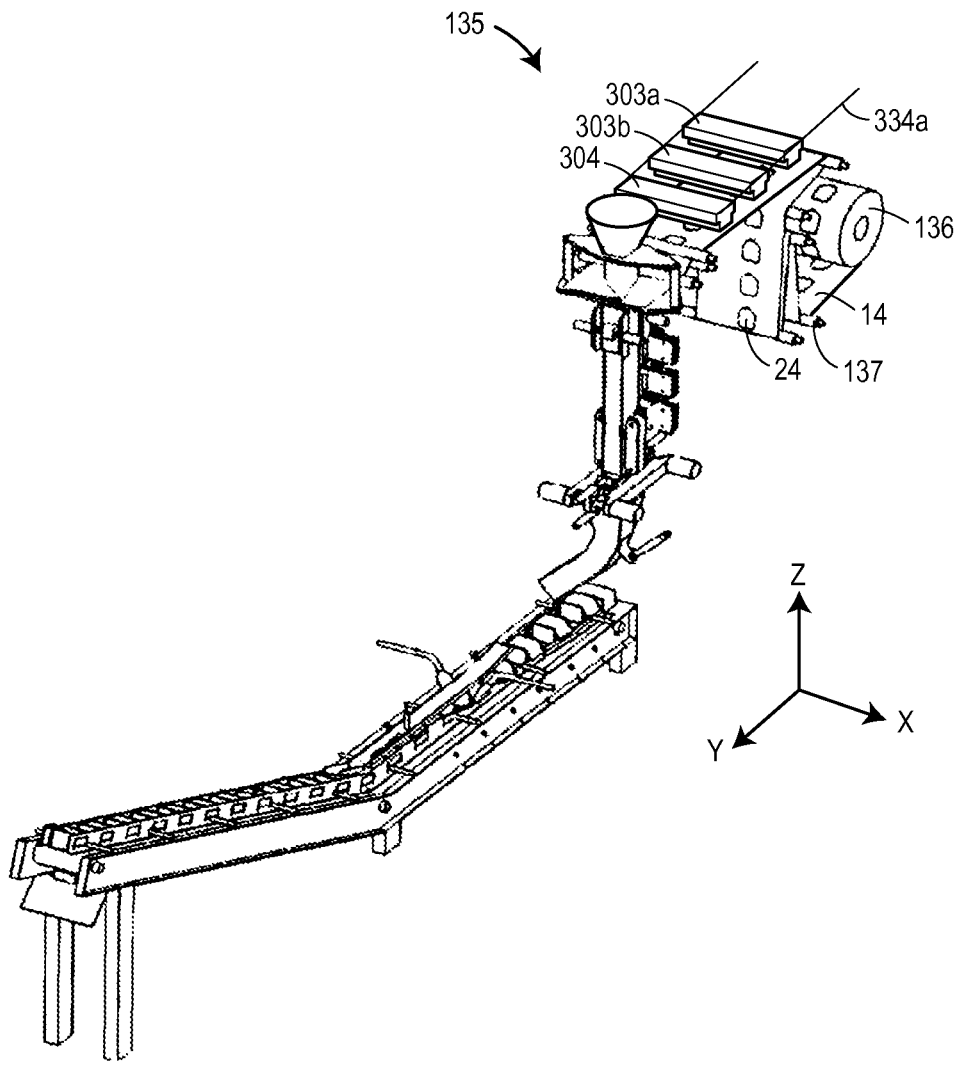
FIG. 52A is a perspective view of an embodiment of a packaging machine used to manufacture an embodiment of a re-closable packaging assembly 10.
Figure 52B:
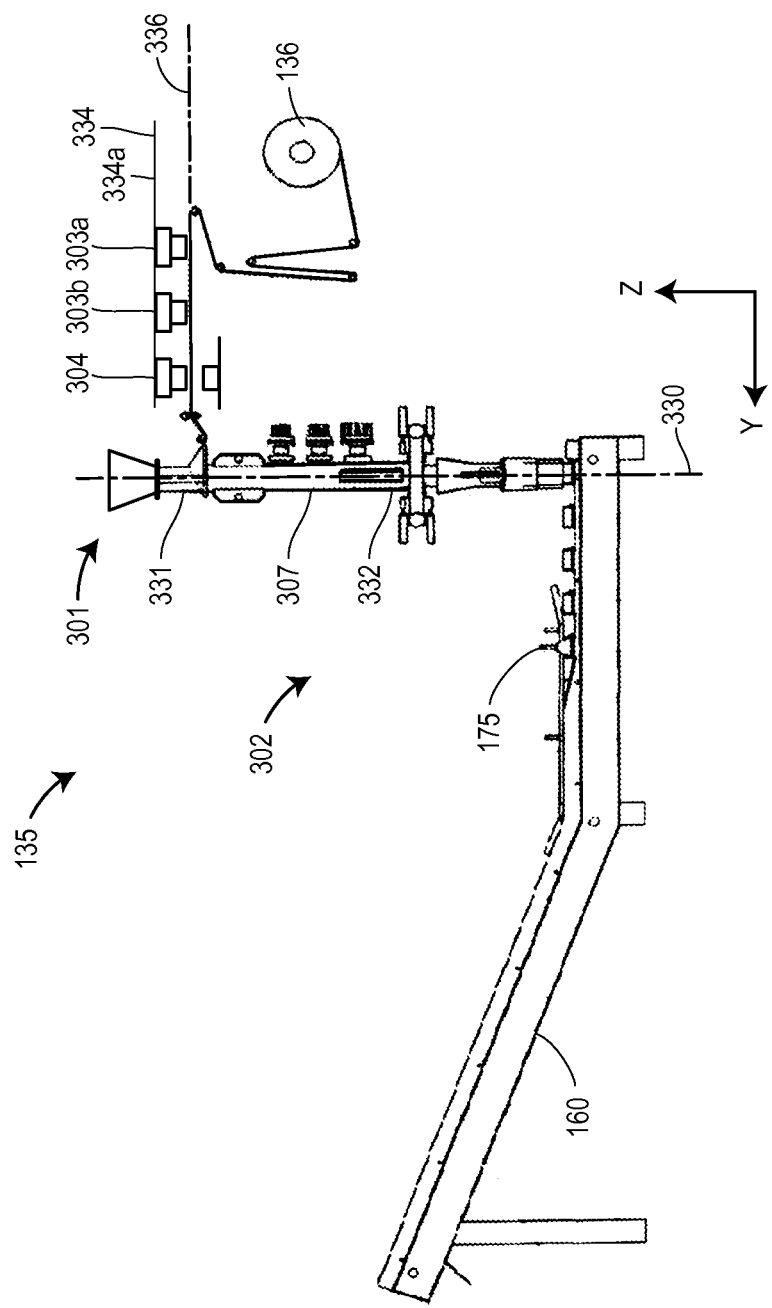
FIG. 52B is a side view of the embodiment of FIG. 52A.
Figure 53A:
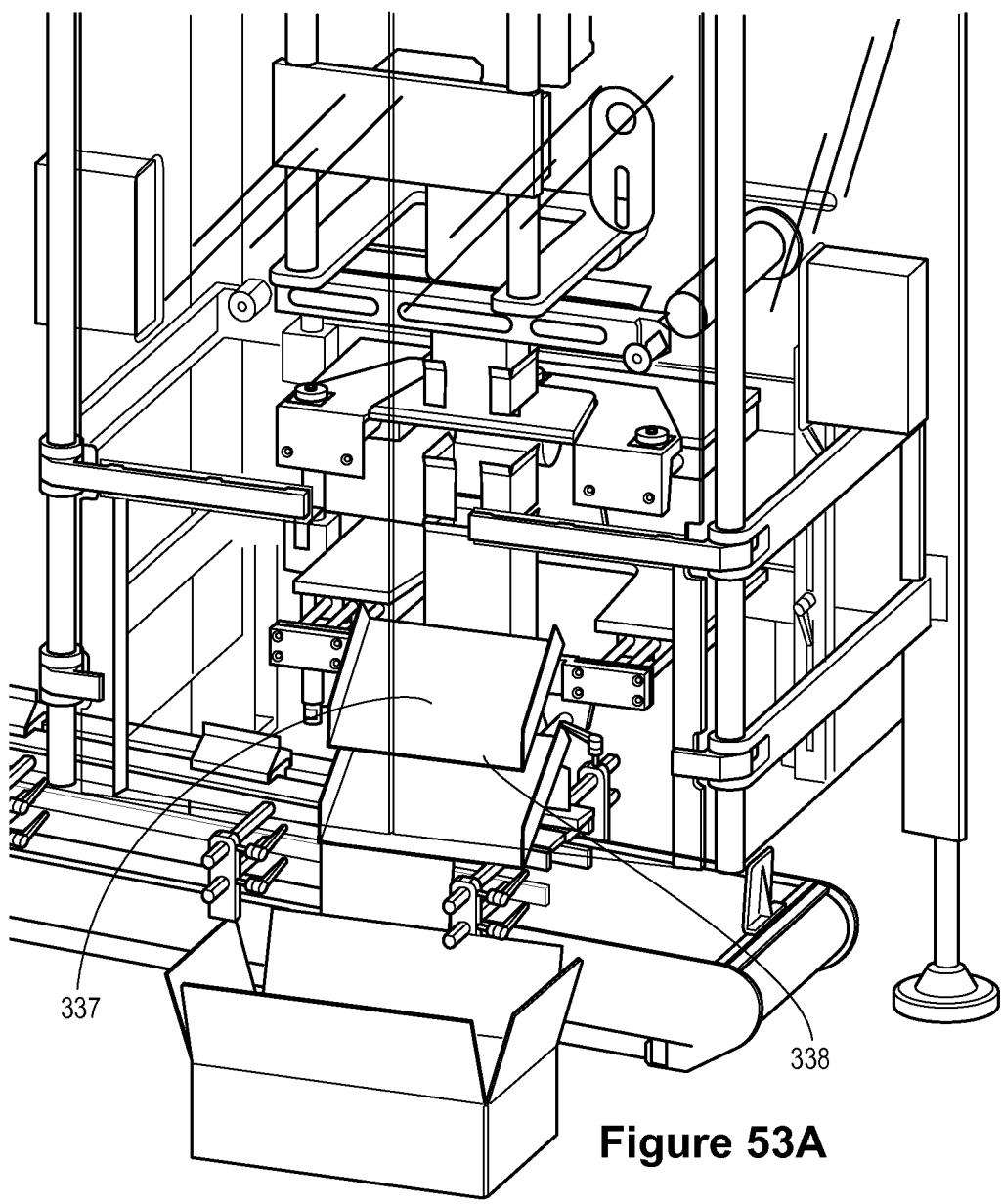
FIGS. 53A to 53F are various views of a reject station.
Figure 53B:
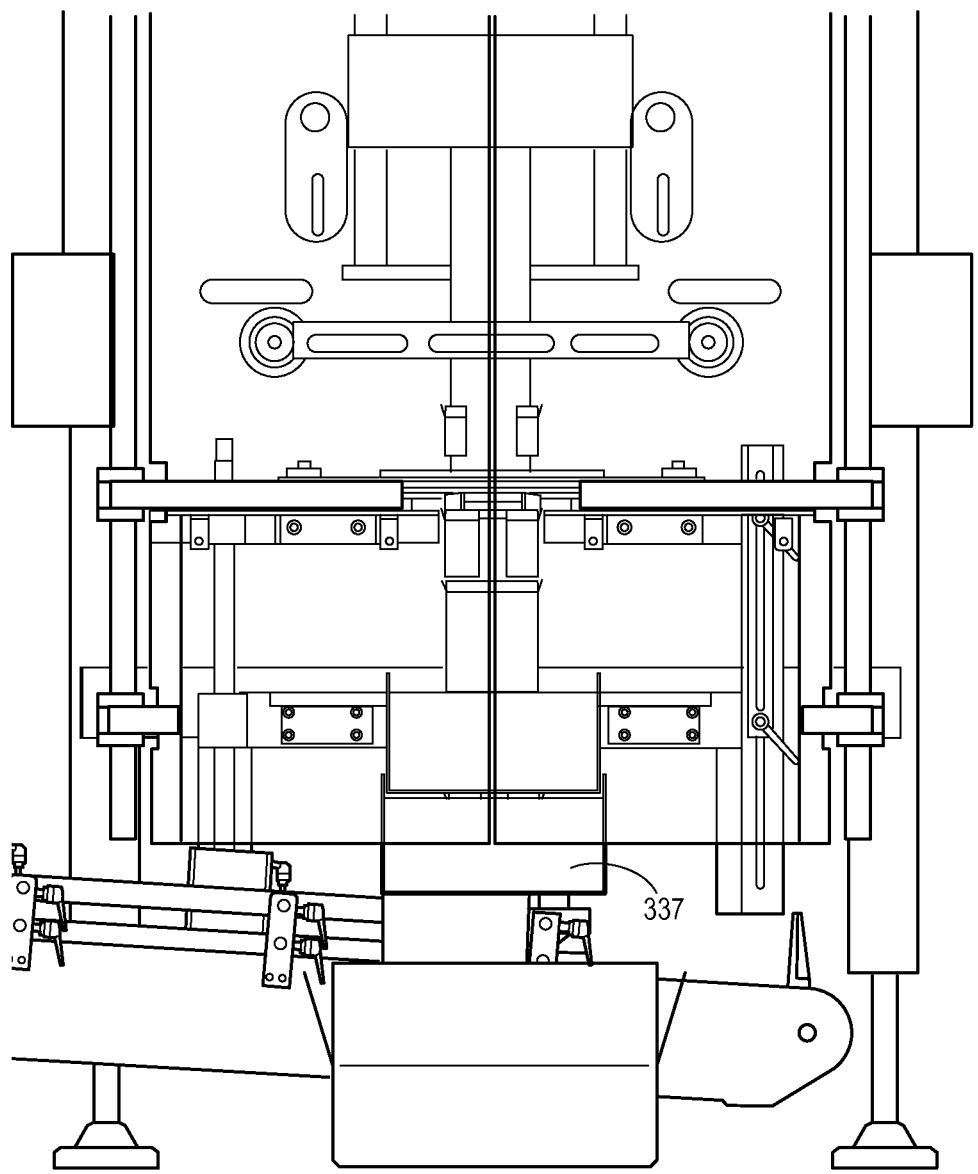
Figure 53C:
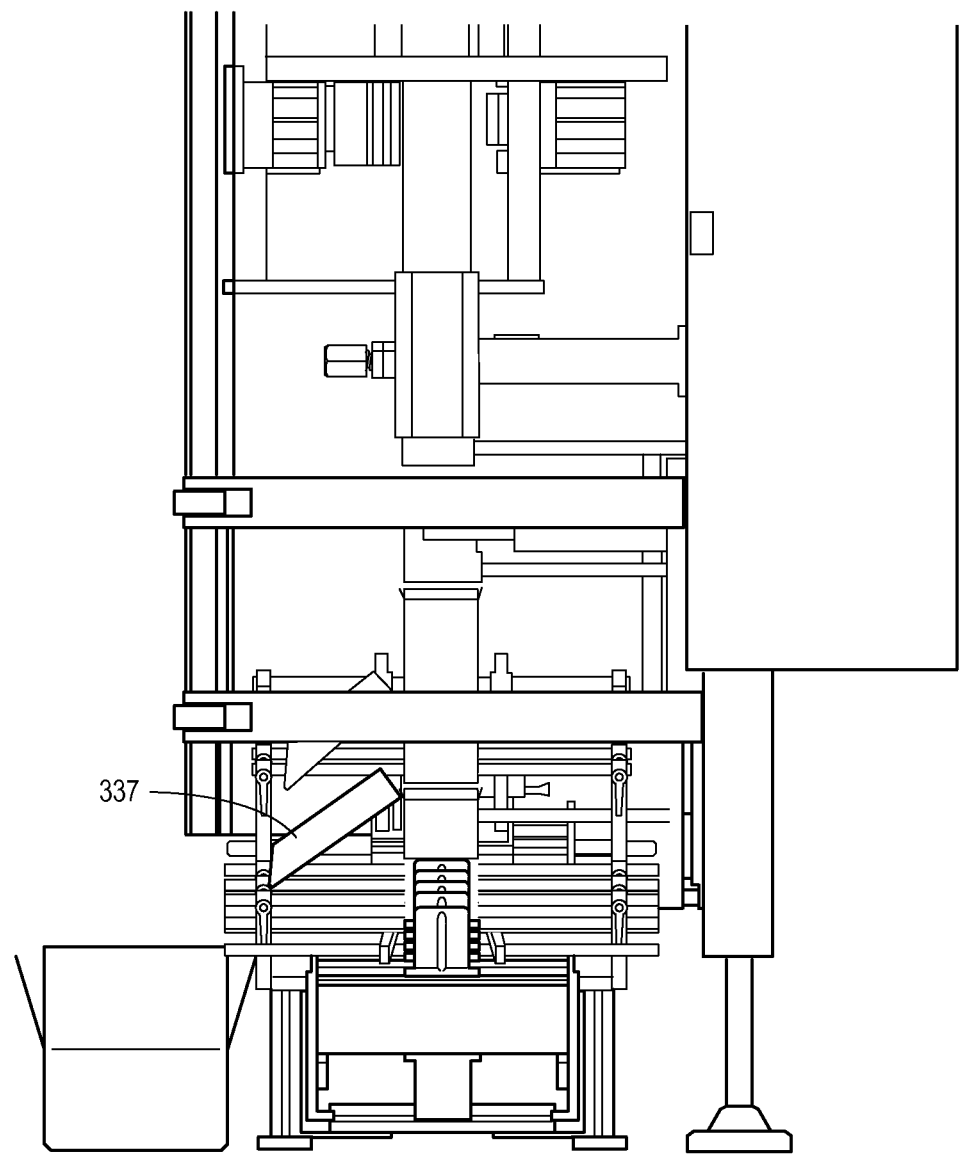
Figure 53D:
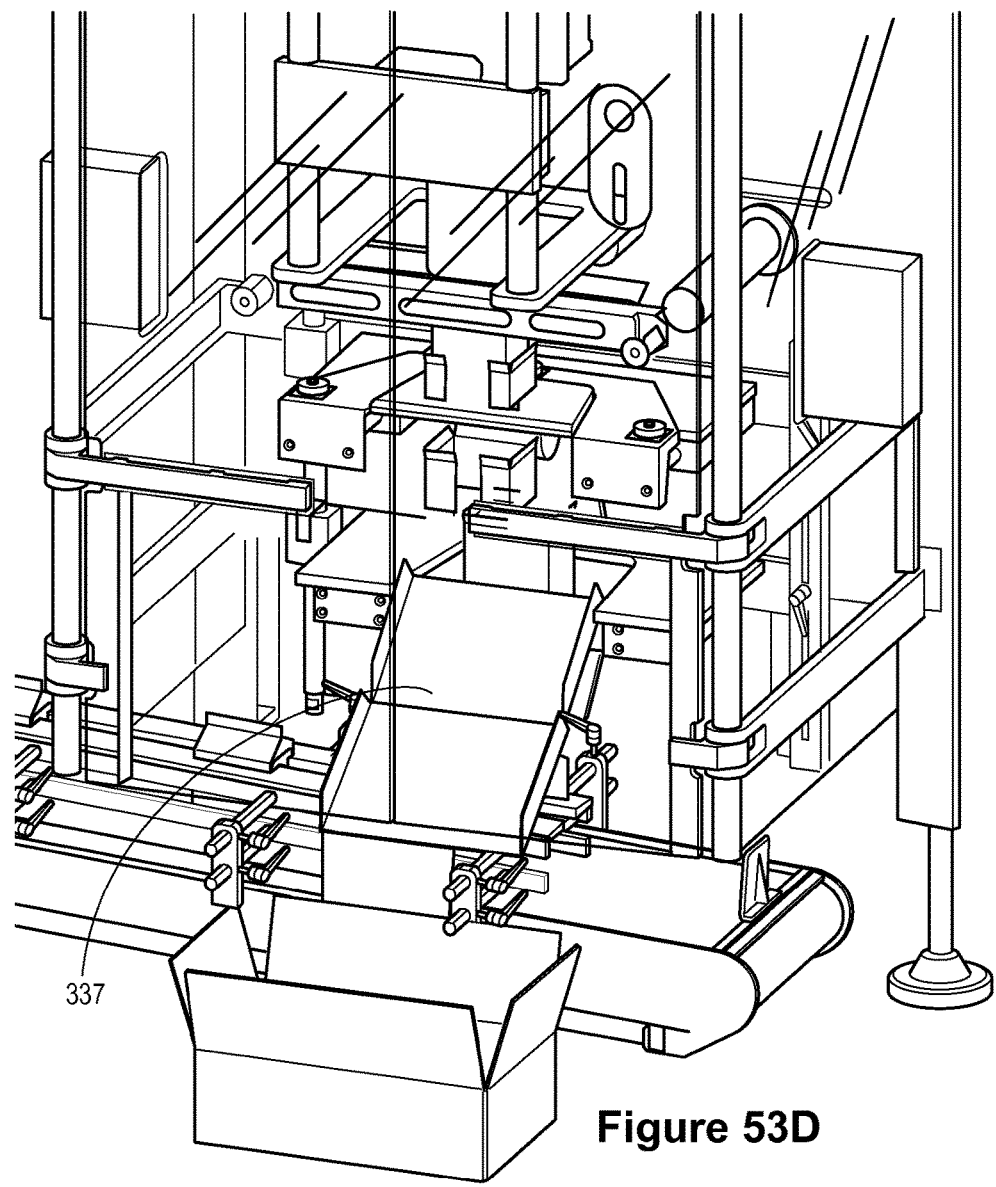
Figure 53E:
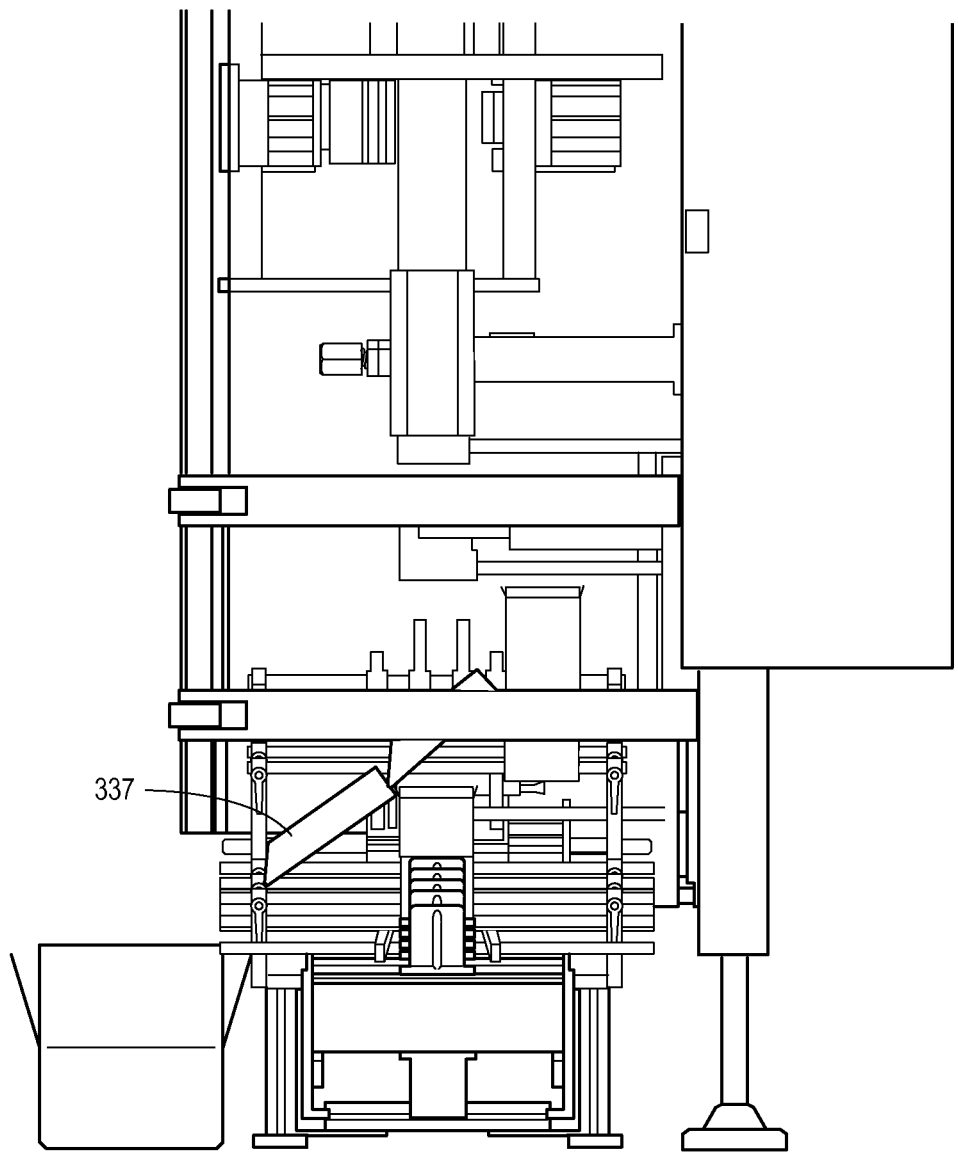
Figure 53F:
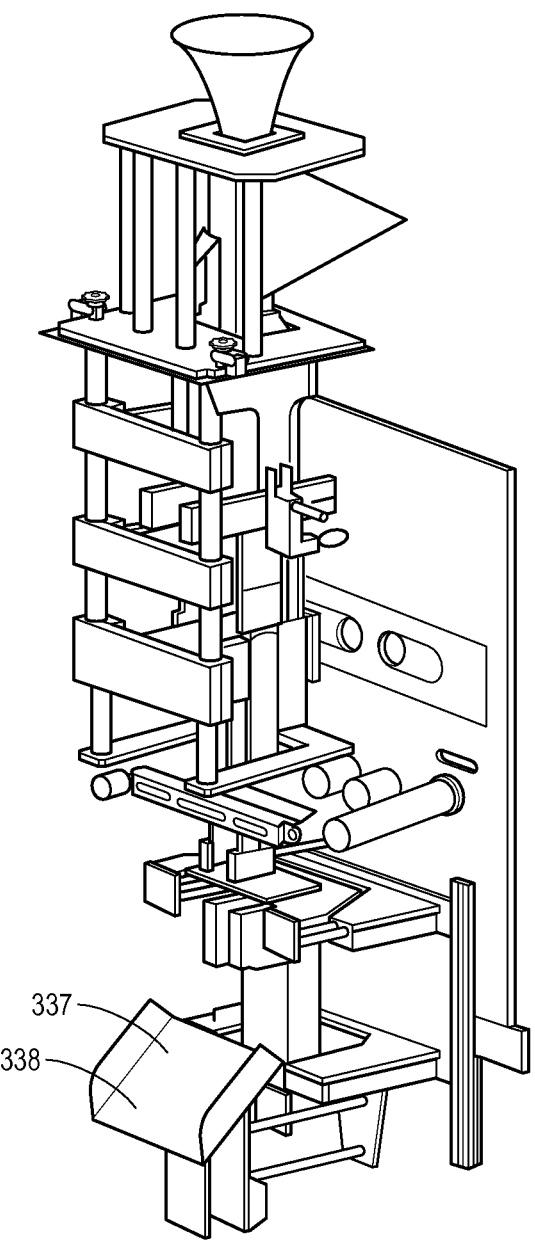
Figure 54D:
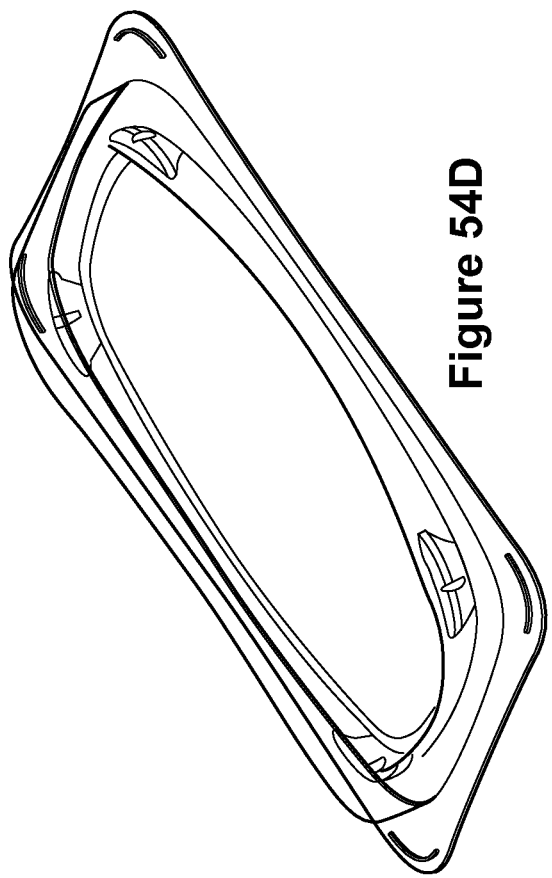
FIGS. 54A to 54N are various views of removable lid member.
Figure 54C:
Figure 54A:
Figure 54B:
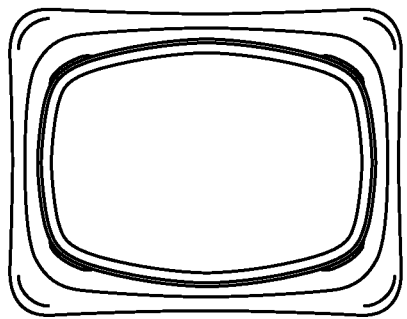
Figure 54K:
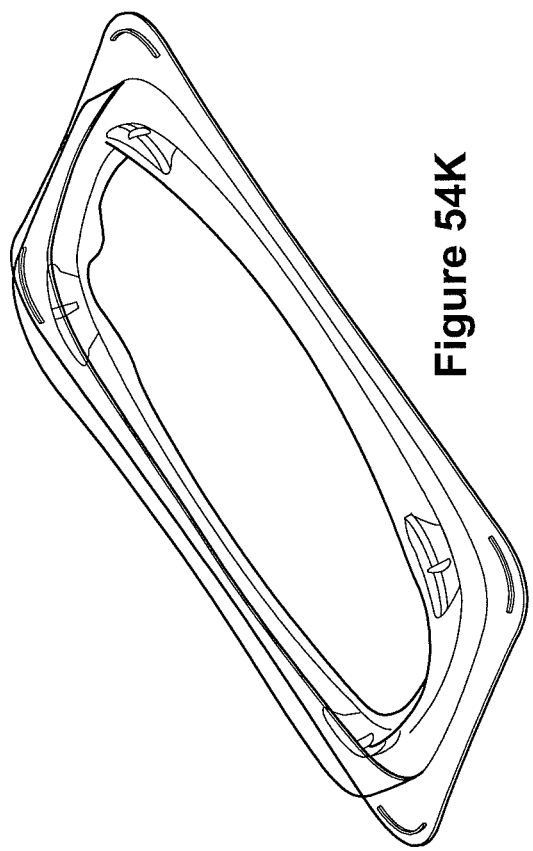
Figure 54N:
Figure 54L:
Figure 54M:
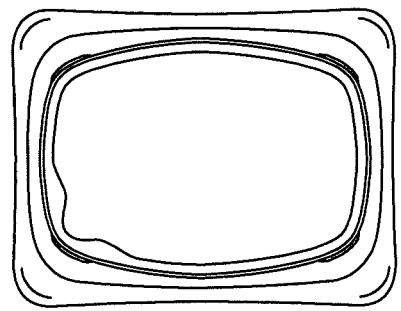

In other embodiments, such as the vertical forming station 335 of FIGS. 52A and 52B, the film roll station 136 may be coupled to the primary frame assembly 333 in any suitable manner, and the film roll station 136 may be adapted to support a roll of the film 14. The film roll station 136 may be positioned such that the film 14 extends from the film roll station 136 to a point at or adjacent to the first end 331 of the forming tube 307. More specifically, the film 14 may extend from the film roll station 136 to a portion of the forming tube 307 between the first end 331 and at least one of the heating stations 303 (such as the first heating station). The film may engage on or more dancer rolls 137 to guide the film along the film path. Each of the dancer rolls 137 and the support rod of the film roll 136 may have a diameter of 2" to prevent the label 24 from separating from the film 14 as the film 14 translates over the rolls 136, 137. In this embodiment, a first segment of the film 14 may extend between the film roll station 136 and the first end 331 of the forming tube 307 along a second longitudinal axis 336. The second longitudinal axis 336 may have any suitable orientation, and the second longitudinal axis 336 may be non-parallel and non-coaxial with the first longitudinal axis 330. For example, the second longitudinal axis 336 may be normal to (extend oblique to) the first longitudinal axis 330.

In this embodiment, one or more heating stations 303 may include a first heating element 303*a* for heating a first portion of the film 14 as the film displaces toward the first end 331 of the forming tube 307, the first heating station 303*a* being disposed between the film roll station 136 and the first end 331 of the forming tube 307. A second heating station 303*b* may be disposed between the first heating station 303*a* and the first end 331 of the forming tube 307. The first thermoforming station 304 may be disposed between the first heating station 303*a* (or the second heating station 303*b*) and the first end 331 of the forming tube 307. So configured, the one or more heating stations 303 and the first thermoforming station 304 may be disposed upstream (relative to the direction of travel of the film 14 through the vertical forming station 335) of the forming tube 307 or the first end 331 of the forming tube 307.

In contemplated embodiments, as illustrated in FIGS. 52A and 52B, one or more modular frame assemblies 334, such as a first modular frame assembly 334*a*, may be removably secured to the primary frame assembly 333 at one or more locations between the film roll 136 and the first end 331 of the forming tube 307. One or more components, such as the first heating station 303, may be secured to a first portion of the first modular frame assembly 334 and at least a portion of the first thermoforming station 304 (such as the second mold element of the first thermoforming station 304) may be secured to a second portion of the first modular frame assembly 334. One skilled in the art would recognize that such modular frame assemblies 334 allow a user or technician to quickly and efficiently switch out components secured to the modular frame assemblies 334. For example, a first modular frame assembly 334 may removed from the primary frame assembly 333 and a second modular frame assembly 334*b* may be secured to the primary frame assembly 333. The second modular frame assembly 334*b* may have one or more different heating stations 303 and/or one or more different thermoforming stations 304 (or a portion of a thermoforming station) than the first modular assembly 334. However, such modular frame assemblies 334 are optional, and the first heating station 303 and at least a portion of the thermoforming station 304 may be secured directly (or indirectly) to the primary frame assembly 333.

Referring again to FIG. 38, the vertical forming station 301 of FIG. 38 may include an upper bottom flap folding assembly 310 (or a first folding assembly or a first folding station illustrated in FIGS. 43A to 43D) downstream of a seal bar assembly 313 and the forming tube assembly 302. The first folding station 310 may be coupled to the primary frame assembly 333 or the modular frame assembly 334 and may be disposed between the second end 332 of the forming tube and the second end of the primary frame assembly.

The upper bottom flap folding assembly 310 may also include a product settling vibrator and/or a heater. The vertical forming station 301 may also include a top flap folding assembly 311 (illustrated in FIGS. 44A to 44F) and a lower bottom flap folding assembly 312 (illustrated in FIGS. 45A to 45F), and the lower bottom flap folding assembly 312 may also include a product settling vibrator and/or a heater. The upper bottom flap folding assembly 310, the top flap folding assembly 311, and/or the lower bottom flap folding assembly 312 may cooperate to form flaps, corners, and/or folds in the film to form portions of the re-closable packaging assembly 10. The vertical forming station 301 may also include seal bars 313 to seal edges of the film to form portions of the re-closable packaging assembly 10. The seal bars 313 may also form the end seals and cut the packages apart.

In the VFFS machine 300 illustrated in FIG. 46, the re-closable packaging assembly 10 is formed or substantially formed in the vertical forming station 301, and each completed or substantially completed the re-closable packaging assembly 10 is placed on a takeaway conveyor 314 that transports the re-closable packaging assembly 10 for subsequent inspection or further packaging.

Referring now to FIG. 37, an embodiment of a VFFS machine 315 (Horizontal Top End Seal Folding and Gluing Mode) includes an embodiment of a vertical forming station 316 that includes the forming tube assembly 302 illustrated in FIGS. 33A to 33D. The vertical forming station 316 may be similar to the vertical forming station 301 of FIG. 38. However, the vertical forming station 316 may only include a package bottom folding assembly 317. In this embodiment, partially-formed re-closable packaging assemblies 10 are placed on the conveyor 314 and the partially-formed re-closable packaging assemblies 10 are routed through side guides that hold snug against the re-closable packaging assembly 10 and positively locate it in a desired fixed position, such a vertical orientation. On the conveyor, the partially-formed re-closable packaging assemblies 10 may pass through a product settling/vibration station 318, and, subsequently, additional folding and glue stations to complete the re-closable packaging assemblies 10. In various embodiments, the packaging machine can include power driven belts, which can for example, facilitate moving the film/packages through the machine.

Referring to FIG. 36, an embodiment of a VFFS machine 318 (Horizontal Top End Seal Folding and Sealing Mode) includes an embodiment of a vertical forming station 319 that includes the forming tube assembly 302 illustrated in FIGS. 33A to 33D. The vertical forming station 319 may be similar to the vertical forming station 301 of FIG. 38. However, the vertical forming station 316 may only include a package bottom folding assembly 317 and may include seal jaws 320 adapted to form seals having vent channels to vent the re-closable packaging assembly 10 in a manner that will be subsequently described in more detail. In such seal jaws 320, each of the seal bars has a channel extending therethrough, and the channel of each of the seal bars is aligned such that when the seal bars engage to seal a portion of the film of the packaging assembly 10, the channels cooperate to create an elongated unsealed vent in the film. The vent may be disposed in any orientation, including the vertical direction. In this embodiment, partially-formed re-closable packaging assemblies 10 are placed on the conveyor 314 and the partially-formed re-closable packaging assemblies 10 are routed through side rails as described above. On the conveyor, the partially-formed re-closable packaging assemblies 10 may pass through a product settling/vibration station 318. In addition, the partially-formed re-closable packaging assemblies 10 may pass through an end seal control and deflation station 321 and then an end seal station 322, 323 to seal the vent and/or to make the package tighter.

As illustrated in FIGS. 53A to 53F, a VFFS machine may include a reject station 337 disposed between the second end of the primary frame assembly 333 and the second end 332 of the forming tube 307. The rejection station 337 may include at least one ramp (e.g., a first ramp 338 alone ore more than one ramps), and the at least one ramp 338 may be disposed in any position below the second end of the forming tube to allow containers downwardly displaced from the second end of the forming tube to contact a surface of the first ramp 338. For example, the at least one ramp 338 may be disposed at an angle relative to a reference plane normal to the first longitudinal axis 330. So configured, the first ramp has a first end that is disposed adjacent to and below the second end of the forming tube such that the film that forms a partially-formed re-closable container contacts the first end of the first ramp when the partially-formed re-closable container is released from the forming tube 307. The partially-formed re-closable container travels under the influence of gravity to the second end of the ramp and into a waste receptacle, for example. The reject station 337 may be secured directly or indirectly to any portion of the assembly, such as the primary frame assembly 333 or the vertical forming station 301, for example. The reject station 337 may be deployed at start-up when partially-formed containers are released from the forming tube 307 that would become stuck in downstream folding stations.

The components of the packaging machine 135 and the steps for forming the re-closable packaging assembly 10 therein may be rearranged as necessary to properly form the re-closable packaging assembly 10, and to do so in an efficient and cost-effective manner. For example, as explained above, the web of film may be directed into the one or more heating stations 138, the first forming station 140, and any subsequent forming stations following the seal/corner seal station 152.

In various embodiments, the package can be formed using a process for venting the internal atmosphere of the package. In the packaging of various materials, it can be necessary to provide a particular head space in the package during the filling and package sealing process to product the product. Methods in accordance with the disclosure can include venting this headspace, which can advantageously reduce the package size. The package can be vented for example by forming a vent hole when sealing the leading or trailing seal of the package. For example, the seal jaw can form the seal in the package leaving a small gap in the seal through which air can vent. Once vented, the seal can be resealed to seal the vent hole. In quad seal type packages, for example, an initial seal can be provided to include the vent and then upon venting of the air in the package, the seal can be reformed to close the vent and then the seal can be folded over and adhered to the outer side of the package.

In some embodiments, the process can include settling the product in the package before forming the seal to close the package. For example, a leading seal can be formed in the package and the product can be filled in the package. Prior to sealing the trailing seal, the product can be subject to a settling process, for example by vibration or other methods known in the art, to settle the product to the portion of the package adjacent the formed leading seal. The trailing seal can then be formed. In some embodiments, the package can be dropped or placed onto a conveyor from the forming tube before forming the trailing seal. The conveyor can include a settling station in which the product is settled to the portion of the package adjacent the trailing seal. The leading seal can then be formed and optionally may include a vent as described above.

In various embodiments of the package, the trailing and leading seals can be folded over and adhered to the outer portion of the package. Such folding and sealing operations of the leading seal can be completed either when forming the leading seal with the film disposed about the forming tube or when the package is disposed on the conveyor. Such folding and sealing operations of the trailing seal can be completed either when the film is provided about the forming tube or on the conveyor. When the trailing seal is formed on the conveyor, the folding and sealing operations to adhere the seal to the outside of the package will be performed on the conveyor. In some embodiments, the trailing seal can be formed while the film is about the forming tube such that a sealed package is provided to the conveyor for the folding and sealing of the leading and/or trailing seals to the outside of the package. In some embodiments, the leading and trailing seals can be both formed and folded and sealed to the outer portion of the package when the package is disposed in line with the forming tube, and prior to placing the package on a conveyor.

One skilled in the art will understand that the containers 10 may be formed by other types of machines or combinations of machines, such as horizontal form, fill and seal (HFFS) machines, Stand-Up Pouch type machines, sequential assembly machines and the like, and the use of such machines or combinations of machines performing the various tasks in forming containers in accordance with the present disclosure is contemplated by the inventors. One skilled in the art would also recognize that any suitable product may be disposed within the container 12 of the re-closable packaging assembly 10. For example, food products, such as peanuts, may be disposed within the container 12. Alternatively, baby wipes may also be disposed within the container 12.

As previously explained, and unlike conventional re-closable packaging assemblies, the lid member 26, the first engagement feature 36, and the second engagement feature 38 may be formed in the container 12 and the closure assembly 22 in one manufacturing operation, thereby eliminating the need to attach a separately-fabricated lid assembly that is secured to a container. Because the features are formed in a single process step, and because the separately-fabricated lid assembly is not necessary, one having ordinary skill in the art would recognize that manufacturing time and cost are reduced. Moreover, one having ordinary skill in the art would recognize such features allows for reliable resealing of the lid member 26 to the container 12 despite the presence of surface contaminants in the sealing area.

EXAMPLES

Example 1: Blue Printed Film

The film had a first sheet with a laminate structure as follows:
150 ga Cast Polypropylene
INK
Adhesive
120 ga PLA
Adhesive
2.875 mil EVOH Coex (12321.302 W)

The first sheet had a nominal thickness of 5.575 mils. The film further included a second sheet disposed on the first sheet in a region to be formed into the top wall. The second sheet had a 10 mil nominal thickness and was formed of PET. The film also includes a third sheet disposed on the first sheet opposite the second sheet. The third sheet had a nominal thickness of 7 mil and was formed of PLA/EVOH/PE. The ink provided the film with a blue color over the entire surface of the film. The film was capable of being thermoformed to include a closure assembly having a lid formed into the film.

Example 2: Blue Printed Film with Clear Window

The film had a first sheet with a laminate structure as follows:
150 ga Cast Polypropylene
INK
Adhesive
76 ga Formable PET
Adhesive
3.5 mil High Clarity Polyethylene The first sheet had a nominal thickness of 5.76 mils. The high clarity polyethylene was disposed in a portion of the film such that when the package was formed a clear window was provided on a portion of the sidewalls of the package. The film further included a second sheet disposed on the first sheet in a region to be formed into the top wall. The second sheet had a 10 mil nominal thickness and was formed of PET. The film also includes a third sheet disposed on the first sheet opposite the second sheet. The third sheet had a nominal thickness of 7 mil and was formed of PLA/EVOH/PE. The ink provided the film with a blue color over the entire surface of the film. The film was capable of being thermoformed to include a closure assembly having a lid formed into the film.

Example 3: Clear Film

The film had a first sheet with a laminate structure as follows:
140 ga BOPP
ADH
92 ga PET
ADH
3.5 mil High Clarity Polyethylene The first sheet had a nominal thickness of 5.82 mils. The package produced from the film was clear. The film further included a two sheets of PLA, each having a nominal thickness of 4.75 mils, disposed one on top of the other on the first sheet and in a region of the film corresponding to the top wall of the package.

Example 4: Elastic Modulus

Films were evaluated for their stiffness. It has been observed that films need to have sufficient stiffness such that package retains its shape when the product is filled into the package, but must remain sufficient flexibility to traverse the filling and forming material. Table 1 provides a listing of materials and measured secant modulus. Table 2 provides the secant modulus of different laminate. The stiffness of the laminate is an averaged value between the stiffest web in the laminate and the softest web. The stiffness (as measured by the 1% secant modulus) was measured using ASTM D882 at 23° C.

TABLE 1

| | Secant Modulus (psi) | |
|---|---|---|
| | MD | TD |
| Cello | 362,500 | 182,500 |
| BOPP | 305,850 | 376,900 |
| NYLON | 505,706 | 425,415 |
| PLA | 256,269 | 218,460 |
| CAST PP | 70,000 | 65,000 |

Figure 49:
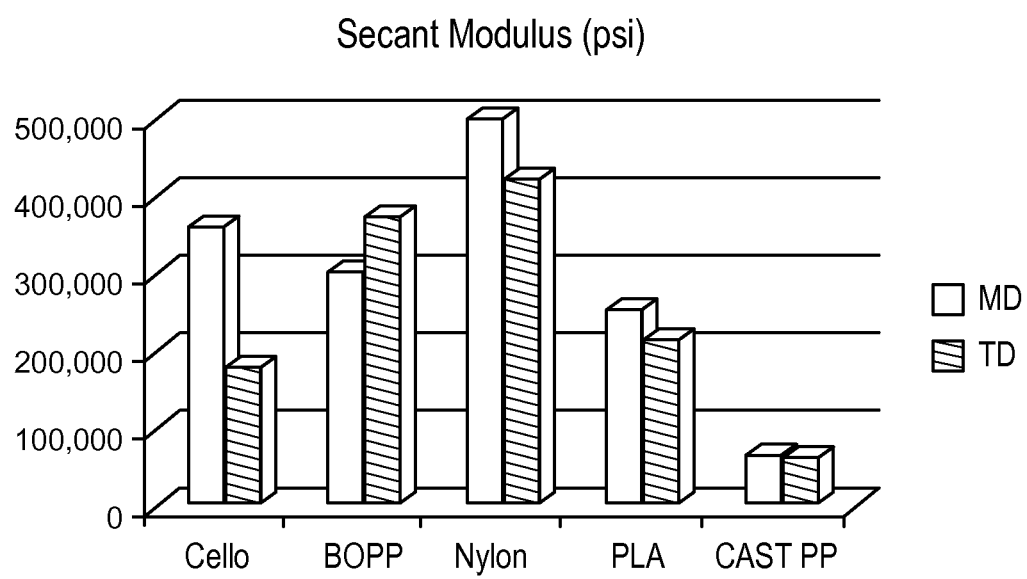
FIG. 49 is a graph of the secant modulus of various polymer films.

The values of Table 1 are represented graphically in FIG. 49. Table 2 below provides the Secant Modulus of various laminates that can be used in various aspects of the disclosure.

TABLE 2

Secant Modulus of Different Laminates

| ACTUAL MATERIAL | CLASS CODES | Tensile modulus PSI -MD | Tensile modulus PSI -TD |
|---|---|---|---|
| 1.5 mil LLDPE/ 60 BON/1.5 LLDPE | LLDPE/NYB/LLDPE | 60165 | 69852 |
| 120 OPP/120 OPP | PPCX2/PPCX2 | 146843 | 244738 |
| 2.0 mil LLDPE/ 60 BON/2.0 12321.0 | LLDPE/NYB/PEMB | | |
| 48 PET/0015 LLDPE | PETTC/LLDLD | 97635 | 115209 |
| 60ga HEAT SEALABLE PET | PETUS | 290627 | 296745 |
| 70- OPP/48 MET PET/0025 LLDPE | PP/PETM/LLDPE | 85524 | 122638 |
| 1.5 mil .202/60 OEB/2.0 mil .202 | PEMT/NYE/PEMT | 42610 | 47201 |
| 120 SUPERECO/ 002 .801 | BIODEG BOPP/EVOH SEALANT | 80305 | 103249 |
| 120 SUPERECO/ 004 .801 | BIODEG BOPP/EVOH SEALANT | 63538 | |
| 250HB Cello/ 002 LLDPE | CELLULOSE/LLDPE | 120994 | 84558 |
| 50 PVDC PET/ 002 LLDPE | PETC/LLDPE | 91006 | 91777 |
| 48 PET/00225 CX5-12321.302 | PET/5 LAYER EVOH SEALANT | 99273 | 106232 |
| 48 MET PET/ 00225 LLDPE | PETM/LLDLD | 75206 | 76481 |
| 60 BON/00175 3% EVA | NYB/EVA SEALANT | 90605 | 82013 |
| 70 OPP/0015 LLDPE (8 SERIES) | PP/LLDPE | 48391 | 91777 |
| 48PET/4.0 K191 | PET/PE | 42611 | 46298 |
| 48 PET/35 FOIL/ 48 PET/2 SURLYN | PET/FOIL/PET/ SURLYN | 168582 | 143072 |
| 48PET/0025.0 | PET/5 LAYER EVOH SEALANT | 91777 | 94326 |
| 48 PET/HDPE/EVA | PET/PEELABLE | 113099 | 135348 |
| XP360(60BON/ 2.875.0) | NY/5 LAYER EVOH SEALANT | 92832 | 91777 |

While various embodiments have been described above, this disclosure is not intended to be limited thereto. Variations can be made to the disclosed embodiments that are still within the scope of the appended claims.

What is claimed is:

1. A re-closable packaging assembly comprising: a container formed at least partially by a first sheet, the container having a plurality of walls that cooperate to define an interior volume, the container having an opening through at least one of the plurality of walls; a closure assembly formed in part by a portion of the first sheet and in part by at least a portion of a flexible second sheet, wherein: the closure assembly comprises: a movable lid member formed by the second sheet; and first and second engagement features, wherein the first and second engagement features are thermoformed portions of the first sheet and the second sheet, respectively, and are the only thermoformed portions, and the first engagement feature is adjacent to and at least partially surrounds the opening, and the second engagement feature is part of the lid member, and wherein: the lid member is movable between a first position in which the second engagement feature releasably engages the first engagement feature to removably secure the lid member over the opening, and a second position in which at least a portion of the lid member is disposed away from the opening and not in contact with the first engagement feature, thereby allowing access to the interior volume through the opening, and the first engagement feature and the first sheet are a unitary, one-piece structure and the second engagement feature and the second sheet are a unitary, one-piece structure.

2. The re-closable packaging assembly of claim 1, wherein the closure assembly further includes a hinge portion, wherein the lid member is pivotable about the hinge portion between a first position in which the lid member releasably engages a first portion of the container surrounding the opening and a second position in which the lid member is pivoted away from a portion of the opening about the hinge portion, thereby allowing for a user to access the interior volume through the opening.

3. The re-closable packaging assembly of claim 1, wherein the first engagement feature extends at least one of upwardly or downwardly from the container.

4. The re-closable packaging assembly of claim 1, wherein the second engagement feature extends at least one of upwardly or downwardly from the lid member of the closure assembly.

5. The re-closable packaging assembly of claim 1, wherein the second sheet is secured to the first sheet by an adhesive, and the adhesive is applied to one or both of a second side of the second sheet and a first side of the first sheet.

6. The re-closable packaging assembly of claim 1, wherein the first engagement feature is a ridge and the second engagement feature is a channel adapted to releasably receive the ridge.

7. The re-closable packaging assembly of claim 1, wherein the first engagement feature is a channel and the second engagement feature is a ridge adapted to be releasably received into the ridge.

8. The re-closable packaging assembly of claim 1, wherein the lid member has a first lateral edge and a second lateral edge parallel to the first lateral edge.

9. The re-closable packaging assembly of claim 1, wherein a first portion of each of the first engagement feature and second engagement feature is elongated and has a longitudinal axis parallel to the first lateral edge and a second portion of each of the first engagement feature and second engagement feature is elongated and has a longitudinal axis parallel to the second lateral edge.

10. The re-closable packaging assembly of claim 1, wherein a pour spout is disposed adjacent to or in contact with the opening.

11. The re-closable packaging assembly of claim 1, wherein the pour spout is integrally formed on the container.

12. The re-closable packaging assembly of claim 1, wherein the pour spout extends at least one of upwardly or downwardly from the container.

13. The re-closable packaging assembly of claim 8, wherein the lid member has a first end edge that extends between a first end of the first lateral edge and a first end of the second lateral edge.

14. The re-closable packaging assembly of claim 13, wherein the first end edge is disposed normal to the first lateral edge and the second lateral edge.

15. The re-closable packaging assembly of claim 13, wherein at least a portion of the first end edge is non-linear.

16. The re-closable packaging assembly of claim 13, wherein at least a portion of the first end edge is at least partially curved.

17. The re-closable packaging assembly of claim 13, wherein a third portion of each of the first engagement feature and second engagement feature is elongated and has a longitudinal axis parallel to the first end edge.

18. The re-closable packaging assembly of claim 13, wherein a third portion of each of the first engagement feature and the second engagement feature is elongated and has a non-linear axis that is offset from the first end edge.

19. The re-closable packaging assembly of claim 13, wherein the lid member has a second end edge that extends between a second end of the first lateral edge and a second end of the second lateral edge.

20. The re-closable packaging assembly of claim 19, wherein the second end edge is disposed normal to the first lateral edge and the second lateral edge.

21. The re-closable packaging assembly of claim 19, wherein any of the first end edge, the second end edge, the first lateral edge, and the second lateral edge cooperates to define a pour spout.

22. The re-closable packaging assembly of claim 19, wherein at least a portion of the second end edge is non-linear.

23. The re-closable packaging assembly of claim 19, wherein a fourth portion of each of the first engagement feature and second engagement feature is elongated and has a longitudinal axis parallel to the second end edge.

24. The re-closable packaging assembly of claim 19, wherein a fourth portion of each of the first engagement feature and the second engagement feature is elongated and has a non-linear axis that is offset from the second end edge.

25. The re-closable packaging assembly of claim 1, wherein the first engagement feature is a continuous, single feature.

26. The re-closable packaging assembly of claim 1, wherein the opening has any of a rectangular, oval, oblong, round, and/or polygonal shape.

27. The re-closable packaging assembly of claim 1, wherein a third sheet is secured to a second portion of the container adjacent to the opening to stiffen the second portion of the container.

28. The re-closable packaging assembly of claim 1, wherein a second side of the second sheet is adjacent to a first side of the first sheet and a first side of the third sheet is adjacent to a second side of the first sheet.

29. The re-closable packaging assembly of claim 1, wherein the third sheet is bonded to the first sheet.

30. The re-closable packaging assembly of claim 1, wherein the third sheet is bonded to the first sheet by an adhesive, heat sealing, glue, and/or ultrasonic welding.

31. The re-closable packaging assembly of claim 1, wherein the third sheet is integrally formed with the first sheet.

32. The re-closable packaging assembly of claim 1, wherein the lid member of the closure assembly has a convex portion that abuts the hinge portion, the convex portion adapted to cooperate with the hinge to maintain the lid member in the second position.

33. The re-closable packaging assembly of claim 1, wherein the hinge portion comprises a pair of oppositely-disposed cuts that may inwardly extend from a lid edge defining an outer perimeter edge of the lid member, and wherein the lid member pivots from the first position to the second position about a portion of the closure member extending between a terminal end of each of the cuts.

34. The re-closable packaging assembly of claim 33, wherein when the lid member is pivoted into the second position, a first lid projection and a second lid projection deform into a position in which an edge formed by one of more segments comprising the cut engages a portion of the closure assembly to support the lid member in the second position.

35. The re-closable packaging assembly of claim 1, wherein the closure assembly includes a locking mechanism that includes a locking feature that is received into a receiving feature when the lid member is in the second position.

36. The re-closable packaging assembly of claim 35, wherein the locking feature is a protrusion that upwardly extends from the lid member, and the receiving feature is a receiving slot that releasably retains the protrusion.

37. The re-closable packaging assembly of claim 2, wherein the lid member comprises first and second projections disposed in a vicinity of the hinge portion, the first and second projections being movable between a first position in which the projections are generally parallel to the wall having the opening and a second position in which the projections are generally perpendicular to the wall having the opening to thereby retain the lid member in the second position in which the lid member is pivoted about the hinge portion away from a portion of the opening.

38. The re-closable packaging assembly of claim 37, wherein the projections have a semi-circular shape.

39. The re-closable packaging assembly of claim 37, wherein the projections are disposed equidistant from a cut in the lid defining the hinge portion.

40. The re-closable packaging assembly of claim 37, wherein the projections are disposed non-equidistant from a cut in the lid defining the hinge portion.

41. A method of manufacturing the re-closable packaging assembly of claim 1, the method comprising: securing the second sheet to a first portion of the first sheet; forming the lid member of the closure assembly from the second sheet; thermoforming the first sheet to define the first engagement feature that is arranged adjacent to and at least partially surrounding the opening, wherein the first sheet and the first engagement feature are a unitary, one-piece structure; thermoforming the second sheet to define the second engagement feature arranged on the lid member of the closure assembly, wherein the second sheet and the second engagement feature are a unitary, one-piece structure.

42. The method of claim 41, further comprising;
  forming a hinge portion of the closure assembly from the second sheet, the hinge portion being disposed adjacent to the lid member,
  wherein the lid member is pivotable about the hinge portion between the first position in which the lid member releasably engages a first portion of the container surrounding an opening formed in the first sheet and the second position in which the lid member is pivoted away from a portion of the opening.

43. The method of claim 41, wherein securing the portion of the first sheet to the first portion of the second sheet occurs prior to forming the lid member from the second sheet.

44. The method of claim 41, wherein securing the portion of the first sheet to the first portion of the second sheet occurs simultaneously with forming the lid member from the second sheet.

45. The method of claim 41, further comprising forming the container from the first sheet, the container having a plurality of walls that cooperate to define the interior volume.

46. The method of claim 45, wherein forming the container from the first sheet occurs after forming the lid member and hinge portion of the closure assembly.

47. The method of claim 45, wherein forming a container from the first sheet includes forming a portion of the container simultaneously with forming the lid member and hinge portion of the closure assembly.

48. The method of claim 41, wherein thermoforming the first engagement feature and the second engagement feature occurs simultaneously with forming the lid member.

49. The method of claim 41, wherein thermoforming the first engagement feature includes forming the first engagement feature as a ridge and forming the second engagement feature includes forming the second engagement feature as a channel adapted to releasably receive the ridge.

50. The method of claim 41, wherein thermoforming the first engagement feature includes forming the first engagement feature as a channel and forming the second engagement feature includes forming the second engagement feature as a ridge adapted to be releasably received into the ridge.

51. The method of claim 41, further comprising:
providing a third sheet secured to a second side of the first sheet adjacent to the first portion of the first sheet, wherein the second sheet is secured to a first side of the first sheet, the third sheet stiffening the first sheet.

52. The method of claim 51, wherein securing the third sheet to the second side of the first sheet occurs prior to forming the lid member of the closure assembly.

53. The method of claim 51, wherein securing the third sheet to the second side of the first sheet includes applying an adhesive or glue to one or both of the third sheet and the first sheet.

54. The method of claim 51, wherein securing the third sheet to the second side of the first sheet includes ultrasonically welding or heat sealing one or both of the third sheet and the first sheet.

55. The method of claim 51, wherein securing the third sheet to the second side of the first sheet includes integrally forming the third sheet with the second side of the first sheet.

56. The method of claim 42, wherein forming the opening occurs simultaneously with forming the lid member and the hinge portion.

57. The method of claim 42, wherein forming the opening occurs prior to forming the lid member and the hinge portion.

58. The method of claim 41, wherein forming the lid member of the closure assembly includes thermoforming the lid member of a closure assembly.

59. The method of claim 41, wherein thermoforming the first engagement feature and the second engagement feature occurs simultaneously with forming the lid member.

60. The re-closable packaging assembly of claim 1, wherein when in the second position the lid member is not in contact with any portion of the wall of the container having the opening.

61. The re-closable packaging assembly of claim 1, wherein the plurality of walls comprise an opening wall having the opening defined therein and at least one tuck fold adjacent to an end of the opening wall, and the second sheet has a portion that extends into the at least one tuck fold.

62. A re-closable package, comprising: a plurality of walls that cooperate to define an interior volume of the package, wherein the plurality of walls are formed by a first flexible sheet and comprises an opening wall comprising an opening defined in the first sheet; a first engagement feature in the opening wall defined by one or more of (i) a thermoformed portion of the first sheet that extends above the plane of the opening wall and (ii) a thermoformed portion of the first sheet that extends below the plane of the opening wall toward the interior volume of the package; and a lid member defined by a second flexible sheet and having a first surface and an oppositely disposed outer second surface, wherein the lid member movable between a first position in which the first surface of lid member covers the opening and a second position in which the lid member is disposed away from the opening allowing access to the interior volume through the opening, the lid member comprising second engagement features defined by one or more of (i) a thermoformed portion of the second sheet that extends above the plane of the lid member when the lid member is in the first position such that the second surface of the lid member has an outward projection and (ii) a thermoformed portion of the second sheet that extends below the plane of the lid member towards the interior volume when the lid member is in the first position such that the second surface of the lid member has an inward depression, where in the first and second engagement features are the only thermoformed portions.

63. The re-closable package of claim 62, wherein the first engagement feature comprises a thermoformed portion of the first sheet that extends above the plane of the opening wall to form a ridge at least partially surrounding the opening and the second engagement feature comprises a thermoformed portion of the second sheet that extends above the plane of the second lid member to form a channel in the first surface of the lid member, adapted to receive the ridge.

* * * * *

UNITED STATES PATENT AND TRADEMARK OFFICE
CERTIFICATE OF CORRECTION

PATENT NO. : 10,207,850 B2
APPLICATION NO. : 14/064083
DATED : February 19, 2019
INVENTOR(S) : James J. Sanfilippo et al.

Page 1 of 1

It is certified that error appears in the above-identified patent and that said Letters Patent is hereby corrected as shown below:

On the Title Page

Item [54], and in the Specification Column 1, Line 2, "making same" should be -- making the same --.

In the Claims

Column 47, Lines 62-63, "one of more" should be -- one or more --.

Signed and Sealed this
Twenty-first Day of April, 2020

Andrei Iancu
*Director of the United States Patent and Trademark Office*